(12) United States Patent
Dick

(10) Patent No.: US 9,493,046 B2
(45) Date of Patent: Nov. 15, 2016

(54) VESSEL

(71) Applicant: Kyle Dick, Auckland (NZ)

(72) Inventor: Kyle Dick, Auckland (NZ)

(73) Assignee: KILOBRAVO LIMITED, Auckland (NZ)

( * ) Notice: Subject to any disclaimer, the term of this patent is extended or adjusted under 35 U.S.C. 154(b) by 0 days.

(21) Appl. No.: 14/142,419

(22) Filed: Dec. 27, 2013

(65) Prior Publication Data

US 2014/0113512 A1   Apr. 24, 2014

Related U.S. Application Data

(63) Continuation-in-part of application No. PCT/IB2012/053313, filed on Jun. 29, 2012.

(30) Foreign Application Priority Data

Jun. 30, 2011  (NZ) ........................................ 593829
Aug. 29, 2011  (NZ) ........................................ 594876

(51) Int. Cl.
*B60F 3/00*   (2006.01)
*B63B 25/28*  (2006.01)
*B63B 27/14*  (2006.01)

(52) U.S. Cl.
CPC ........... *B60F 3/0007* (2013.01); *B60F 3/0015* (2013.01); *B63B 25/28* (2013.01); *B63B 27/143* (2013.01); *B60F 2301/02* (2013.01); *B60F 2301/04* (2013.01)

(58) Field of Classification Search
CPC .................. B60F 3/00; B60F 3/0007; B60F 3/0015; B60F 2301/00; B60F 2301/02; B60F 2301/04; B63C 9/22; B63C 9/23

USPC ................................................. 440/12.5–12.7
See application file for complete search history.

(56) References Cited

U.S. PATENT DOCUMENTS

| | | | |
|---|---|---|---|
| 4,293,967 | A | 10/1981 | Ord |
| 6,159,058 | A | 12/2000 | Matheson |
| 6,983,708 | B1 | 1/2006 | Burg |
| 7,137,350 | B2 | 11/2006 | Waldock |
| 2004/0134402 | A1 | 7/2004 | Schmidt et al. |

(Continued)

FOREIGN PATENT DOCUMENTS

| | | |
|---|---|---|
| CA | 2081858 | 10/1992 |
| DE | 2727905 A1 | 1/1979 |

(Continued)

OTHER PUBLICATIONS

International Search Report & Written Opinion issued in PCT/IB/2012/053313, dated Jan. 25, 2013, 8 pages.

Primary Examiner — S. Joseph Morano
Assistant Examiner — Andrew Polay
(74) Attorney, Agent, or Firm — Arent Fox LLP

(57) ABSTRACT

The present invention relates to a vessel having a superstructure that is movable to increase and/or reduce space in one of at least two zones on the deck of the vessel. The invention further relates to an amphibious vehicle having motive pods that move in an athwartship direction and then downwardly when the motive pods are deployed. The invention further provides for a ramp arrangement for a vessel that allows for an increased amount of deck space, and facilitates ingress and/or egress from the vessel by cargo or passengers.

22 Claims, 60 Drawing Sheets

(56) References Cited

U.S. PATENT DOCUMENTS

| | | |
|---|---|---|
| 2005/0003715 A1* | 1/2005 | Hewitt .................. 440/12.5 |
| 2006/0081169 A1 | 4/2006 | Waldock |
| 2007/0251440 A1 | 11/2007 | Lucas |
| 2011/0030603 A1 | 2/2011 | Hornsby et al. |

FOREIGN PATENT DOCUMENTS

| | | |
|---|---|---|
| DE | 2945978 B1 | 10/1980 |
| EP | 2 161 192 A1 | 3/2010 |
| FR | 2563180 A1 | 10/1985 |
| GB | 2 442 214 A | 4/2008 |
| WO | WO 2009/033235 A1 | 3/2009 |

* cited by examiner

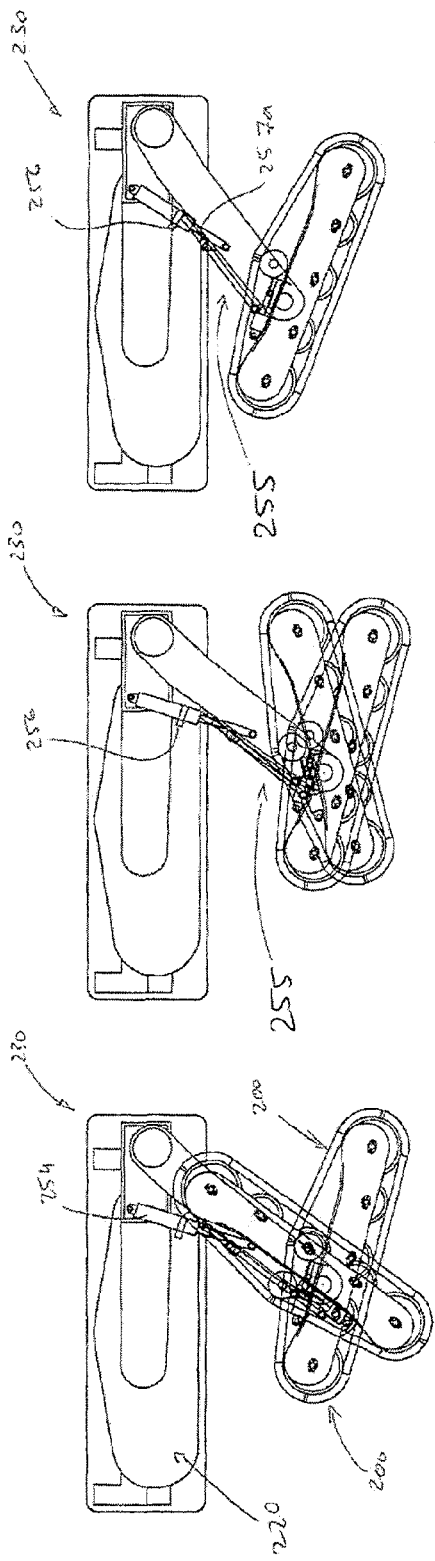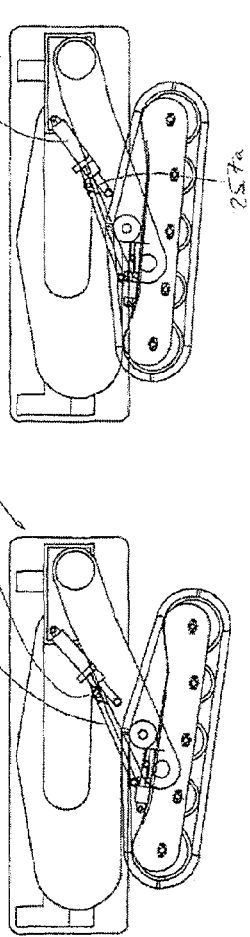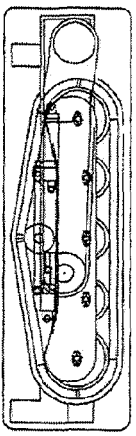
FIGURE 55A FIGURE 55B FIGURE 55C
FIGURE 55D FIGURE 55E FIGURE 55F
FIGURE 55G

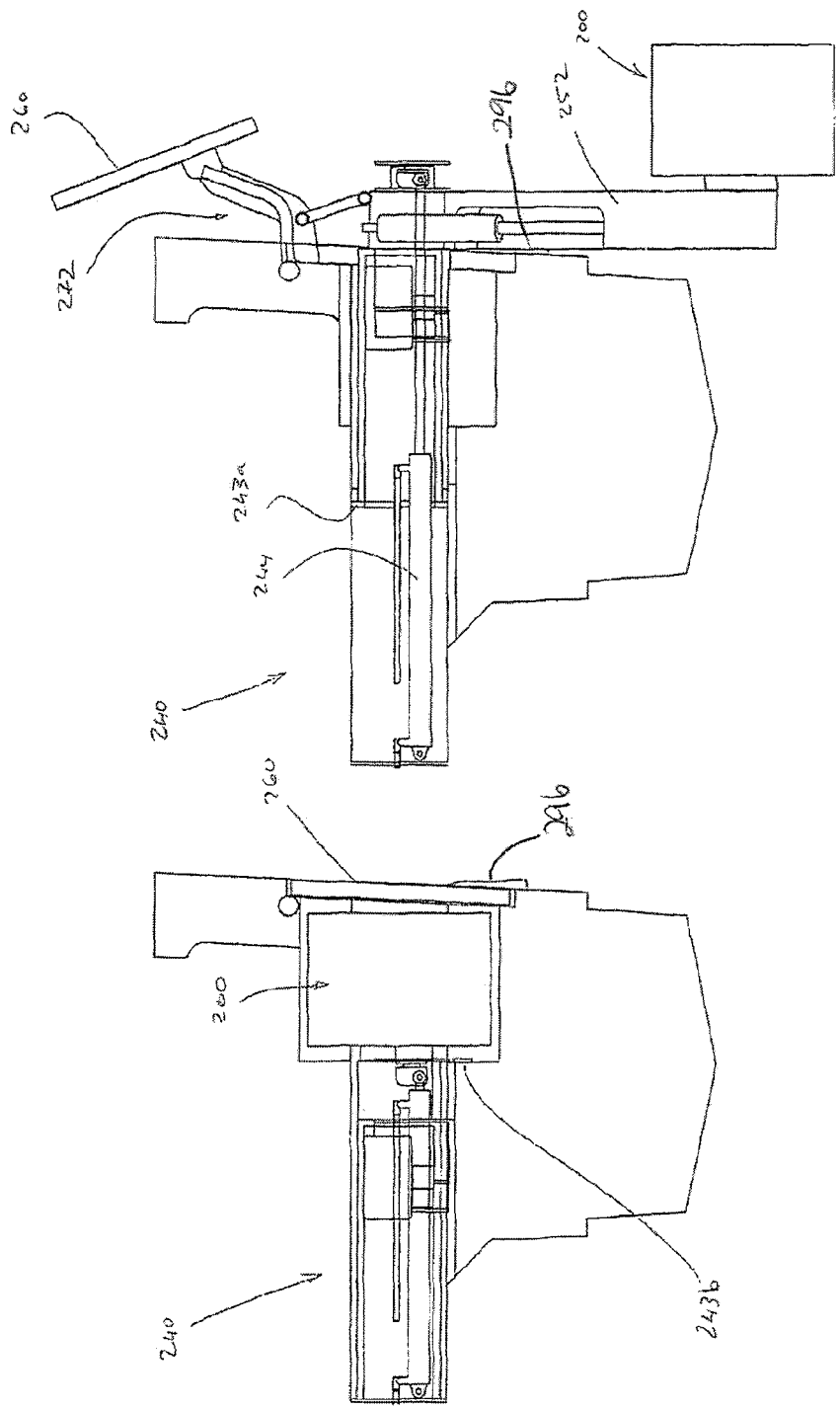

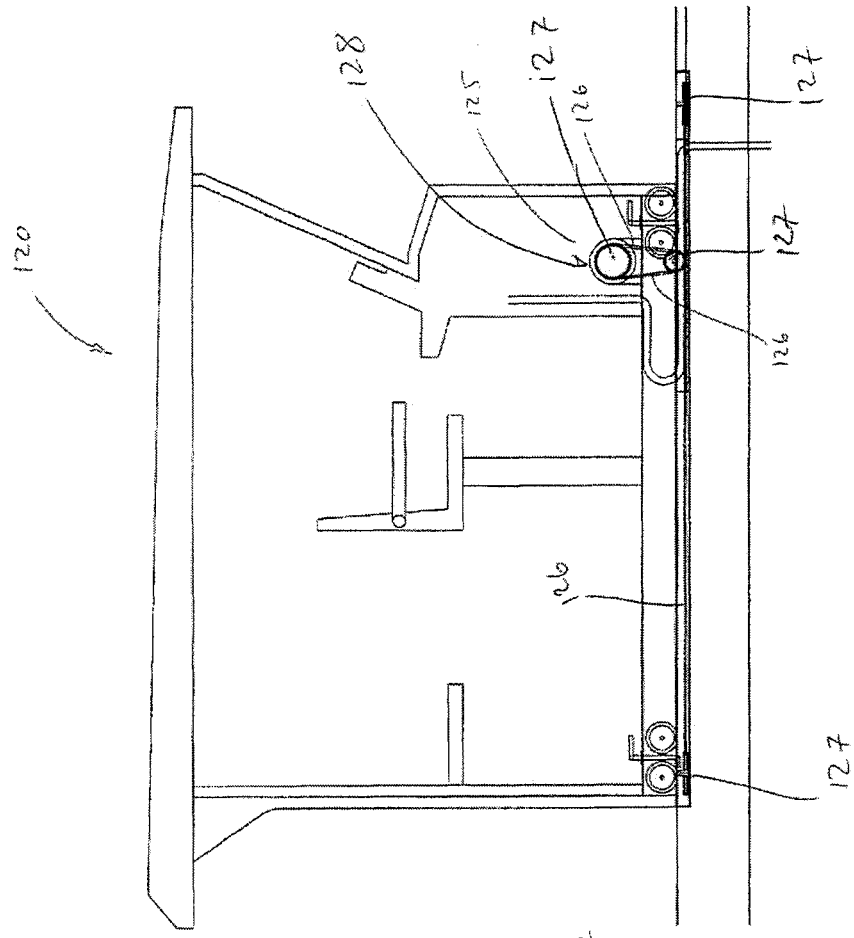
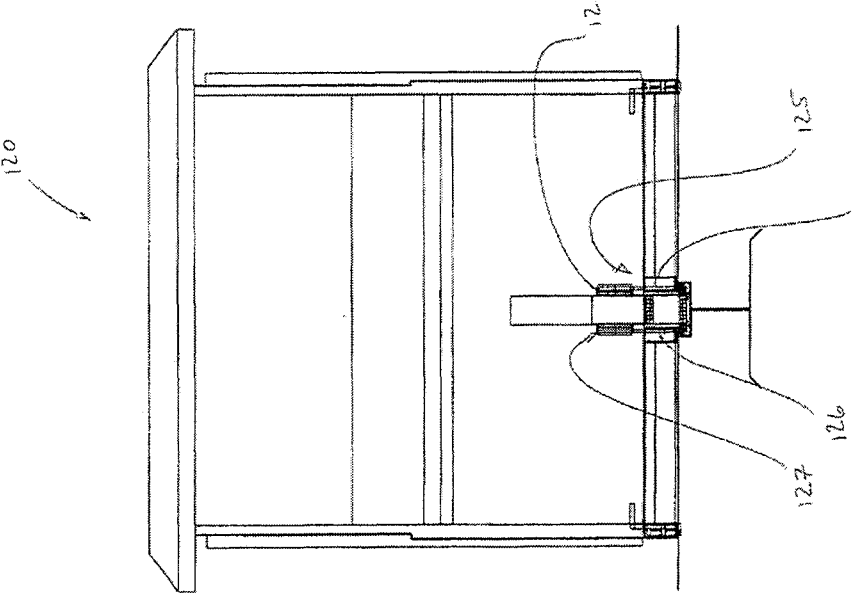
FIGURE 58B
FIGURE 58A

VESSEL

CROSS REFERENCE TO RELATED APPLICATIONS

This application is a continuation-in-part of International Patent Application No. PCT/IB2012/053313, filed Jun. 29, 2012, which claims priority to New Zealand Application Nos. 593829, filed Jun. 30, 2011 and 594876, filed Aug. 29, 2011, each of which is hereby incorporated by reference in their entirety.

TECHNICAL FIELD

The present invention relates to improvements in or relating to a vessel.

More particularly but not exclusively it relates to an amphibious vessel with deployable motive pods.

BACKGROUND OF THE INVENTION

Marine vessels are vehicles designed for transporting persons and/or goods over a body of water. Vessels are used for a variety of purposes such as recreation, fishing, or cargo transportation. Such vessels are normally designed optimally be for their particular application. In some situations it is desirable to have a vessel that is more versatile in that is can be used for more than one purpose. In such a situation it is beneficial that the vessel is designed and configured to suit all its intended purposes. Due to the specific nature of some applications, designing a vessel for multiple applications can be problematic. It is beneficial to have a vessel that is reconfigurable to more readily allow it to be configured for a variety of specific applications.

In some applications it is desirable to transport an auxiliary vehicle over a body of water. Traditionally this has been done using large ferries and barges with suitable loading ramps and/or doors. In some situations it is desirable that several vehicles can be transported on a smaller vessel.

So called landing craft are well known and have been used extensively through history for carrying small numbers of people and vehicles for deploying on land. Various systems are employed for allowing ingress and egress of vehicles and persons from such vessels such as ramps and/or doors. Some such landing craft, in addition to being waterborne, also include systems for allowing the vessel to move across land by means such as tracks or wheels. Many of such vessels were used for military applications and are configured for the specific purpose of deploying people on a piece of land, for example amphibious armoured personal carriers.

There is a need for a vessel suitable for carrying and deploying an auxiliary vehicle that is also suitable for other applications.

OBJECT OF THE INVENTION

It is an object of the present invention to provide a vessel capable of being reconfigured to improve its suitability for a variety of applications.

It is an alternative object of the present invention to provide improvements in or relating to vessels which overcomes or at least ameliorates some of the above-mentioned disadvantages or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In a further aspect the present invention may broadly be said to be an amphibious vessel comprising
at least one hull;
at least one or more deployable motive pods, each motive pod associated with a hull recess in the hull, and movable between
a deployed position in which the amphibious vessel is movable on the motive pods over land; and
a stowed position in which the motive pods are stowed for use while the amphibious vessel is travelling over water;
at least one or more deployment mechanisms configured for moving the one or more deployable motive pods between their deployed position and their stowed position, each deployment mechanism comprising
a horizontal translation mechanism configured to translate the motive pod in an athwartship direction between
a proximal condition in which the motive pod is at least partially received into recess; and
a distal condition in which the motive pod is located distally of the proximal condition;
a lowering mechanism for moving the motive pod between
a lower position in which the lowest point of the motive pod is lower than the hull, and
an upper position in which the motive pod is located in a position suitable for lateral movement into the hull recess.

Preferably, one deployment mechanism is associated with at each motive pod.

Preferably, each motive pod comprises at least one or more wheels.

Preferably, each motive pod comprises at least one or more track arrangements.

Preferably, the track arrangements comprises an endless track formation in which the wheels are movable.

Preferably, the lowering mechanism is configured to move a motive pod pivotally about a pivot axis.

Preferably, the hull presents at least a pair of sides with at least one hull recess extending into each of the sides.

Preferably, the amphibious vessel comprises a plurality of motive pod.

Preferably, a deployment mechanism is associated with each motive pod.

Alternately, one deployment mechanism is associated with a plurality of motive pods.

Preferably, at least one motive pod includes a track arrangement.

Preferably, each motive pod includes a track arrangement.

Preferably, the horizontal translation mechanism comprises a moving member movable on a track.

Preferably, the horizontal translation mechanism comprises a moving member linearly movable on a track arrangement.

Preferably, the track arrangement is a telescopic arrangement.

Preferably, the horizontal translation mechanism comprises a linear actuator.

Preferably, the linear actuator is a hydraulic ram.

Preferably, the moving member comprises at least one or more end stop formations for preventing the moving member moving off the ends of the track.

Preferably, the deployment mechanism comprises a locking mechanism for locking the moving member in position.

Preferably, the locking mechanism is operable from the deck of the vessel.

Preferably, the locking mechanism is manually operable from the deck of the vessel.

Preferably, the locking mechanism is manually operable from the deck of the vessel via at least one or more hatches.

Preferably, the lowering mechanism comprises an aligning mechanism for aligning the motive pod with the hull recess for movement into its stowed position as the lowering mechanism 250 is moving from its lower position to its upper position.

Preferably, the aligning mechanism is configured for aligning the motive pod in a suitable position for use in its deployed position as the lowering mechanism is moving from its upper position to its lower position.

Preferably, the aligning mechanism comprises
a stop member;
a sliding elongate member; and
a receiving formation configured for sliding connection with the sliding elongate member.

Preferably, the stop member is located on the linear actuator.

Preferably, the receiving formation is located on the pivot member, and is configured to receive the sliding elongate member through one selected from an aperture and a recess in a linearly sliding fashion.

Preferably, the receiving formation is connected to the pivot member in a pivoting fashion.

Preferably, the receiving formation is connected to the pivot member in a pivoting fashion by a pivoting joint.

Preferably, the sliding elongate member comprises a free end and a connected end.

Preferably, the free end of the sliding elongate member is received through the selected from an aperture and a recess of the receiving formation.

Preferably, the connected end of the sliding elongate member is pivotally connected to the motive pod.

Preferably, the pivot member is pivotably connected to the motive pod.

Preferably, the pivot member is pivotably connected to the motive pod by a pivot joint.

Preferably, the pivot member is pivotably connected to the motive pod asymmetrically, so that one side of the motive pod will hang downwardly under gravity when the motive pod is in its deployed position without contact with a floor surface.

Preferably, when the lowering mechanism is in its lower position, the sliding elongate member does not make contact with the stop member.

Preferably, as the lowering mechanism is moved towards it upper position from its lower position by pivoting of the pivot member, the free end of the sliding elongate member moves closer to the stop member.

Preferably, the free end of the sliding elongate member will make contact with the stop member as the lowering mechanism is moved towards it upper position, to thereby cause the motive pod to pivot about its pivot joint to align with the hull recess when the lowering mechanism is in its upper position.

Preferably, the lowering mechanism comprises a linear actuator for pivoting a pivot member about a pivot axis.

Preferably, the pivot axis is oriented horizontally.

Preferably, the pivot axis is oriented horizontally and substantially transversely to the length of the amphibious vessel.

Preferably, the linear actuator is a hydraulic ram.

Preferably, the one or more motive pods has an associated drive transmission for driving movement of at least one wheel of the motive pod.

Preferably, the amphibious vessel comprises a control system.

Preferably, the amphibious vessel comprises a control system for controlling the steering of the amphibious vehicle on land.

Preferably, the steering of the amphibious vehicle on land is controlled by controlling the drive to at least one wheel in a motive pod.

Preferably, the steering of the amphibious vehicle on land is controlled by controlling angular movement of at least one wheel in a motive pod.

Preferably, the control system controls the steering of the wheels by causing angular movement of at least one wheel in a motive pod.

Preferably, the control system is configured to control the drive to the set of motive pod.

Preferably, the control system is configured to control the drive to one or more track arrangements in a motive pod.

Preferably, the control system is controlled by a one or more selected from a steering wheel a joystick and foot pedals.

Preferably, the hull presents at least a pair of sides.

Preferably, one or more motive pods is associated with each side.

Preferably, the amphibious vessel comprises hull recess covers for at least partially covering the hull recesses at least when a motive pod is in its stowed position.

Preferably, the hull recess covers are configured to reduce drag on the amphibious vessel when the vessel is moving through water.

Preferably, the hull recess covers are movable by a moving mechanism between a covered position and an uncovered position.

Preferably, the moving mechanism is a pantographing mechanism.

The at least one hull may be a plurality of demi-hulls.

Preferably, the amphibious vessel comprises a pair of demi-hulls.

Preferably, at least one of the demi-hulls are fully formed.

Preferably, at least one of the demi-hulls are partly formed.

Preferably, the amphibious vessel comprises four hull recesses and a motive pod associated with each hull recess.

Preferably, the amphibious vessel comprises four hull recesses and a motive pod with a track arrangement associated with each hull recess.

Preferably, a pair of hull recesses are associated with each demi-hull.

Preferably, the pair of hull recesses present to an outer side of each demi-hull.

Preferably, a front hull recess and a rear hull recess is associated with each demi-hull.

The at least one hull may be a uni-hull.

Preferably, the uni-hull has at least one hull recess on each side.

Preferably, the uni-hull has a pair of hull recesses on each side.

Preferably, the hull recesses are disposed at least partially above the waterline of the amphibious vessel when the vessel is moving through water.

Preferably, the hull recesses are disposed above the waterline of the amphibious vessel when the vessel is moving through water, to thereby ensure that the motive pods are not submerged when the vessel is moving through water.

Preferably, the amphibious vessel comprises a flushing system for flushing water from a fresh water source through the hull recesses.

Preferably, the flushing system comprises connector formations for connecting the flushing system to a fresh water source.

Preferably, the connector formations is a hose connector.

Preferably, the flushing system comprises at least one or more nozzles suitable for spraying at least one motive pod with water from a fresh water source when a fresh water source is connected.

Preferably, the one or more motive pods are coupled to a hull structure on the amphibious vessel.

Preferably, at least one or more motive pods comprises a suspension arrangement for operably at least partially reducing forces acting on the hull structure by dissipating and/or damping the energy of forces acting on the motive pod.

Preferably, the suspension arrangement is selectable between
  an engaged condition in which the suspension arrangement is operable; and
  a disengaged condition in which suspension arrangement is not operable.

Preferably, when a motive pod is in its deployed position, the suspension arrangement is selectable between
  an engaged condition in which the suspension arrangement is operable; and
  a disengaged condition in which suspension arrangement is reduced in efficacy.

Preferably, when a motive pod is in its deployed position, the suspension arrangement is selectable between
  an engaged condition in which the suspension arrangement is operable; and
  a disengaged condition in which suspension arrangement is not operable.

Preferably, the suspension arrangement is selectable between its engaged and disengaged condition by movement of the horizontal translation mechanism.

Preferably, the horizontal translation mechanism is configured to move between a suspension engagement position in which the suspension arrangement is in its engaged condition, and a suspension disengagement position in which the suspension arrangement is in its disengaged condition.

Preferably, the suspension arrangement comprises a resilient member.

Preferably, the resilient member is a spring.

Preferably, the resilient member is an air spring.

Preferably, the movement of the horizontal translation mechanism to its engaged condition causes the coupling of the pivot member to a swing arm to thereby engage the suspension arrangement in its engaged condition.

Preferably, movement of the horizontal translation mechanism to its disengaged condition causes the decoupling of the pivot member to a swing arm to thereby disengage the suspension arrangement to its disengaged condition.

Preferably, when the suspension arrangement is in its engaged condition, the swing arm is caused to engage with the resilient member when the pivot member is pivoted in at least one direction.

Preferably the motive pods comprises a quick release mechanism, whereby the motive pods are at least partially disengageable from the deployment mechanism, to allow the motive pods to be manually manoeuvred from the hull recesses.

Preferably, the amphibious vessel further comprises
  a ramp arrangement extending between the demi-hulls,
    the ramp arrangement presenting an outer surface;
    the ramp arrangement being moveable at least between
      a retracted position in which the vessel is rendered seaworthy, and
      a deployed position in which the ramp arrangement facilitates ingress and egress from the vessel;
  wherein when the ramp arrangement is in its retracted position, the outer surface of the ramp arrangement is configured to complement the configuration of the partly formed demi-hulls to form a seaworthy outer hull configuration presenting a plurality of fully formed demi-hulls.

Preferably, when the ramp arrangement is in its retracted position, the outer surface of the ramp arrangement complements the configuration of the partly formed demi-hulls to present at least one or more wave piercing surfaces.

Preferably, at least one or more outer surfaces of the ramp arrangement will be coplanar with a surface of at least one of the partly formed demi-hulls when the ramp arrangement is in its retracted position.

Preferably, at least one or more outer surfaces of the ramp arrangement will be coplanar with a surface of both of the partly formed demi-hulls when the ramp arrangement is in its retracted position.

Preferably, the ramp arrangement presents a pathway for ingress and egress from the vessel in its deployed position.

Preferably, when the ramp arrangement is in its retracted position, the ramp arrangement interacts with the partly formed demi-hulls to present a waterproof outer hull.

Preferably, the ramp arrangement is movable between its retracted and its deployed position at least partially by pivotal movement.

Preferably, the ramp arrangement is movable between its retracted and its deployed position at least partially by pivotal movement about a pivoting arrangement.

Preferably, the ramp arrangement is movable between its retracted and its deployed position at least partially by pivotal movement about a pivoting arrangement at or towards a lower edge of the ramp arrangement.

Preferably, the ramp arrangement is movable between its retracted and its deployed position at least partially by linear movement.

Preferably, the ramp arrangement is movable between its retracted and its deployed position at least partially by linear movement of a slider arrangement.

Preferably, the ramp arrangement is movable between its retracted and its deployed position at least partially by linear movement at or towards a lower edge of the ramp arrangement.

Preferably, the ramp arrangement is at least partially planar in configuration.

Preferably, the ramp arrangement comprises demi-hull part formations for complementary engagement with the partly formed demi-hulls to present fully formed demi-hulls.

Preferably, in its deployed position, the ramp arrangement presents a substantially horizontal surface to facilitate ingress and egress from the vessel.

Preferably, in its deployed position, the ramp arrangement facilitate ingress and egress from the vessel by one or more selected from:
a vehicle;
a vessel;
a person; any
any other matter.

Preferably, the ramp arrangement comprises a plurality of sections movable relative to each other.

Preferably, the ramp arrangement comprises a bow section and a cover section.

Preferably, the demi-hull part formations extend from the bow section.

Preferably, the bow section and the cover section are pivotably movable relative to each other.

Preferably, the cover section and the bow section are configured to be movable relative to each other between a
folded position in which cover section is at an acute angle to the bow section; and
an aligned position in which the cover section and a the bow section present a substantially aligned pathway for ingress and egress to and from the vessel.

Preferably, the cover section and the bow section are configured to move to their folded position when the ramp arrangement is in its retracted position.

Preferably, the cover section and the bow section are configured to move to their aligned position when the ramp arrangement is in its deployed position.

Preferably, the cover section is configured to cover at least part of the bow of the vessel.

Preferably, the ramp arrangement seals against the bow of the vessel in its retracted position.

Preferably, the ramp arrangement in its deployed position is configured to extend to a position in which the foremost point of the ramp arrangement is below the water line of the vessel.

Preferably, the vessel is an amphibious vessel.

Preferably, the vessel comprises at least one set of deployable wheels.

Preferably, the vessel comprises a plurality of sets of deployable wheels.

Preferably, at least one set of deployable wheels is associated with a track arrangement.

Preferably, each set of deployable wheels are associated with a track arrangement.

Preferably, the vessel comprises a deck, and the lower edge of said bow section is located substantially in line with the deck.

Preferably, at least one of the demi-hulls comprises an upper surface.

Preferably, at least one of the demi-hulls comprises an upper surface, thereby enclosing an enclosed region within the demi-hull.

Preferably, the enclosed region is water tight.

Preferably, each demi-hull comprises an upper surface enclosing a watertight enclosed region.

Preferably, the vessel comprises a deck extending between the demi hulls.

Preferably, at least one of the demi-hulls comprises a recess in its upper extending at least partially into its upper surface, and aligned with the level of the deck to thereby increase the deck width of the vessel.

Preferably, the width of the pathway provided by the ramp arrangement in its deployed position is wider than the deck.

Preferably, the width of the pathway provided by the ramp arrangement in its deployed position is wider than the deck, and equal to or smaller than the extended deck width of the vessel.

Preferably, the vessel comprises at least one super structure configured to at least in part translate relative to one or more of said demi-hull between a first condition and at least one other position (herein after "second condition"),
wherein said at least one superstructure in said first condition at least in part defines a first zone suitable for accommodating at least one person and/or vehicle,
and wherein said at least one superstructure in said second condition at least in part defines a second zone suitable for accommodating at least one person and/or vehicle.

Preferably, the translatable superstructure is a pilot housing.

Preferably, the superstructure is movable by a superstructure moving mechanism.

Preferably, the superstructure is movable by a superstructure moving mechanism that extends along the centre line of the vessel.

Preferably, the superstructure moving mechanism comprises a chain that is engaged by at least one or more cogs.

Preferably, the superstructure moving mechanism comprises a chain in an endless loop, that is engaged by a pair of oppositely moving cogs.

In a further aspect the present invention may broadly be said to be a method of deploying a wheel from an amphibious vessels hull, comprising the steps of
translating the wheel in an athwartship direction; and
pivoting the wheel downwardly about a substantially horizontal pivot axis.

Preferably, the wheel is a set of wheels.

Preferably, the set of wheels includes a track arrangement.

The moving of each wheel in an athwartship direction may be by linear motion.

Alternately, movement of each wheel in an athwartship direction may be by pivoting motion about a substantially vertical pivot axis.

Also herein described is a vessel comprising:
a hull,
at least one super structure configured to at least in part translate relative to said hull between a first position and at least one other position (herein after "second condition"),
wherein said at least one superstructure in said first condition at least in part defines a first zone suitable for accommodating at least one person and/or vehicle,
and wherein said at least one superstructure in said second condition at least in part defines a second zone suitable for accommodating at least one person and/or vehicle.

Preferably the at least one superstructure at least in part separates the first and second zones.

Preferably the vessel's centre of mass is aft of mid-ship in the first condition and forward of mid-ship in the second position.

Alternatively the vessel includes a balancing means suitable for ensuring the vessel's centre of mass remains substantially constant.

Preferably the centre of mass is maintained proximate an axis extending vertically through the centroid of the vessel.

Preferably the vessel has a deck.

Preferably the at least one superstructure is at least in part supported on said deck.

Preferably the at least one superstructure at least in part forms a housing.

Preferably the housing is configured to accommodate at least one person.

Preferably the housing includes one or more means for controlling the vessel's movement.

Preferably the superstructure is a combination of any one or more of the following,
 a pilot housing,
 a cabin, and
 a structure supporting and/or enclosing the helm.

Preferably the at least one super structure is configured to at least in parr translate along an axis.

Preferably the axis extends between the bow and stem of the vessel.

Preferably the axis is parallel the longitudinal direction of the vessel.

Preferably the first and second zones are at least in part defined on the deck.

Preferably the first zone is located more proximate the bow of the vessel than the second zone.

Preferably the first zone is located at or proximate the bow of the vessel.

Preferably the vessel includes a ramp and/or door (hereinafter "ramp").

Preferably the ramp is located proximate the bow of the vessel.

Alternatively the ramp is located proximate the stern of the vessel.

Preferably the ramp is configured to facilitate ingress and/or egress of persons and/or matter from the vessel.

Preferably the ramp is configured to facilitate ingress and/or egress of persons and/or matter from the first zone.

Preferably the ramp is configured to allow ingress and/or egress of persons and/or matter from the second zone.

Preferably the ramp forms part of the hull.

Preferably the ramp forms part of the bow of the hull.

Preferably the vessel is amphibious.

Preferably the vessel includes tracks suitable for supporting and transporting the vessel over land.

Preferably the tracks are deployable from a retracted position within the vessel's hull.

Preferably the first zone is fully defined when the superstructure is in said first condition and the second zone is fully defined when the superstructure is in the second condition.

Preferably the first and second zones are partially defined when said superstructure is between said first and second conditions.

Preferably any superstructure and/or zone configured to accommodate at least one person and/or vehicle is also suitable for accommodating alternative cargo and/or goods.

Preferably, the vessel further comprises
 a ramp arrangement extending between the demi-hulls,
  the ramp arrangement presenting an outer surface;
  the ramp arrangement being moveable at least between
   a retracted position in which the vessel is rendered seaworthy, and
   a deployed position in which the ramp arrangement facilitates ingress and egress from the vessel;
  wherein when the ramp arrangement is in its retracted position, the outer surface of the ramp arrangement is configured to complement the configuration of the partly formed demi-hulls to form a seaworthy outer hull configuration presenting a plurality of fully formed demi-hulls.

Preferably, when the ramp arrangement is in its retracted position, the outer surface of the ramp arrangement complements the configuration of the partly formed demi-hulls to present at least one or more wave piercing surfaces.

Preferably, at least one or more outer surfaces of the ramp arrangement will be coplanar with a surface of at least one of the partly formed demi-hulls when the ramp arrangement is in its retracted position.

Preferably, at least one or more outer surfaces of the ramp arrangement will be coplanar with a surface of both of the partly formed demi-hulls when the ramp arrangement is in its retracted position.

Preferably, the ramp arrangement presents a pathway for ingress and egress from the vessel in its deployed position.

Preferably, when the ramp arrangement is in its retracted position, the ramp arrangement interacts with the partly formed demi-hulls to present a waterproof outer hull.

Preferably, the ramp arrangement is movable between its retracted and its deployed position at least partially by pivotal movement.

Preferably, the ramp arrangement is movable between its retracted and its deployed position at least partially by pivotal movement about a pivoting arrangement.

Preferably, the ramp arrangement is movable between its retracted and its deployed position at least partially by pivotal movement about a pivoting arrangement at or towards a lower edge of the ramp arrangement.

Preferably, the ramp arrangement is movable between its retracted and its deployed position at least partially by linear movement.

Preferably, the ramp arrangement is movable between its retracted and its deployed position at least partially by linear movement of a slider arrangement.

Preferably, the ramp arrangement is movable between its retracted and its deployed position at least partially by linear movement at or towards a lower edge of the ramp arrangement.

Preferably, the ramp arrangement is at least partially planar in configuration.

Preferably, the ramp arrangement comprises demi-hull part formations for complementary engagement with the partly formed demi-hulls to present fully formed demi-hulls.

Preferably, in its deployed position, the ramp arrangement presents a substantially horizontal surface to facilitate ingress and egress from the vessel.

Preferably, in its deployed position, the ramp arrangement facilitate ingress and egress from the vessel by one or more selected from:
 a vehicle;
 a vessel;
 a person; any
 any other matter.

Preferably, the ramp arrangement comprises a plurality of sections movable relative to each other.

Preferably, the ramp arrangement comprises a bow section and a cover section.

Preferably, the demi-hull part formations extend from the bow section.

Preferably, the bow section and the cover section are pivotably movable relative to each other.

Preferably, the cover section and the bow section are configured to be movable relative to each other between a
 folded position in which cover section is at an acute angle to the bow section; and
 an aligned position in which the cover section and a the bow section present a substantially aligned pathway for ingress and egress to and from the vessel.

Preferably, the cover section and the bow section are configured to move to their folded position when the ramp arrangement is in its retracted position.

Preferably, the cover section and the bow section are configured to move to their aligned position when the ramp arrangement is in its deployed position.

Preferably, the cover section is configured to cover at least part of the bow of the vessel.

Preferably, the ramp arrangement seals against the bow of the vessel in its retracted position.

Preferably, the ramp arrangement in its deployed position is configured to extend to a position in which the foremost point of the ramp arrangement is below the water line of the vessel.

Preferably, the vessel is an amphibious vessel.

Preferably, the vessel comprises at least one set of deployable wheels.

Preferably, the vessel comprises a plurality of sets of deployable wheels.

Preferably, at least one set of deployable wheels is associated with a track arrangement.

Preferably, each set of deployable wheels are associated with a track arrangement.

Preferably, the vessel comprises a deck, and the lower edge of said bow section is located substantially in line with the deck.

Preferably, at least one of the demi-hulls comprises an upper surface.

Preferably, at least one of the demi-hulls comprises an upper surface, thereby enclosing an enclosed region within the demi-hull.

Preferably, the enclosed region is water tight.

Preferably, each demi-hull comprises an upper surface enclosing a watertight enclosed region.

Preferably, the vessel comprises a deck extending between the demi hulls.

Preferably, at least one of the demi-hulls comprises a recess in its upper extending at least partially into its upper surface, and aligned with the level of the deck to thereby increase the deck width of the vessel.

Preferably, the width of the pathway provided by the ramp arrangement in its deployed position is wider than the deck.

Preferably, the width of the pathway provided by the ramp arrangement in its deployed position is wider than the deck, and equal to or smaller than the extended deck width of the vessel.

Preferably, the amphibious vessel comprises at least one or more deployable motive pods, each motive pod being associated with a hull recess in the hull, and movable between
 a deployed position in which the amphibious vessel is movable on the motive pods over land; and
 a stowed position in which the motive pod are stowed for use while the amphibious vessel is travelling over water;

at least one or more deployment mechanisms configured for moving the motive pod between their deployed position and their stowed position, each deployment mechanism associated with at least one motive pod and comprising
 a horizontal translation mechanism configured to move the motive pod between
  a proximal condition in which the motive pod is at least partially received into recess; and
  a distal condition in which the motive pod is located distally of the proximal condition;
 a lowering mechanism for moving the motive pod between
  a lower position in which the lowest point of the motive pod is lower than the hull, and
  an upper position in which the motive pod is located in a position suitable for lateral movement into the hull recess.

Preferably, each motive pod comprises one or more wheels.

Preferably, the each motive pod comprises an associated track arrangement.

Preferably, each track arrangement comprises an endless track formation.

Preferably, the lowering mechanism is configured to move a motive pod pivotally about a pivot axis.

Preferably, the hull presents at least a pair of sides with at least one hull recess extending into each of the sides.

Preferably, the amphibious vessel comprises a plurality of motive pods.

Preferably, the amphibious vessel comprises at least one or more deployment mechanisms.

Preferably, a deployment mechanism is associated with each motive pod.

Alternately, one deployment mechanism is associated with a plurality of motive pods.

Preferably, at least one motive pod includes a track arrangement.

Preferably, each motive pod includes a track arrangement.

Preferably, the horizontal translation mechanism comprises a moving member movable on a track.

Preferably, the horizontal translation mechanism comprises a moving member linearly movable on a track arrangement.

Preferably, the track arrangement is a telescopic arrangement.

Preferably, the horizontal translation mechanism comprises a linear actuator.

Preferably, the linear actuator is a hydraulic ram.

Preferably, the lowering mechanism comprises a linear actuator for pivoting a pivot member about a pivot axis.

Preferably, the pivot axis is oriented horizontally.

Preferably, the pivot axis is oriented horizontally and substantially transversely to the length of the amphibious vessel.

Preferably, the linear actuator is a hydraulic ram.

Preferably the pivot member is able to locate against the hull in the deployed condition.

Preferably the pivot member is able to bear against the hull or an extension thereof in the deployed condition.

Preferably the pivot member is able to register with a registration feature of or secured to the hull when in the deployed position, in order to be held thereby in a fixed lateral position relative the hull.

Preferably the registration feature is fixed relative the hull.

Preferably the registration feature is fixed moveable relative the hull.

Preferably, the moving member comprises one or more end stop formations for preventing the moving member moving off the ends of the guide arrangement.

Preferably, the deployment mechanism comprises a locking mechanism for locking the moving member in position.

Preferably, the locking mechanism is operable from the deck of the vessel.

Preferably, the locking mechanism is manually operable from the deck of the vessel.

Preferably, the locking mechanism is manually operable from the deck of the vessel via at least one or more hatches.

Preferably, the lowering mechanism comprises an aligning mechanism for aligning the motive pod with the hull recess for movement into its stowed position as the lowering mechanism 250 is moving from its lower position to its upper position.

Preferably, the aligning mechanism is configured for aligning the motive pod in a suitable position for use in its deployed position as the lowering mechanism is moving from its upper position to its lower position.

Preferably, the aligning mechanism comprises
a stop member,
a sliding elongate member; and
a receiving formation configured for sliding connection with the sliding elongate member.

Preferably, the stop member is located on the linear actuator.

Preferably, the receiving formation is located on the pivot member, and is configured to receive the sliding elongate member through one selected from an aperture and a recess in a linearly sliding fashion.

Preferably, the receiving formation is connected to the pivot member in a pivoting fashion.

Preferably, the receiving formation is connected to the pivot member in a pivoting fashion by a pivoting joint.

Preferably, the sliding elongate member comprises a free end and a connected end.

Preferably, the free end of the sliding elongate member is received through the selected from an aperture and a recess of the receiving formation.

Preferably, the connected end of the sliding elongate member is pivotally connected to the motive pod.

Preferably, the pivot member is pivotably connected to the motive pod.

Preferably, the pivot member is pivotably connected to the motive pod by a pivot joint.

Preferably, the pivot member is pivotably connected to the motive pod asymmetrically, so that one side of the motive pod will hang downwardly under gravity when the motive pod is in its deployed position without contact with a floor surface.

Preferably, when the lowering mechanism is in its lower position, the sliding elongate member does not make contact with the stop member.

Preferably, as the lowering mechanism is moved towards it upper position from its lower position by pivoting of the pivot member, the free end of the sliding elongate member moves closer to the stop member.

Preferably, the free end of the sliding elongate member will make contact with the stop member as the lowering mechanism is moved towards it upper position, to thereby cause the motive pod to pivot about its pivot joint to align with the hull recess when the lowering mechanism is in its upper position.

Preferably, the one or more motive pods has an associated drive transmission for driving movement of at least one wheel of the motive pods.

Preferably, the amphibious vessel comprises a control system.

Preferably, the amphibious vessel comprises a control system for controlling the steering of the amphibious vehicle on land.

Preferably, the steering of the amphibious vehicle on land is controlled by controlling the drive to at least one wheel in a motive pod.

Preferably, the steering of the amphibious vehicle on land is controlled by controlling angular movement of at least one wheel in a motive pod.

Preferably, the control system controls the steering of the wheels by causing angular movement of at least one wheel in a motive pod.

Preferably, the control system is configured to control the drive to the motive pod.

Preferably, the control system is configured to control the drive to one or more track arrangements in a motive pod.

Preferably, the control system is controlled by one or more selected from a steering wheel a joystick and foot pedals.

Preferably, the hull presents at least a pair of sides.

Preferably, a motive pod is associated with each side.

Preferably, the amphibious vessel comprises hull recess covers for at least partially covering the hull recesses at least when a motive pods are in their stowed position.

Preferably, the hull recess covers are configured to reduce drag on the amphibious vessel when the vessel is moving through water.

Preferably, the hull recess covers are movable by a moving mechanism between a covered position and an uncovered position.

Preferably, the moving mechanism is a pantographing mechanism.

The at least one hull may be a plurality of demi-hulls.

Preferably, the amphibious vessel comprises a pair of demi-hulls.

Preferably, at least one of the demi-hulls are fully formed.

Preferably, at least one of the demi-hulls are partly formed.

Preferably, the amphibious vessel comprises four hull recesses and a motive pod associated with each hull recess.

Preferably, the amphibious vessel comprises four hull recesses and a motive pod with a track arrangement associated with each hull recess.

Preferably, a pair of hull recesses are associated with each demi-hull.

Preferably, the pair of hull recesses present to an outer side of each demi-hull.

Preferably, a front hull recess and a rear hull recess is associated with each demi-hull.

The at least one hull may be a uni-hull.

Preferably, the uni-hull has at least one hull recess on each side.

Preferably, the uni-hull has a pair of hull recesses on each side.

Preferably, the hull recesses are disposed at least partially above the waterline of the amphibious vessel when the vessel is moving through water.

Preferably, the hull recesses are disposed above the waterline of the amphibious vessel when the vessel is moving through water, to thereby ensure that the motive pods are not submerged when the vessel is moving through water.

Preferably, the amphibious vessel comprises a flushing system for flushing water from a fresh water source through at least one or more hull recesses.

Preferably, the flushing system comprises connector formations for connecting the flushing system to a fresh water source.

Preferably, the connector formations is a hose connector.

Preferably, the flushing system comprises at least one or more nozzles suitable for spraying the inside of at least hull recess with water from a fresh water source when a fresh water source is connected.

Preferably, the motive pods are coupled to hull structure on the amphibious vessel.

Preferably, at least one motive pod comprises a suspension arrangement for operably at least partially reducing forces acting on the hull structure by dissipating the energy of forces acting on the motive pod.

Preferably, the suspension arrangement is selectable between
- an engaged condition in which the suspension arrangement is operable; and
- a disengaged condition in which suspension arrangement is not operable.

Preferably, when the motive pods are in their deployed position, the suspension arrangement is selectable between
- an engaged condition in which the suspension arrangement is operable; and
- a disengaged condition in which suspension arrangement is reduced in efficacy.

Preferably, when the motive pods are in their deployed position, the suspension arrangement is selectable between
- an engaged condition in which the suspension arrangement is operable; and
- a disengaged condition in which suspension arrangement is not operable.

Preferably, the suspension arrangement is selectable between its engaged and disengaged condition by movement of the horizontal translation mechanism.

Preferably, the horizontal translation mechanism is configured to move between a suspension engagement position in which the suspension arrangement is in its engaged condition, and a suspension disengagement position in which the suspension arrangement is in its disengaged condition.

Preferably, the suspension arrangement comprises a resilient member.

Preferably, the resilient member is a spring.

Preferably, the resilient member is an air spring.

Preferably, the movement of the horizontal translation mechanism to its engaged condition causes the coupling of the pivot member to a swing arm to thereby engage the suspension arrangement in its engaged condition.

Preferably, movement of the horizontal translation mechanism to its disengaged condition causes the decoupling of the pivot member to a swing arm to thereby disengage the suspension arrangement to its disengaged condition.

Preferably, when the suspension arrangement is in its engaged condition, the swing arm is caused to engage with the resilient member when the pivot member is pivoted in at least one direction.

Preferably the motive pods comprises a quick release mechanism, whereby the motive pods are at least partially disengageable from the deployment mechanism, to allow the motive pods to be manually manoeuvred from the hull recesses. Preferably, the superstructure is movable by a superstructure moving mechanism.

Preferably, the superstructure is movable by a superstructure moving mechanism that extends along the centre line of the vessel.

Preferably, the superstructure moving mechanism comprises a chain that is engaged by at least one or more cogs.

Preferably, the superstructure moving mechanism comprises a chain in an endless loop, that is engaged by a pair of oppositely moving cogs.

Also herein described is a superstructure suitable for mounting on a vessel, the superstructure comprising:
- at least one member configured to at least in part translate relative to a vessels hull between a first condition and at least one other condition (herein after "second condition"), wherein said at least one member in said first condition at least in part defines a first zone in said vessel suitable for accommodating at least one person and/or vehicle, and wherein said at least one member in said second condition at least in part defines a second zone in said vessel suitable for accommodating at least one person and/or vehicle.

Preferably said superstructure is configured to allow it to be retro fitted to an existing vessel.

Also herein described is a vessel comprising.
- a hull,
- a deck,
- first and second zones at least in part defined on said deck,
- said first and second zones separated at least in part by a superstructure configured to translate between a first and second position.

Preferably the first zone is defined when said superstructure is in said first condition and said second zone is defined when said superstructure is in said second condition.

Preferably said second zone ceases to be or is only partially defined when said superstructure is in said first condition.

Preferably said first zone ceases to be or is only partially defined when said superstructure is in said second condition.

Preferably said the definition of said first and second zones is variably dependent on the relative position of the superstructure between the first and second conditions.

Also herein described is a vessel comprising:
- any one or more of the following superstructures
- a pilot housing
- a cabin
- a structure supporting and or enclosing the helm
- wherein said any one or more superstructures can translate relative to the hull.

Also herein described is a method of configuring a vessel comprising the step of: translating a superstructure of the vessel as herein previously described between the first or second condition and the other of said first or second condition to thereby define the first or second zones.

Preferably said method of configuring the vessel comprises the further steps of deploying a vehicle and or passengers from said first or second zones.

Also herein described is a vessel comprising
- a plurality of partly formed demi-hulls,
- a ramp arrangement extending between the demi-hulls,
  - the ramp arrangement presents an outer surface;
  - the ramp arrangement being moveable at least between
    - a retracted position in which the vessel is rendered seaworthy, and
    - a deployed position in which the ramp arrangement facilitates ingress and egress from the vessel;
  - wherein when the ramp arrangement is in its retracted position, the outer surface of the ramp arrangement is configured to complement the configuration of the partly formed demi-hulls to form outer hull configuration presenting a plurality of seaworthy fully formed demi-hulls.

Preferably, when the ramp arrangement is in its retracted position, the outer surface of the ramp arrangement complements the configuration of the partly formed demi-hulls to present at least one or more wave piercing surfaces.

Preferably, at least one or more outer surfaces of the ramp arrangement will be coplanar with a surface of at least one of the partly formed demi-hulls when the ramp arrangement is in its retracted position.

Preferably, at least one or more outer surfaces of the ramp arrangement will be coplanar with a surface of both of the partly formed demi-hulls when the ramp arrangement is in its retracted position.

Preferably, the ramp arrangement presents a pathway for ingress and egress from the vessel in its deployed position.

Preferably, when the ramp arrangement is in its retracted position, the ramp arrangement interacts with the partly formed demi-hulls to present a waterproof outer hull.

Preferably, the ramp arrangement is movable between its retracted and its deployed position at least partially by pivotal movement.

Preferably, the ramp arrangement is movable between its retracted and its deployed position at least partially by pivotal movement about a pivoting arrangement.

Preferably, the ramp arrangement is movable between its retracted and its deployed position at least partially by pivotal movement about a pivoting arrangement at or towards a lower edge of the ramp arrangement.

Preferably, the ramp arrangement is movable between its retracted and its deployed position at least partially by linear movement.

Preferably, the ramp arrangement is movable between its retracted and its deployed position at least partially by linear movement of a slider arrangement.

Preferably, the ramp arrangement is movable between its retracted and its deployed position at least partially by linear movement at or towards a lower edge of the ramp arrangement.

Preferably, the ramp arrangement is at least partially planar in configuration.

Preferably, the ramp arrangement comprises demi-hull part formations for complementary engagement with the partly formed demi-hulls to present fully formed demi-hulls.

Preferably, in its deployed position, the ramp arrangement presents a substantially horizontal surface to facilitate ingress and egress from the vessel.

Preferably, in its deployed position, the ramp arrangement facilitate ingress and egress from the vessel by one or more selected from:
  a vehicle;
  a vessel;
  a person; any
  any other matter.

Preferably, the ramp arrangement comprises a plurality of sections movable relative to each other.

Preferably, the ramp arrangement comprises a bow section and a cover section.

Preferably, the demi-hull part formations extend from the bow section.

Preferably, the bow section and the cover section are pivotably movable relative to each other.

Preferably, the cover section and the bow section are configured to be movable relative to each other between a
  folded position in which cover section is at an acute angle to the bow section; and
  an aligned position in which the cover section and a the bow section present a substantially aligned pathway for ingress and egress to and from the vessel.

Preferably, the cover section and the bow section are configured to move to their folded position when the ramp arrangement is in its retracted position.

Preferably, the cover section and the bow section are configured to move to their aligned position when the ramp arrangement is in its deployed position.

Preferably, the cover section is configured to cover at least part of the bow of the vessel.

Preferably, the ramp arrangement seals against the bow of the vessel in its retracted position.

Preferably, the ramp arrangement in its deployed position is configured to extend to a position in which the foremost point of the ramp arrangement is below the water line of the vessel.

Preferably, the vessel is an amphibious vessel.

Preferably, the vessel comprises at least one set of deployable motive pods.

Preferably, the vessel comprises a plurality of motive pods.

Preferably, at least one motive pod includes a track arrangement.

Preferably, each motive pod includes a track arrangement.

Preferably, the vessel comprises a deck, and the lower edge of said bow section is located substantially in line with the deck.

Preferably, at least one of the demi-hulls comprises an upper surface.

Preferably, at least one of the demi-hulls comprises an upper surface, thereby enclosing an enclosed region within the demi-hull.

Preferably, the enclosed region is water tight.

Preferably, each demi-hull comprises an upper surface enclosing a watertight enclosed region.

Preferably, the vessel comprises a deck extending between the demi hulls.

Preferably, at least one of the demi-hulls comprises a recess in its upper extending at least partially into its upper surface, and aligned with the level of the deck to thereby increase the deck width of the vessel.

Preferably, the width of the pathway provided by the ramp arrangement in its deployed position is wider than the deck.

Preferably, the width of the pathway provided by the ramp arrangement in its deployed position is wider than the deck, and equal to or smaller than the extended deck width of the vessel.

Preferably, the vessel comprises at least one super structure configured to at least in part translate relative to one or more of said demi-hull between a first condition and at least one other position (herein after "second condition"),
  wherein said at least one superstructure in said first condition at least in part defines a first zone suitable for accommodating at least one person and/or vehicle,
  and wherein said at least one superstructure in said second condition at least in part defines a second zone suitable for accommodating at least one person and/or vehicle.

Preferably, the translatable superstructure is a pilot housing.

Preferably, the vessel comprises
  at least one or more deployable motive pods, each wheel associated with a hull recess in the hull, and movable between
    a deployed position in which the amphibious vessel is movable on the motive pods over land; and
    a stowed position in which the motive pods are stowed for use while the amphibious vessel is travelling over water;
  at least one or more deployment mechanisms configured for moving the motive pods between their deployed position and their stowed position, each deployment mechanism being associated with at least one motive pod and comprising
    a horizontal translation mechanism configured to move the motive pod between
      a proximal condition in which the motive pod is at least partially received into recess; and a distal condition in which the motive pod is located distally of the proximal condition;

a lowering mechanism for moving the motive pod between a lower position in which the lowest point of the wheel is lower than the hull, and an upper position in which the motive pod is located in a position suitable for lateral movement into the hull recess.

Preferably, each motive pod comprises at least one or more wheels.

Preferably, each motive pod comprises at least one or more track arrangements.

Preferably, the track arrangements comprises an endless track formation in which the wheels are movable.

Preferably, the lowering mechanism is configured to move a motive pod pivotally about a pivot axis.

Preferably, the hull presents at least a pair of sides with at least one hull recess extending into each of the sides.

Preferably, the amphibious vessel comprises a plurality of motive pod.

Preferably, a deployment mechanism is associated with each motive pod.

Alternately, one deployment mechanism is associated with a plurality of motive pods.

Preferably, at least one motive pod includes a track arrangement.

Preferably, each motive pod includes a track arrangement.

Preferably, the horizontal translation mechanism comprises a moving member movable on a track.

Preferably, the horizontal translation mechanism comprises a moving member linearly movable on a track arrangement.

Preferably, the track arrangement is a telescopic arrangement.

Preferably, the horizontal translation mechanism comprises a linear actuator.

Preferably, the linear actuator is a hydraulic ram.

Preferably, the lowering mechanism comprises a linear actuator for pivoting a pivot member about a pivot axis.

Preferably, the pivot axis is oriented horizontally.

Preferably, the pivot axis is oriented horizontally and substantially transversely to the length of the amphibious vessel.

Preferably, the linear actuator is a hydraulic ram.

Preferably, the moving member comprises end stop formations for preventing the moving member moving off the ends of the track.

Preferably, the deployment mechanism comprises a locking mechanism for locking the moving member in position.

Preferably, the locking mechanism is operable from the deck of the vessel.

Preferably, the locking mechanism is manually operable from the deck of the vessel.

Preferably, the locking mechanism is manually operable from the deck of the vessel via at least one or more hatches.

Preferably, the lowering mechanism comprises an aligning mechanism for aligning the motive pod with the hull recess for movement into its stowed position as the lowering mechanism 250 is moving from its lower position to its upper position.

Preferably, the aligning mechanism is configured for aligning the motive pod in a suitable position for use in its deployed position as the lowering mechanism is moving from its upper position to its lower position.

Preferably, the aligning mechanism comprises a stop member;

a sliding elongate member; and a receiving formation configured for sliding connection with the sliding elongate member.

Preferably, the stop member is located on the linear actuator.

Preferably, the receiving formation is located on the pivot member, and is configured to receive the sliding elongate member through one selected from an aperture and a recess in a linearly sliding fashion.

Preferably, the receiving formation is connected to the pivot member in a pivoting fashion.

Preferably, the receiving formation is connected to the pivot member in a pivoting fashion by a pivoting joint.

Preferably, the sliding elongate member comprises a free end and a connected end.

Preferably, the free end of the sliding elongate member is received through the selected from an aperture and a recess of the receiving formation.

Preferably, the connected end of the sliding elongate member is pivotally connected to the motive pod.

Preferably, the pivot member is pivotably connected to the motive pod.

Preferably, the pivot member is pivotably connected to the motive pod by a pivot joint.

Preferably, the pivot member is pivotably connected to the motive pod asymmetrically, so that one side of the motive pod will hang downwardly under gravity when the motive pod is in its deployed position without contact with a floor surface.

Preferably, when the lowering mechanism is in its lower position, the sliding elongate member does not make contact with the stop member.

Preferably, as the lowering mechanism is moved towards it upper position from its lower position by pivoting of the pivot member, the free end of the sliding elongate member moves closer to the stop member.

Preferably, the free end of the sliding elongate member will make contact with the stop member as the lowering mechanism is moved towards it upper position, to thereby cause the motive pod to pivot about its pivot joint to align with the hull recess when the lowering mechanism is in its upper position.

Preferably, the one or more motive pods has an associated drive transmission for driving movement of at least one wheel of the motive pod.

Preferably, the amphibious vessel comprises a control system.

Preferably, the amphibious vessel comprises a control system for controlling the steering of the amphibious vehicle on land.

Preferably, the steering of the amphibious vehicle on land is controlled by controlling the drive to at least one wheel in a motive pod.

Preferably, the steering of the amphibious vehicle on land is controlled by controlling angular movement of at least one wheel in a motive pod.

Preferably, the control system controls the steering of the wheels by causing angular movement of at least one wheel in a motive pod.

Preferably, the control system is configured to control the drive to the set of motive pod.

Preferably, the control system is configured to control the drive to one or more track arrangements in a motive pod.

Preferably, the control system is controlled by a one or more selected from a steering wheel a joystick and foot pedals.

Preferably, the hull presents at least a pair of sides.

Preferably, one or more motive pods is associated with each side.

Preferably, the amphibious vessel comprises hull recess covers for at least partially covering the hull recesses at least when a motive pod is in its stowed position.

Preferably, the hull recess covers are configured to reduce drag on the amphibious vessel when the vessel is moving through water.

Preferably, the hull recess covers are movable by a moving mechanism between a covered position and an uncovered position.

Preferably, the moving mechanism is a pantographing mechanism.

The at least one hull may be a plurality of demi-hulls.

Preferably, the amphibious vessel comprises a pair of demi-hulls.

Preferably, at least one of the demi-hulls are fully formed.

Preferably, at least one of the demi-hulls are partly formed.

Preferably, the amphibious vessel comprises four hull recesses and a motive pod associated with each hull recess.

Preferably, the amphibious vessel comprises four hull recesses and a motive pod with a track arrangement associated with each hull recess.

Preferably, a pair of hull recesses are associated with each demi-hull.

Preferably, the pair of hull recesses present to an outer side of each demi-hull.

Preferably, a front hull recess and a rear hull recess is associated with each demi-hull.

The at least one hull may be a uni-hull.

Preferably, the uni-hull has at least one hull recess on each side.

Preferably, the uni-hull has a pair of hull recesses on each side.

Preferably, the hull recesses are disposed at least partially above the waterline of the amphibious vessel when the vessel is moving through water.

Preferably, the hull recesses are disposed above the waterline of the amphibious vessel when the vessel is moving through water, to thereby ensure that the motive pods are not submerged when the vessel is moving through water.

Preferably, the amphibious vessel comprises a flushing system for flushing water from a fresh water source through the hull recesses.

Preferably, the flushing system comprises connector formations for connecting the flushing system to a fresh water source.

Preferably, the connector formations is a hose connector.

Preferably, the flushing system comprises at least one or more nozzles suitable for spraying at least one wheel with water from a fresh water source when a fresh water source is connected.

Preferably, the one or more motive pods are coupled to a hull structure on the amphibious vessel.

Preferably, at least one or more motive pods comprises a suspension arrangement for operably at least partially reducing forces acting on the hull structure by dissipating and/or damping the energy of forces acting on the motive pod.

Preferably, the suspension arrangement is selectable between
- an engaged condition in which the suspension arrangement is operable; and
- a disengaged condition in which suspension arrangement is not operable.

Preferably, when a motive pod is in its deployed position, the suspension arrangement is selectable between
- an engaged condition in which the suspension arrangement is operable; and
- a disengaged condition in which suspension arrangement is reduced in efficacy.

Preferably, when a motive pod is in its deployed position, the suspension arrangement is selectable between
- an engaged condition in which the suspension arrangement is operable; and
- a disengaged condition in which suspension arrangement is not operable.

Preferably, the suspension arrangement is selectable between its engaged and disengaged condition by movement of the horizontal translation mechanism.

Preferably, the horizontal translation mechanism is configured to move between a suspension engagement position in which the suspension arrangement is in its engaged condition, and a suspension disengagement position in which the suspension arrangement is in its disengaged condition.

Preferably, the suspension arrangement comprises a resilient member.

Preferably, the resilient member is a spring.

Preferably, the resilient member is an air spring.

Preferably, the movement of the horizontal translation mechanism to its engaged condition causes the coupling of the pivot member to a swing arm to thereby engage the suspension arrangement in its engaged condition.

Preferably, movement of the horizontal translation mechanism to its disengaged condition causes the decoupling of the pivot member to a swing arm to thereby disengage the suspension arrangement to its disengaged condition.

Preferably, when the suspension arrangement is in its engaged condition, the swing arm is caused to engage with the resilient member when the pivot member is pivoted in at least one direction.

Preferably the motive pods comprises a quick release mechanism, whereby the motive pods are at least partially disengageable from the deployment mechanism, to allow the motive pods to be manually manoeuvred from the hull recesses.

Preferably, the superstructure is movable by a superstructure moving mechanism.

Preferably, the superstructure is movable by a superstructure moving mechanism that extends along the centre line of the vessel.

Preferably, the superstructure moving mechanism comprises a chain that is engaged by at least one or more cogs.

Preferably, the superstructure moving mechanism comprises a chain in an endless loop, that is engaged by a pair of oppositely moving cogs.

Where the terms "seaworthy" is used in this specification in relation to a vessel the term shall be construed to mean that the vessel rendered seaworthy is capable of moving through water in a configuration that is fit for purpose without creating undue hazardous situations for that vessel or its occupants, and need not relate to movement of a vessel through seawater as such, and nor shall it be construed as relating to a particular set of standards for seagoing vessels, unless this is clearly stated.

Where the term "wheels" is used in this specification in relation to a set of tracks or track arrangements, the term "wheel" should be construed to include appropriate engineering choices for rotatable members engageable with a track arrangement, such as cogs, gears, or any other appropriate engineering choice of rotatable formation. Where discussion of the term "wheels" includes no context of a track arrangement, then the term "wheels" is to be construed in its ordinary context.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.)

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

Also herein described is a vessel with a reconfigurable superstructure.

Also herein described is an amphibious vessel with a reconfigurable superstructure.

Also herein described is a vessel with a deployable ramp for loading of the vessel.

BRIEF DESCRIPTION OF THE DRAWINGS

The invention will now be described by way of example only and with reference to the drawings in which:

FIG. 55a: shows a side cutaway view line figure of one embodiment of a motive pod and deployment mechanisms, showing how the motive pod is movable between two extents of movement when the lowering mechanism is in its is in its lower position;

FIG. 55b: shows a side cutaway view line figure of one embodiment of a motive pod and deployment mechanisms, showing how the motive pod is movable when the lowering mechanism is in its is in its lower position;

FIG. 55c-55g: shows a cutaway side view line figure sequence of a motive pod being moved from a deployed position to a stowed position, and how an aligning mechanism operates to align the motive pod with a hull recess;

FIG. 57a: shows a cutaway front view line figure of a motive pod and its deployment mechanisms with the motive pod in its stowed position;

FIG. 57b: shows a cutaway front view line figure of a motive pod and its deployment mechanisms with the motive pod in its deployed position;

FIG. 58a: shows a rear cutaway view line figure of a superstructure and deck of one embodiment of a vessel, showing the superstructure moving mechanism; and FIG. 58b: shows a side cutaway view line figure of a superstructure and deck of one embodiment of a vessel, showing the superstructure moving mechanism.

DETAILED DESCRIPTION OF THE PREFERRED EMBODIMENT(S)

Figure 1:
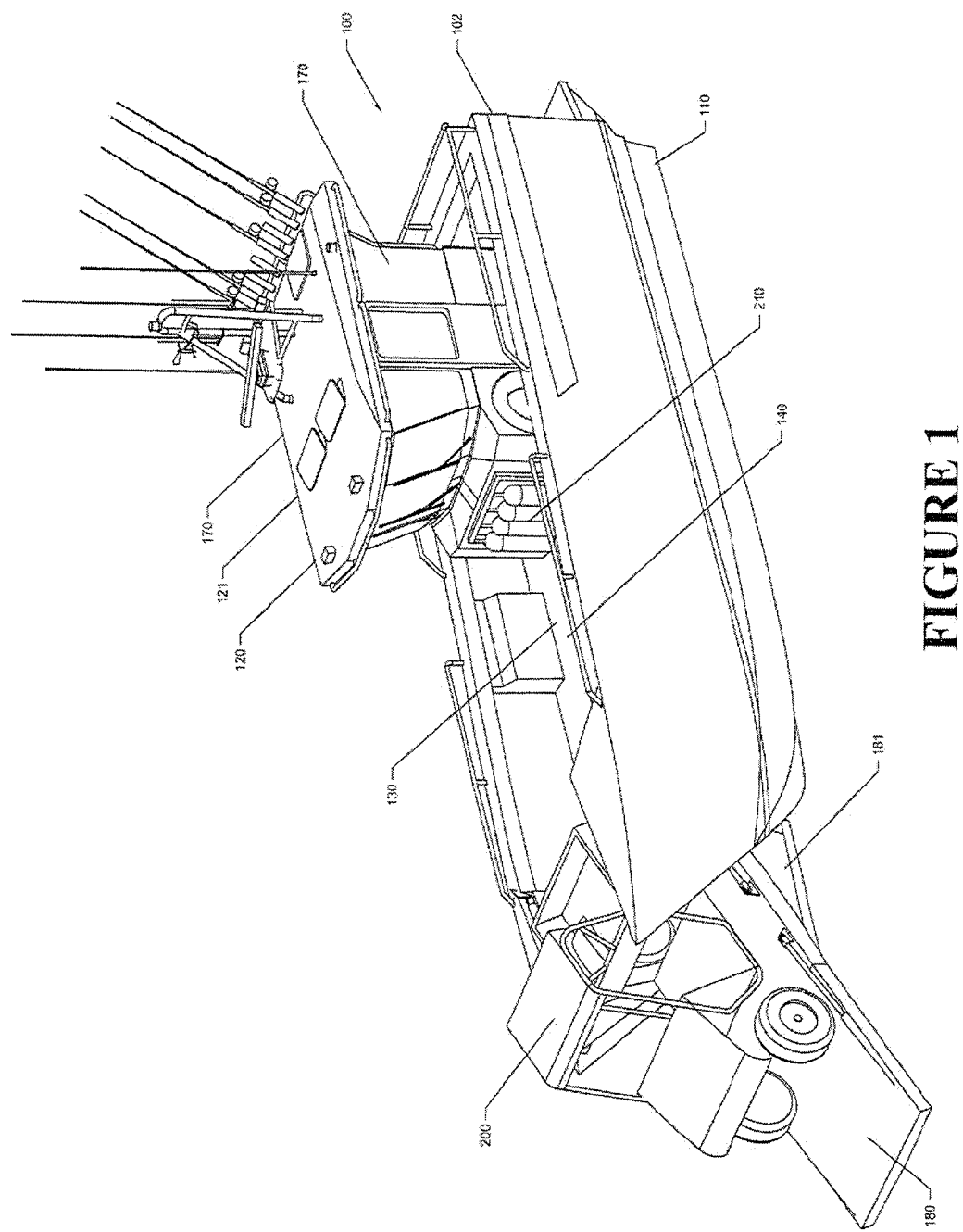
FIG. 1 is a perspective view of a preferred embodiment of the invention with the ramp deployed and a vehicle shown in the process of exiting the vessel and the separating member is in the first condition.
Figure 2:
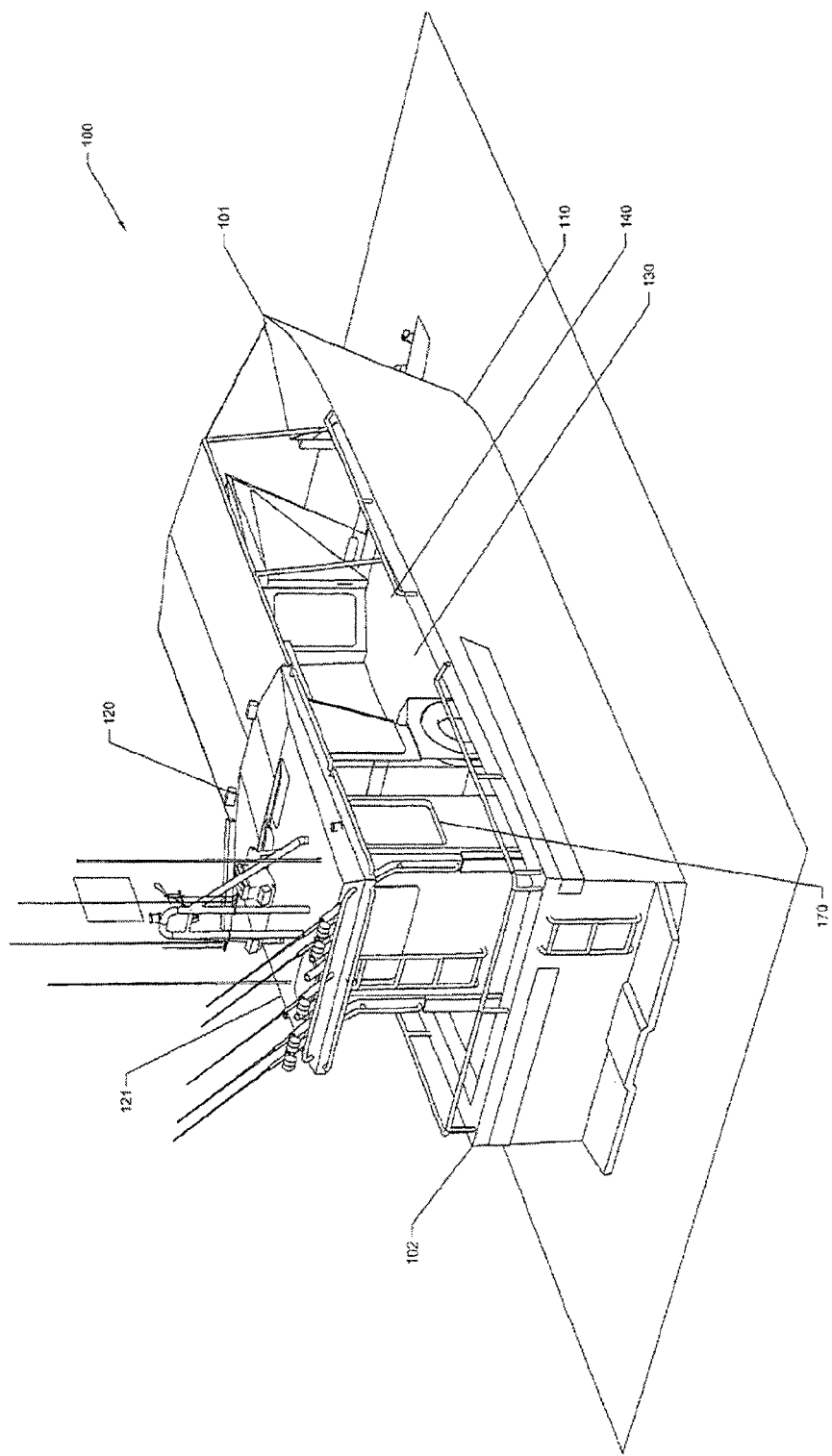
FIG. 2 is another perspective view of a preferred embodiment of the invention with the ramp deployed and the separating member is in the first condition.
Figure 3:
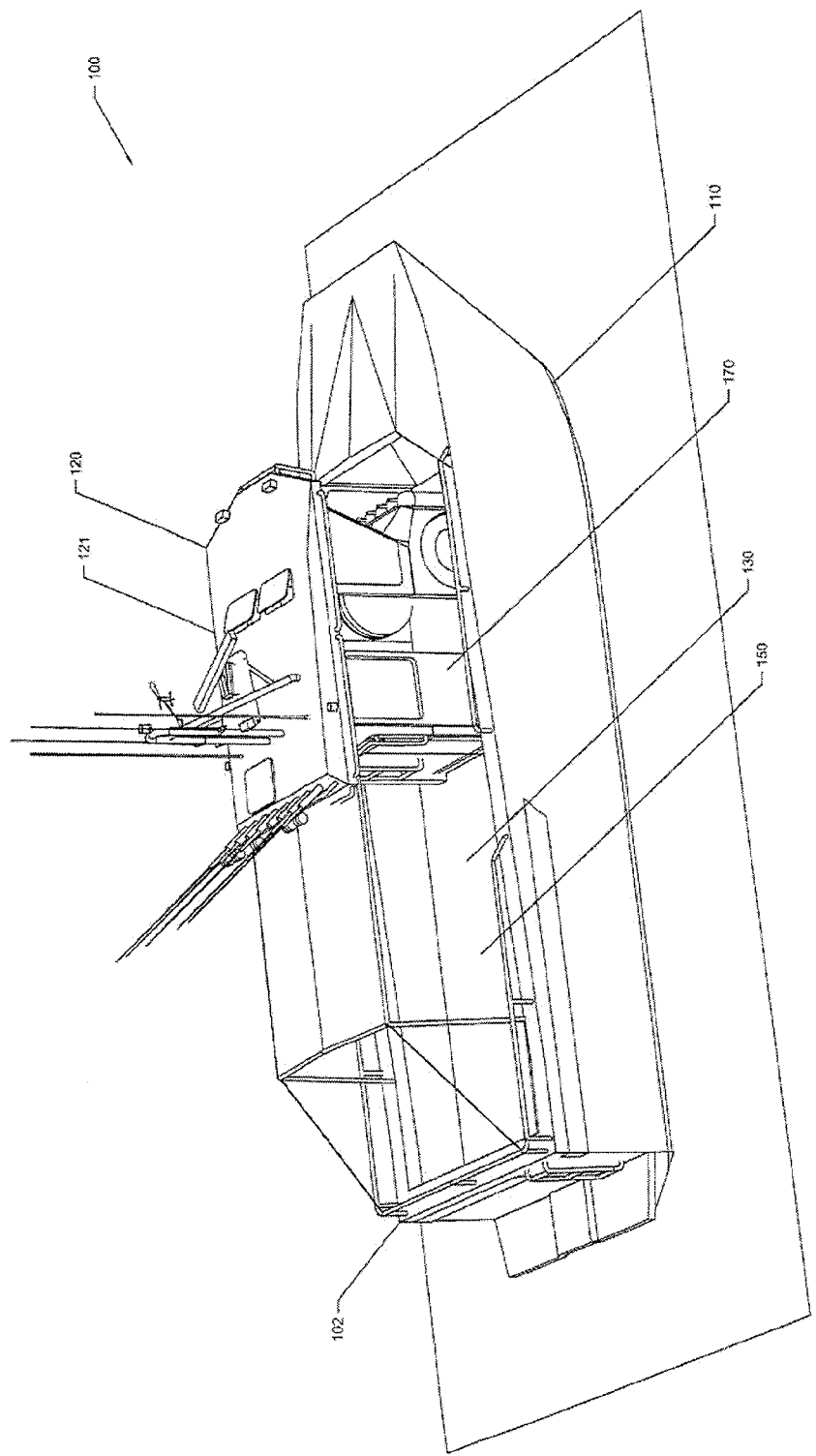
FIG. 3 is another perspective view of a preferred embodiment of the invention with the ramp stowed and the separating member is in the second condition.
Figure 4:
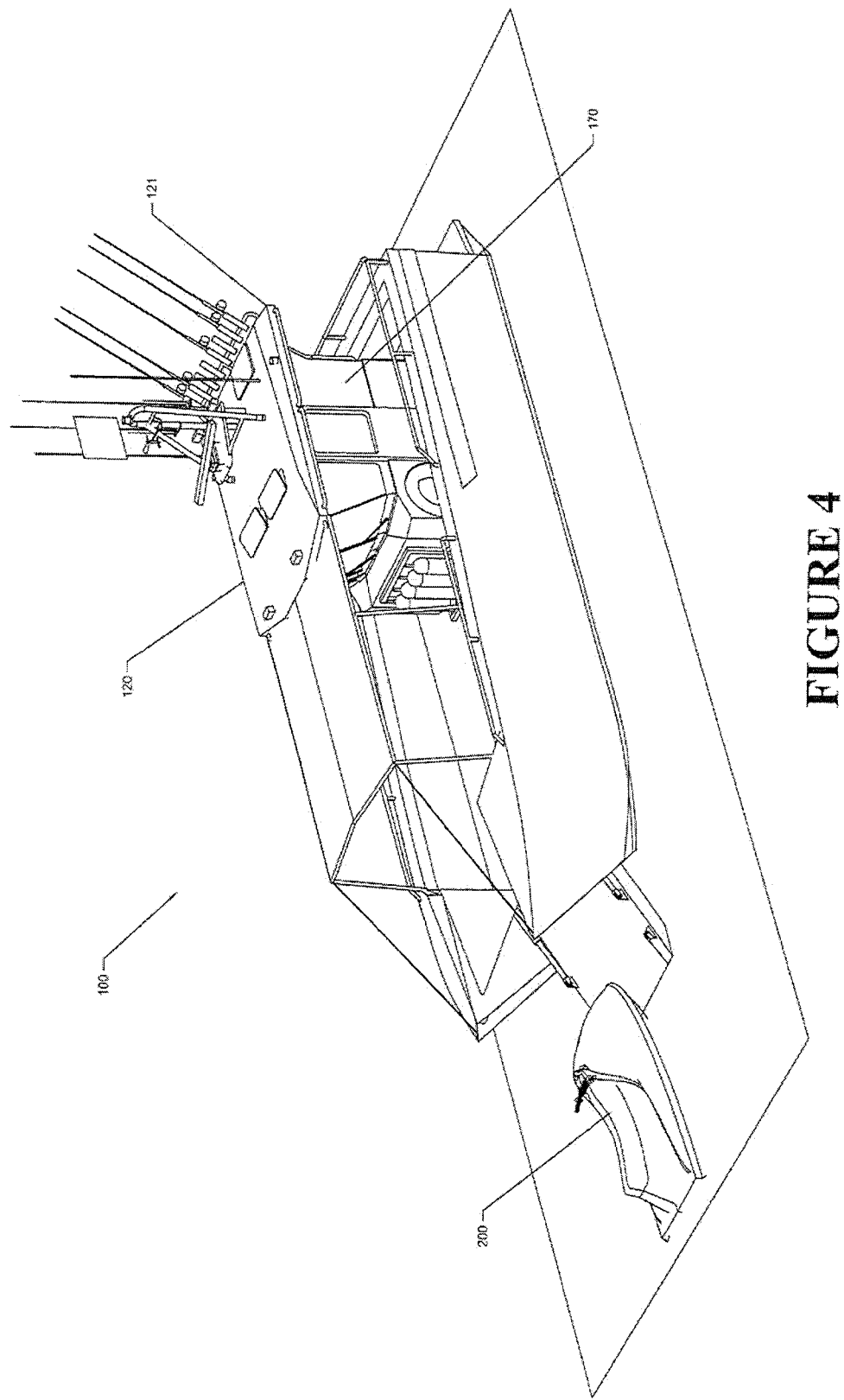
FIG. 4 is another perspective view of a preferred embodiment of the invention with the ramp deployed and an alternative vehicle aligned for preparation to ingress into the vessel and the separating member is in the first condition.
Figure 5:
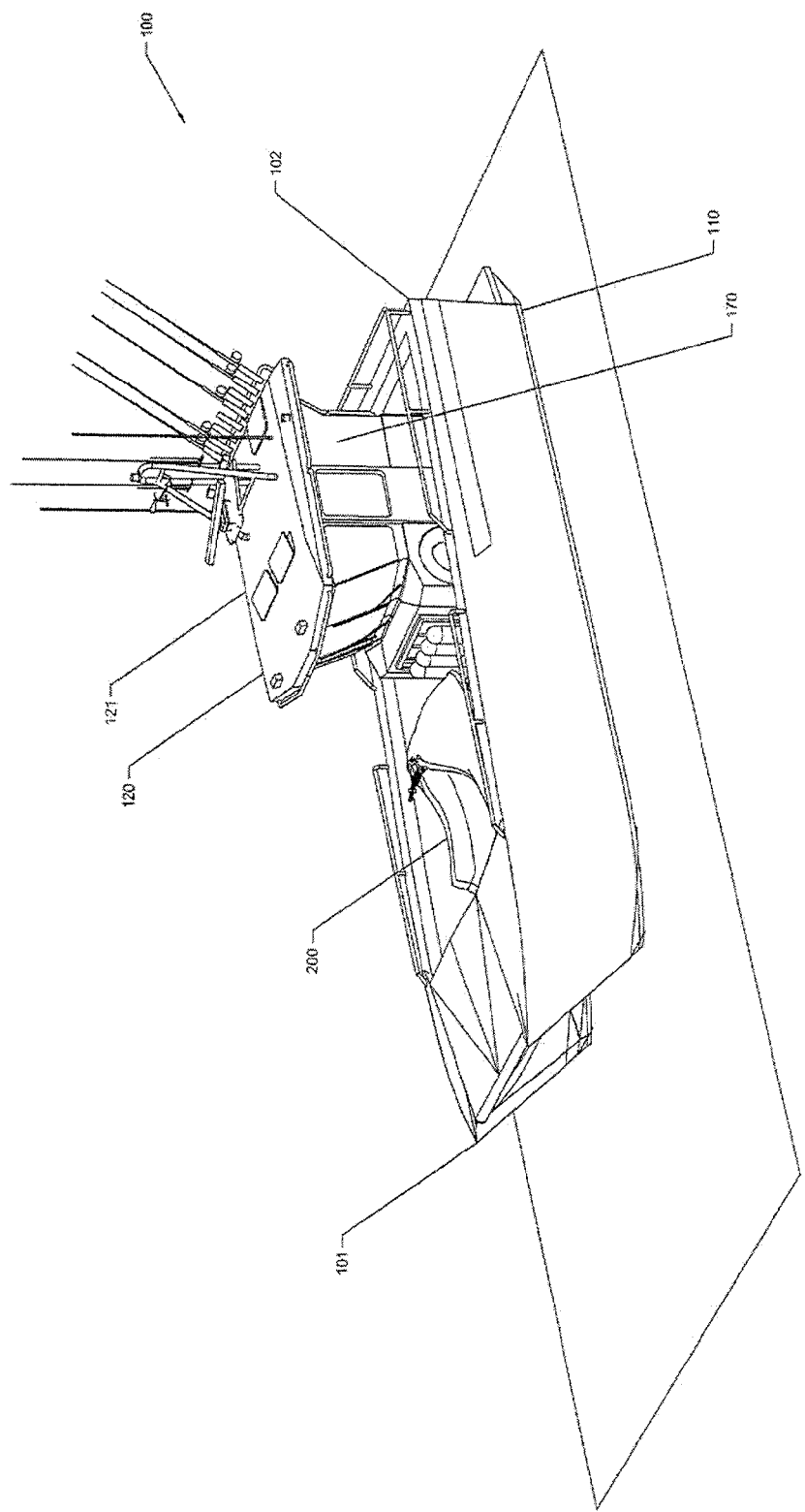
FIG. 5 is a perspective view of the vessel in FIG. 4 after the alternative vehicle has entered the vessel and the ramp is stowed and the separating member is in the first condition.
Figure 6:
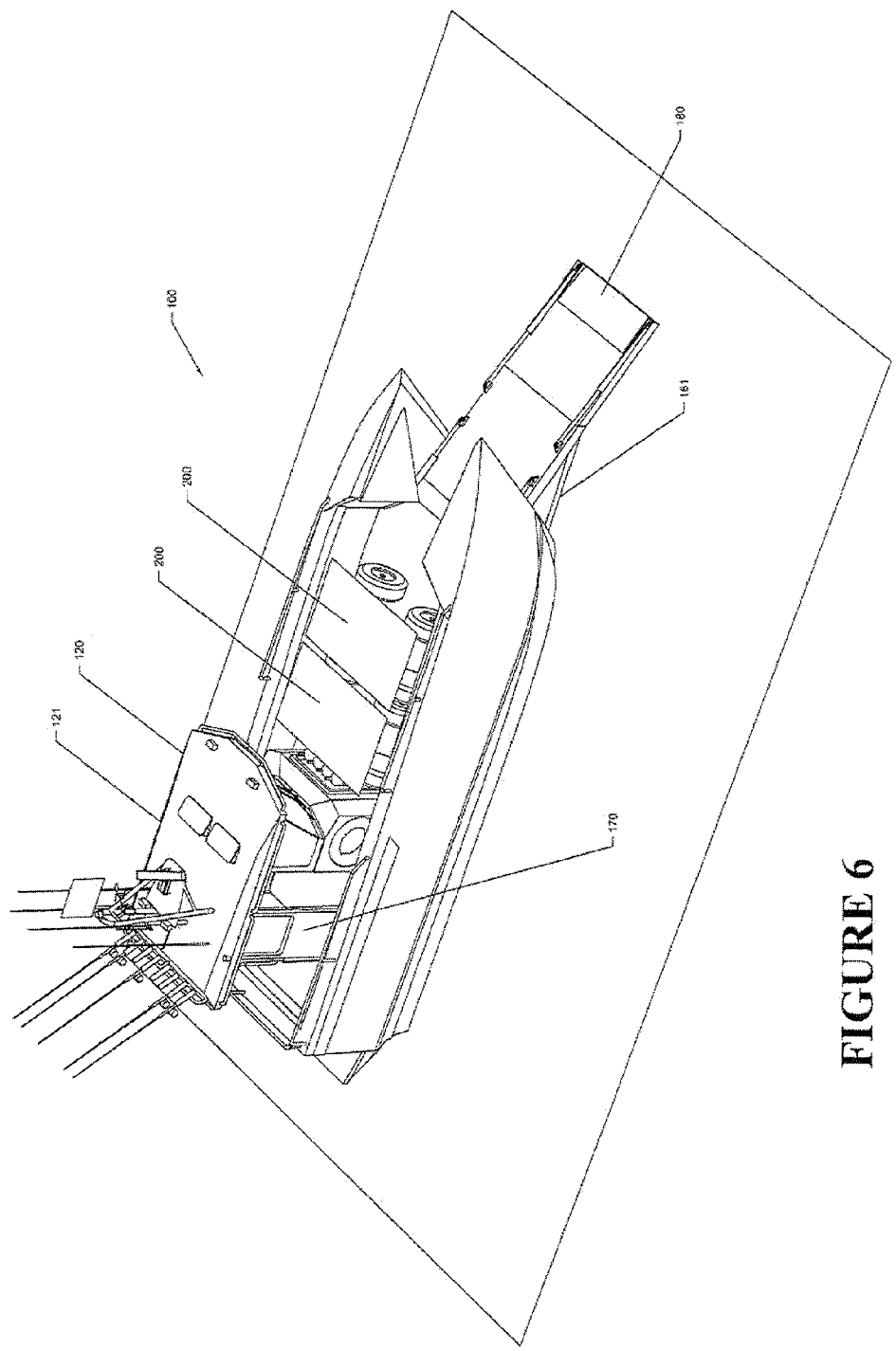
FIG. 6 is a perspective view of a preferred embodiment of the invention with the ramp deployed and a plurality of vehicles located on the deck of the vessel and the separating member is in the first condition.
Figure 7:
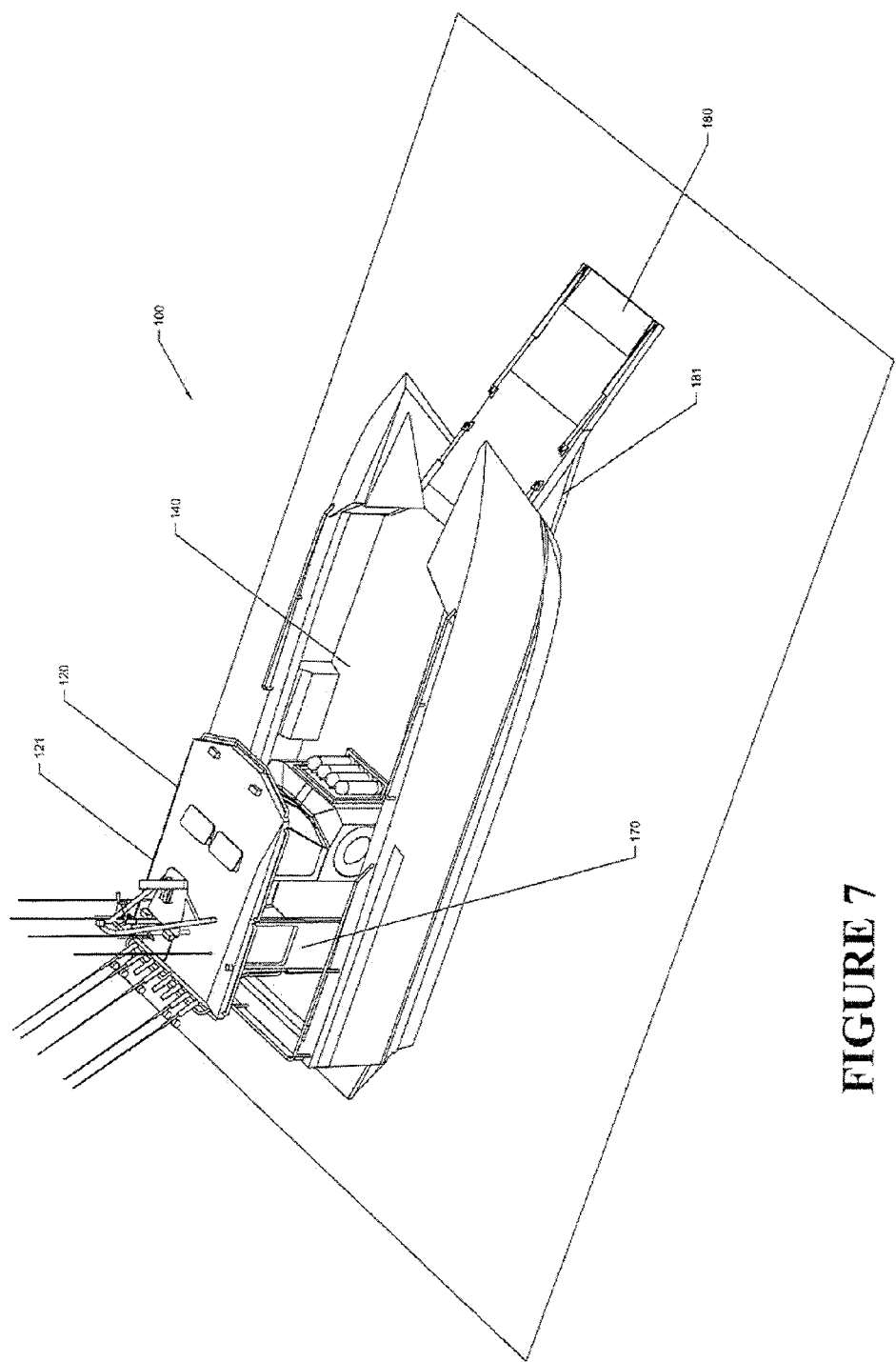
FIG. 7 is another perspective view of the vessel in FIG. 6 with the vehicles removed.
Figure 8:
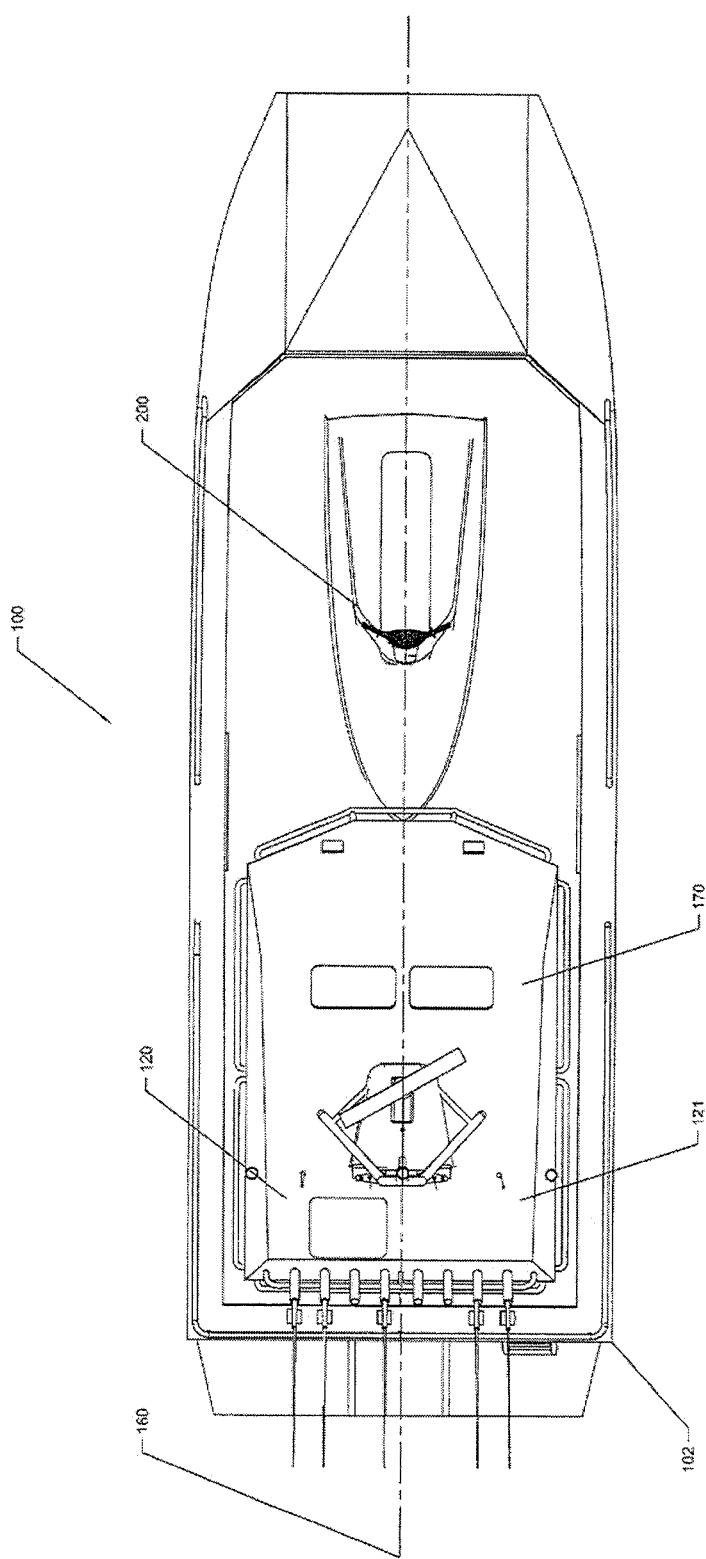
FIG. 8 is a plan view of a preferred embodiment of the invention.

With reference to the above figures, in which similar features are generally indicated by similar numerals, a vessel 100 according to a first aspect of the invention is generally indicated by the numeral 100.

The vessel 100 comprises at least one hull 110 and at least one superstructure 120 (herein after "superstructure"). The vessel 100 is suitable for supporting at least one vehicle 1000 and/or persons substantially above, on or in a body of water. In a preferred embodiment the vessel 100 also includes a deck 130.

Whilst it will be appreciated that any vessel 100 could be used, including but not limited to small recreational boats up to large commercial ships, there are characteristics that would be more suitable for the preferred application.

A preferred characteristic of the vessel 100 is that it would be stable, optionally comprising a plurality of hulls 110 such as a catamaran or trimaran. A preferred vessel 100 would also have a suitably shallow draft allowing it to more readily approach landing locations such as beaches or estuaries. To further facilitate the vessel 100 approaching beaches and the like, the vessel 100 and hull(s) 110 will be suitably configured and equipped to enable the vessel to ingress and egress through surf breaks, such as at a surf beach, and to deal with ocean swells and the like whilst safely transporting passengers, vehicles, and cargo.

The vessel 100 in the preferred embodiment is configured to accommodate at least one vehicle 1000 in or on the hull and preferably at least in part on the deck 130. The at least one vehicle 1000 could be any vehicle but in the preferred embodiment would be any one or more of the following:
  a motorbike,
  a quad-bike,
  an all-terrain vehicle,
  a Jet-ski
  a vehicle suitable for transporting people and/or cargo over land or sea.

The vessel 100 in the preferred embodiment will be sufficiently large enough to accommodate one or more such vehicles 200 whilst still allowing the vessel 100 to operate in a safe and efficient manner.

The superstructure 120 is configured to be mounted on or at least supported by the hull 110 of the vessel 100. In the preferred embodiment superstructure 120 is supported at least in part on the deck 130. In one embodiment the superstructure 120 is completely supported on the deck 130 of the vessel 100.

The superstructure 120 could be any structure that forms part of the vessel other than the hull 110. In the preferred embodiment the superstructure 120 is any part of the vessel that projects upwards from the deck 130 of the vessel 100. It will be appreciated that in a less preferred embodiment the superstructures 120 could be integrally formed, mounted or connected in any variety of ways with the hull 110 and/or the deck 130.

At least one superstructure 120, or at least part of one superstructure 120, can translate relative to the hull 110. In the preferred embodiment the vessel has one superstructure 120 that can translate relative to the deck 130 of the vessel 100. It will be appreciated that any one of the following alternative combinations could also fulfil this requirement.
  A vessel 100 with a plurality of superstructures 120, one or more of which can translate relative to the hull 110.
  A vessel 100 with one superstructure 120, only part of which can translate relative to the hull 110.
  A vessel 100 with a plurality of superstructures 120, where part or all of any one or more of the superstructures 120 can translate relative to the hull 110
  A combination of anyone or more of the above defined embodiments of superstructures on a vessel 100.

In the preferred embodiment the superstructure(s) 120 define all parts of the vessel on the deck 130. This includes areas, zones and spaces where persons can be accommodated including but not limited to cabins, housings, support structures, rest areas, seating areas, standing areas, etc. Essentially any part of a vessel 100 where a person would normally be able to sit, stand, lie down or otherwise is defined by the deck 130 and/or one or more superstructure 120. It will further be appreciated that a vessel 100 may include superstructures 120 that define other features including but not limited to storage areas and structures, cargo holding areas and structures, vehicle storage areas and structures or any other area or structure found on a vessel 100.

In a preferred embodiment the vessel also includes one or more superstructure 120 configured to define different sections or zones of the vessel 100, such as a dividing wall 122 or the like. Such a superstructure could define any areas or zones on the vessel 100 such as separating the fore deck 131 from the aft deck 132.

As outlined above, at least one superstructure 120, or part thereof, in a preferred embodiment translates relative to the hull 110 (preferably the deck 130) of the vessel 100 (herein after "translatable member(s)" 121). The translation of the translatable member(s) 121 could include any movement of the superstructure 120 from one location or configuration to another location or configuration. The translation could occur along a fixed path or a variety of paths. The paths could be straight, curved, angled or a combination of each. The path in the preferred embodiment would occur on a single plane but it will be appreciated that the translation could occur in any three dimensional direction and pass through any combination of planes.

In a preferred embodiment the translatable member(s) 121 translates along an axis 160 that is substantially elongate and linear. In the preferred embodiment the axis runs the length of the vessel i.e. between the bow 101 and stern 102 of the vessel 100. Alternatively the axis 160 extends in any direction that is substantially parallel with the plane of the deck 130.

In a preferred embodiment at least one of the translatable member(s) 121 is a superstructure 120 that at least in part can accommodate and shelter a person and/or is configured to house control means for controlling the vessel's 100 movement such as a pilot housing or the helm of the vessel 100.

It is envisaged that in one embodiment shown in FIGS. 58a and 58b, the superstructure is movable by a superstructure moving mechanism 125. In one preferred embodiment the superstructure moving mechanism 125 comprises a cable 126 that extends around a series of pulleys 127 in a manner that is driven by a motor 128 (which could be electric or hydraulic) that are configured to engage with the chain 126 in a manner to rotate in an opposite direction to each other. The motor is operable in two directions, to thereby move the superstructure 120 along the deck in two directions.

In another embodiment (not shown), the superstructure moving mechanism comprises a chain and a pair of cogs (preferably aligned coaxially) that are configured to engage with the chain in a manner to rotate in an opposite direction to each other. The chain is in turn configured in a loop and securely attached to the hull structure. The cogs are driven by a motor such as a hydraulic motor (not shown), so that when the cogs rotate, the superstructure moves in one direction and when the cogs rotate in an opposite direction, the superstructure moves along the deck in an opposite direction.

The configurations of the superstructure moving mechanisms 125 mentioned above are advantageous and/or desirable in that they can be extended along the centre line of the vessel, so that they do not interfere with the operation of other functions of the vessel as will be discussed below. It will, however, be appreciated that many other different configurations (not shown) of superstructure moving mechanisms 125 are possible, including ones moved by linear actuators (such as hydraulic rams), by worm gear, a rack and pinion mechanism, or the like.

The vessel 100 also includes at least two zones, a first zone 140 and a second zone 150. In the preferred embodiment the first zone 140 and/or the second zones 150 are at least in part defined on the deck 130 of the vessel 100. In an alternative embodiment the at least two zones 140, 150, are located anywhere in or on the vessel 100.

Both the first zone 140 and second zone 150 define a space suitable for accommodating at least one or more persons and/or vehicles 1000) and/or cargo 1010 or other matter.

At least one of the translatable member(s) 121 (herein after "separating member" 170) is configured to be a separating member 170 at least in part interposed between the first zone 140 and the second zone 150. The separating member 170 is configured to at least in part define the first zone 140 and second zone 150 from each other. When the vessel only has a single translating superstructure 120 it is also the translatable member 121 and the separating member 170.

In the preferred embodiment the separating member 170 is a housing, cabin, pilot accommodation, helm or the like or any of the superstructure 120 embodiments as herein previously described. Alternatively the separating member 170 is a wall or other superstructure 120 that is configured to at least in part separate the first zone 140 from the second zone 150.

The separating member 170 is also a translatable member 121 and as such is configured to translate relative to the hull 110, preferably relative to the deck 130, and along the axis 160. The separating member 170 in the preferred embodiment can translate between at least two conditions, a first condition (as seen in FIG. 9a) and a second condition (as seen in FIG. 9c).

In the preferred embodiment the first and second zones 140, 150 are at least in part defined by the separating member 170. The first and second zones 140, 150 in the preferred embodiment are mutually dependent on the relative position of the separating member 170 such that when the separating member 170 is in the first condition the first zone 140 is fully defined and when the separating member 170 is in the second condition the second zone 150 is fully defined. Likewise, when the separating member 170 is in the first condition, the second zone 150 is only partially, or not, defined and when the separating member 170 is in the second condition the first zone 140 is only partially, or not, defined.

It will be appreciated that as the separating member 170 translates between the first and second condition the first and second zones 140, 150 are only partially defined and are directly proportional to the relative position of the separating member 170. It will also be appreciated that the separating member 170 could stay in an intermediate condition as shown in FIG. 9b in which the first and second zones 140, 150 are both partially defined.

Figure 9A:
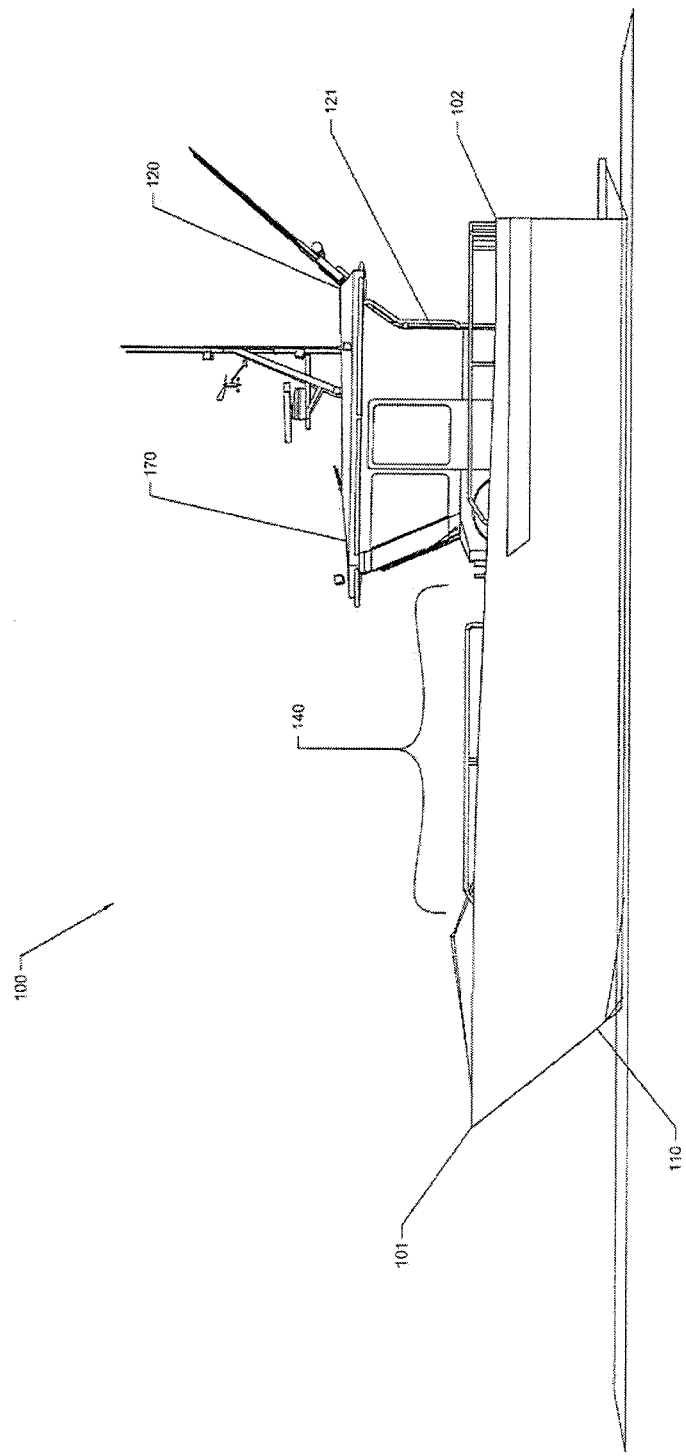
FIG. 9a is a side elevation view of a preferred embodiment of the invention showing the separating member in the first condition.
Figure 9B:
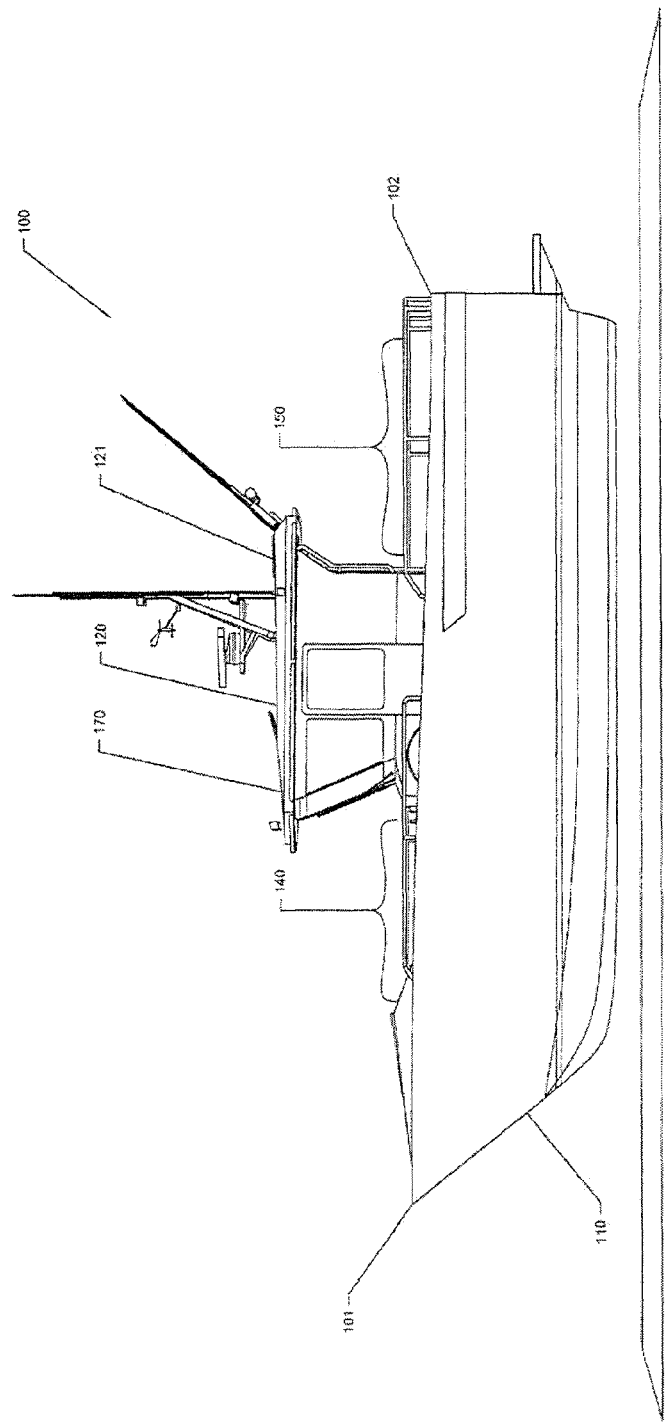
FIG. 9b is the same side elevation view of FIG. 9a showing the separating member in an intermediate condition between the first and second conditions.
Figure 9C:
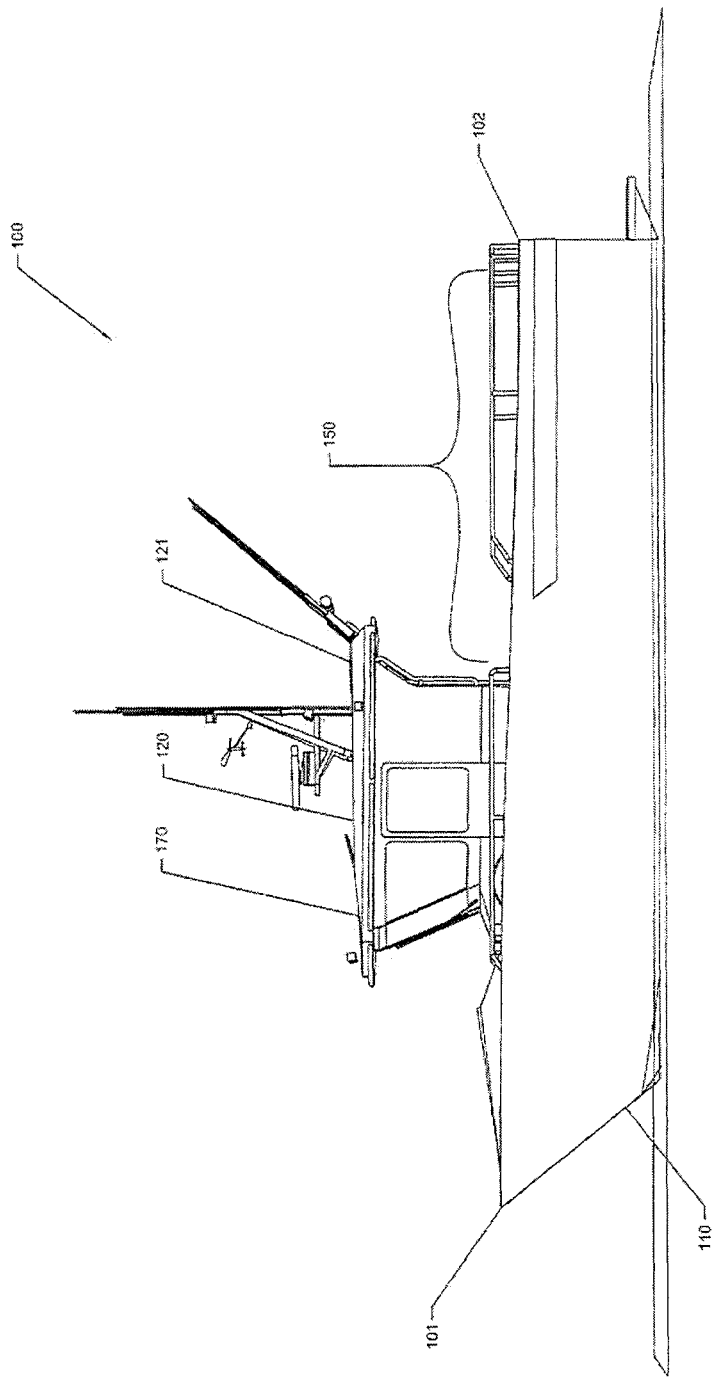
FIG. 9c is the same side elevation view of FIGS. 9a and 9b showing the separating member in the second condition.

Whilst the embodiment shown in FIGS. 9a to 9c only include a single separating member it will be appreciated that any number of separating members 170 could be used creating any number of zones. The zones could accommodate any combination of persons and/or vehicles and/or cargo. Specifically and alternative embodiment would be on a larger vessel where multiple superstructures 120 or parts thereof, could be configured to create a variety of vessel 100 configurations.

In a preferred embodiment the vessel 100 is amphibious. Amphibious vehicles are well documented and are not discussed in detail in this specification. It will be appreciated that any amphibious vehicle could be used but preferably the vehicle includes deployable track arrangements for moving the vessel across land.

In a preferred embodiment the vessel 100 also includes a ramp arrangement 300. The ramp arrangement 300 could be any gang plank, ramp or other device suitable for assisting in allowing ingress or egress from the vessel by a person and/or a vehicle 1000 or other matter. In a preferred embodiment the ramp is configured to provide ingress or egress of a vehicle 1000 from the first or second zone 140, 150 of the vessel 100. In the preferred embodiment the ramp arrangement 300 provides an access way for one or more vehicles 200 to move into and out of the first zone when it is fully defined. The ramp arrangement 300 will be described in more detail below.

Whilst the preferred embodiment has been described in detail above, an alternative embodiment could include a vessel 100, where the superstructure 120 is at least in part fixed and another part of the superstructure 120 can translate relative to the deck 130. An example of such a superstructure 120 might include an external shell section with and internal movable section (not shown).

In a preferred embodiment the vessel 100 is configured such that the first zone 140 is suitable for accommodating one or two vehicles 200 such as those described above. The second zone 150 is configured to accommodate a plurality of people. In this embodiment the vessel 100 is configured such that when in the first condition it is configured to accommodate the vehicle 1000 thereby allowing the vessel 100 to transport the vehicle 1000 over a body of water. The vessel 100 is also configured such that when the vehicle(s) 200 are deployed, the vessel 100 can be reconfigured such that the separating member 170 is translated into the second condition thereby defining the second zone 150. The second zone 150 in this preferred embodiment is configured to provide suitable accommodation for people to make the vessel 100 more suitable for transporting people and for recreational purposes such as fishing, troop transport or similar military applications, commercial passenger transport for ferrying or tourist applications, etc. Alternatively the second zone 150 is configured to provide a cargo and/or goods accommodating zone for commercial, recreational or military purposes.

In the preferred embodiment the first zone 140 is located more proximate the bow 101 of the vessel 100 than the second zone 150. Likewise the second zone 150 is located more proximate the stem 102 of the vessel 100 than the first zone 140.

Whilst herein description is made with reference to a vessel 100 specifically designed with the above features, it will be appreciated that existing boats could be adapted or retrofitted so as to include the above features.

In one embodiment as shown in the figures, the vessel 100 comprises a pair of partly formed demi-hulls 115. The ramp arrangement 300 extends between the demi-hulls 115. The ramp arrangement 300 presents an outer surface 310.

Figure 12:
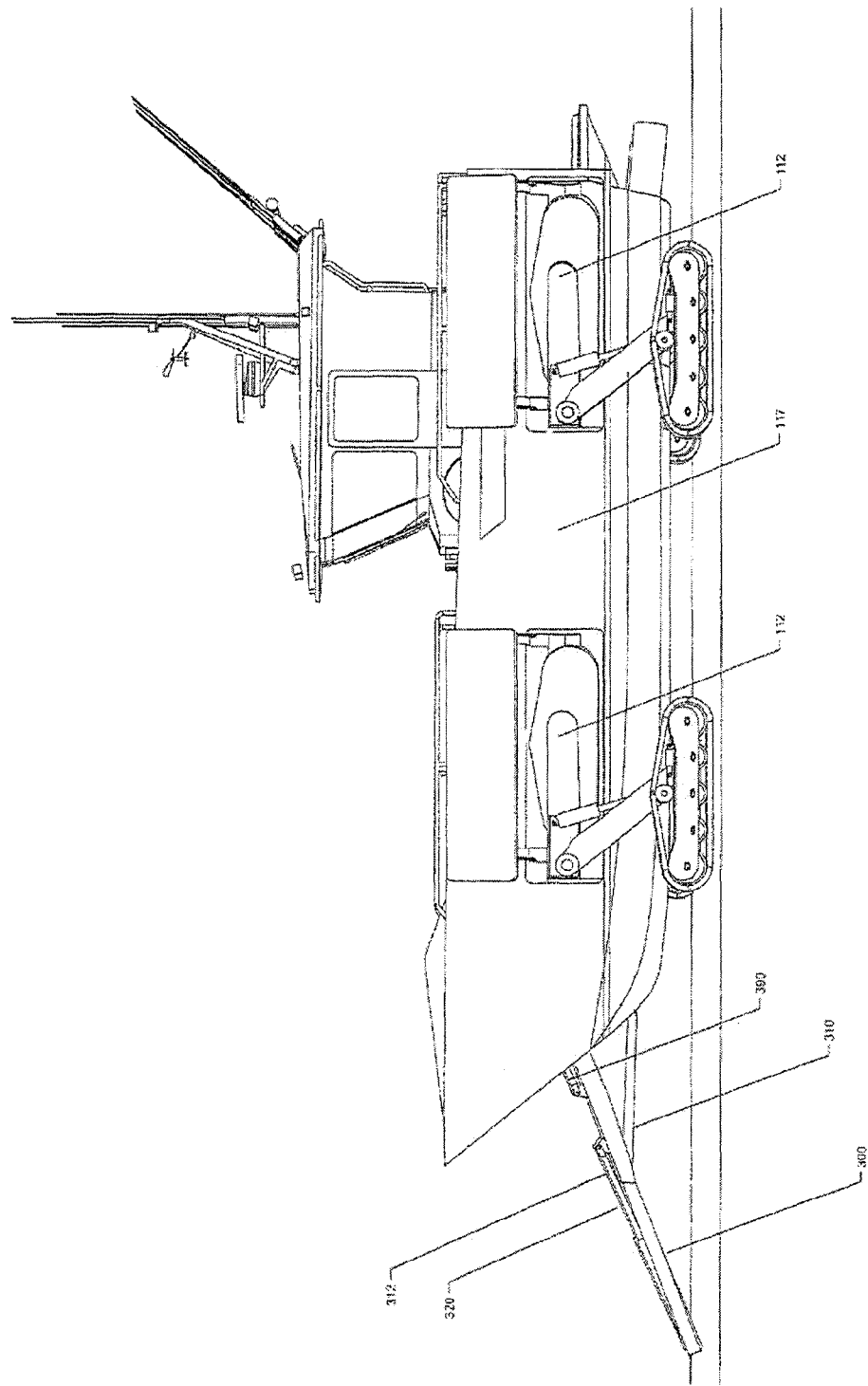
FIG. 12: shows a side view of the vessel of FIG. 11.
Figure 16:
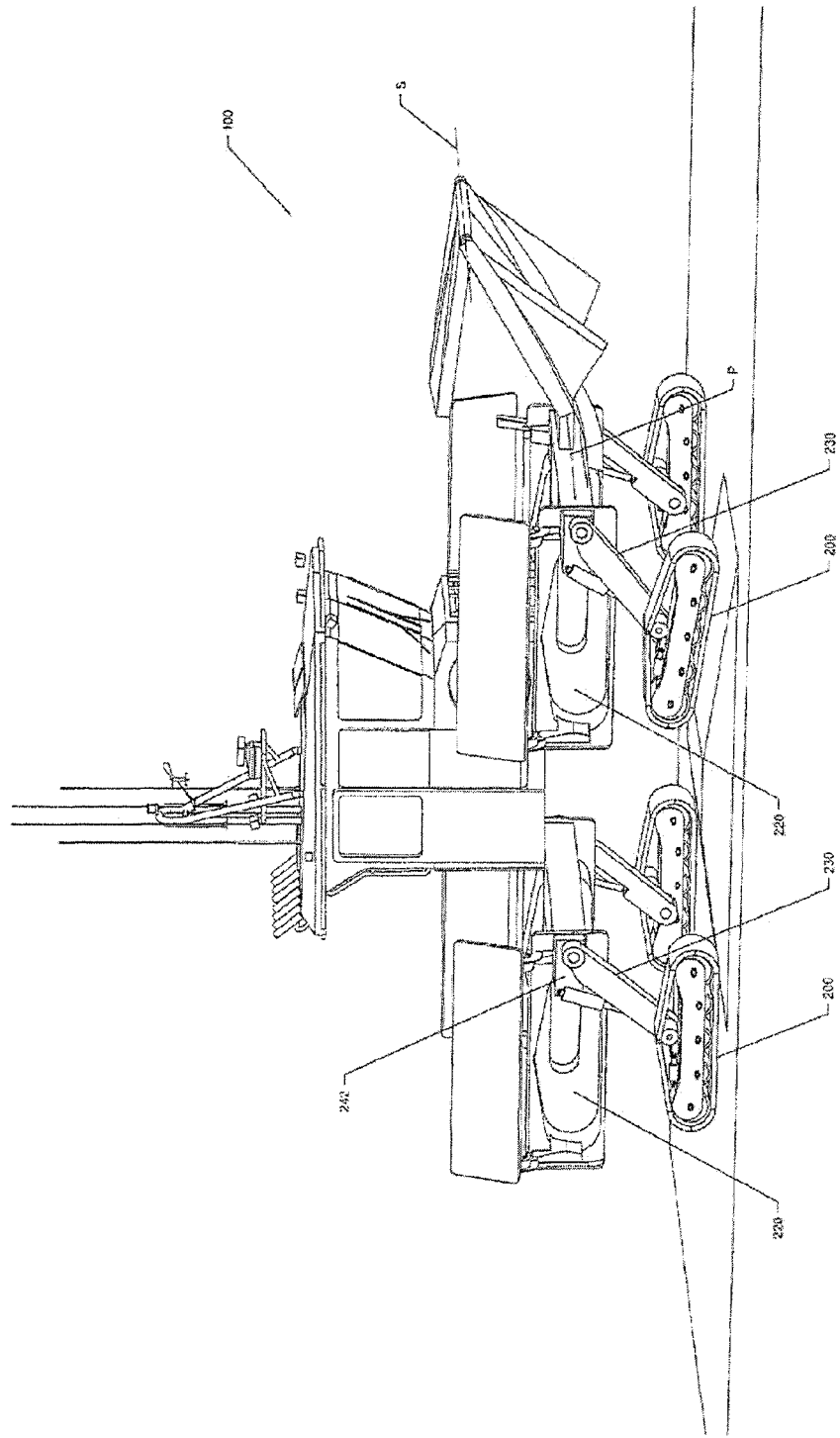
FIG. 16: shows a cutaway three quarter view of a vessel with its motive pods deployed, with its hull removed to show the positioning of the motive pods.
Figure 17:
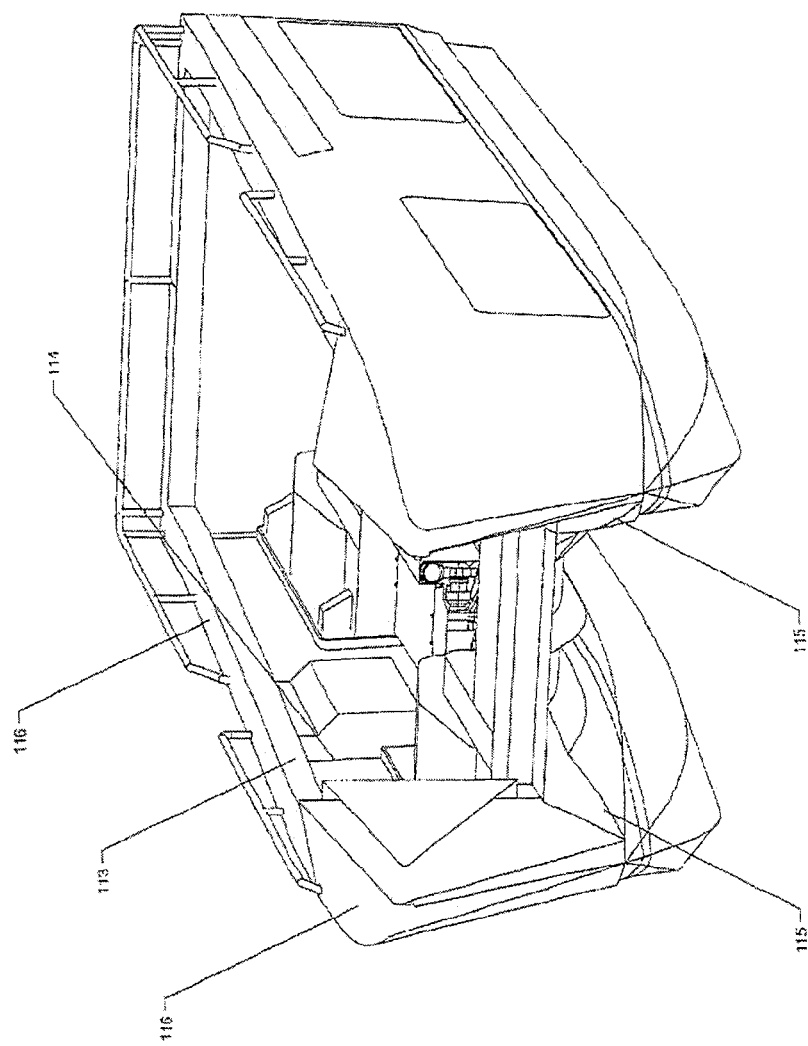
FIG. 17: shows a cutaway view of the hull of a vessel, with the superstructure and ramp arrangement removed, showing the demi-hull structure.
Figure 34:
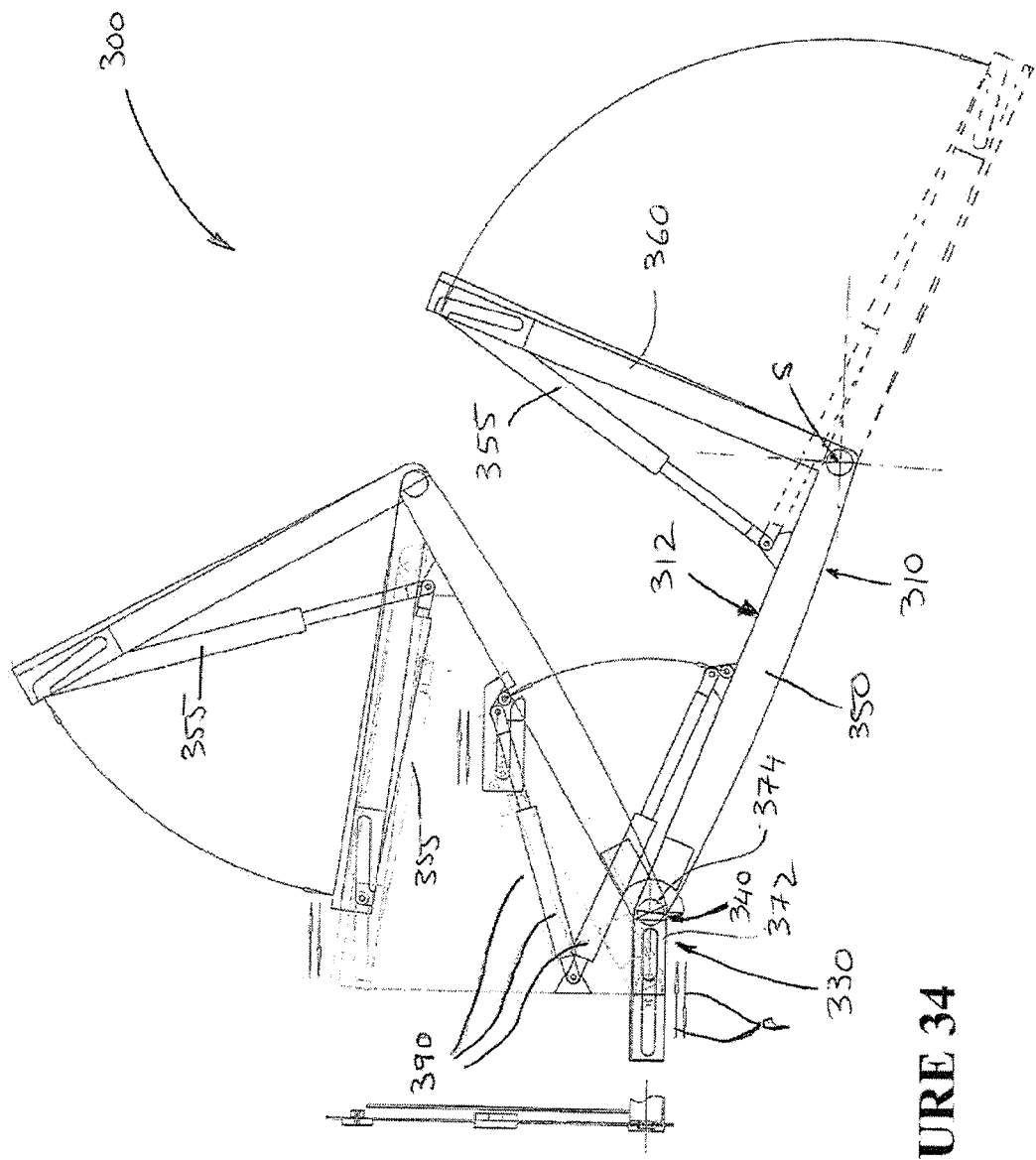
FIG. 34: shows a schematic side view of a ramp arrangement, showing movement of the ramp arrangement between its retracted position and its deployed position.
Figure 35:
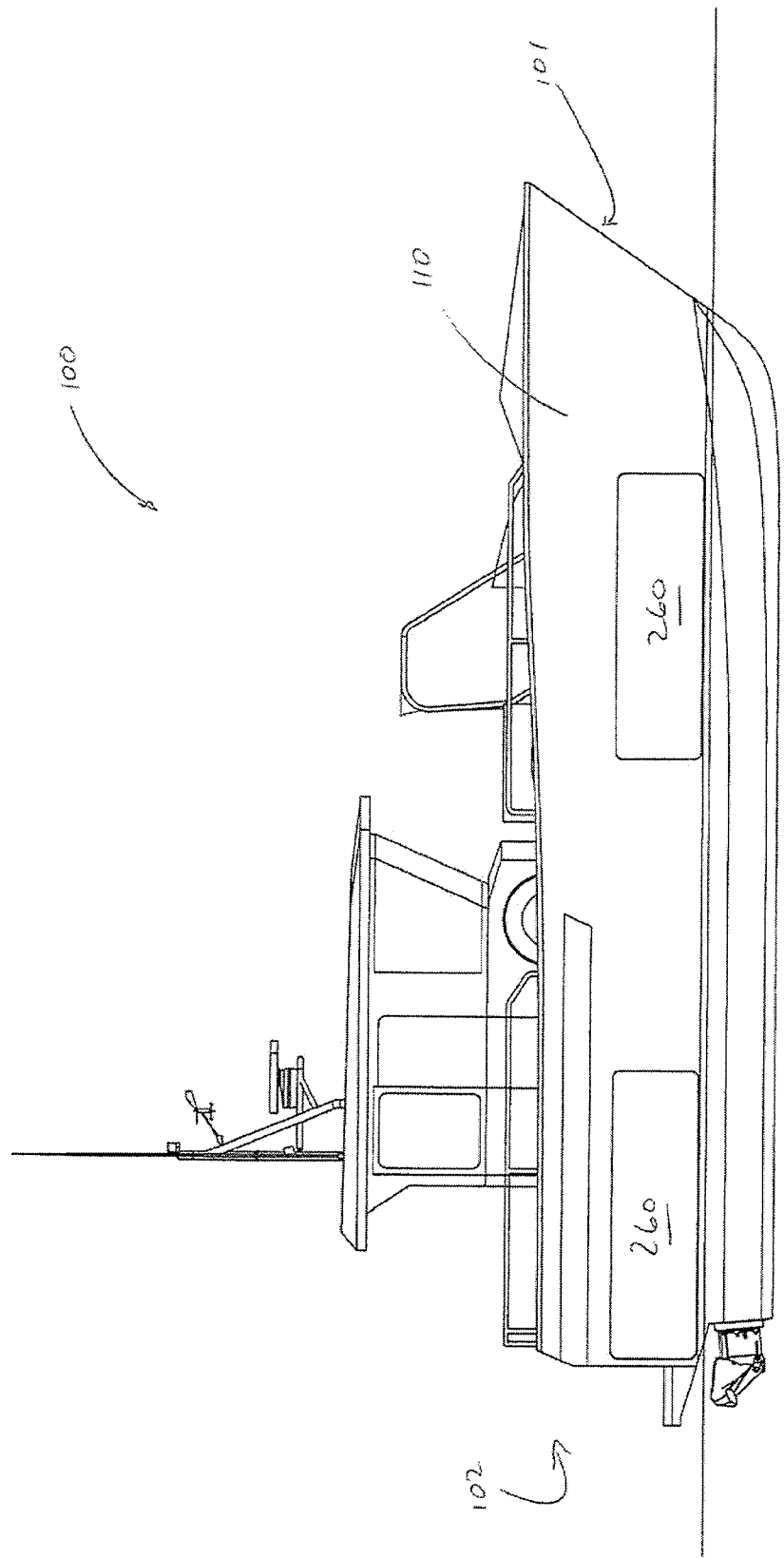
FIGS. 35-52: shows a side view sequence showing a vessel floating in water, the deployment of motive pods from hull recesses in the vessel, and the landing of the vessel on land under its own power, the unloading of a vehicle from the deck of the vessel, as well as the launching the vessel into a body of water and stowage of the motive pods.
Figure 36:
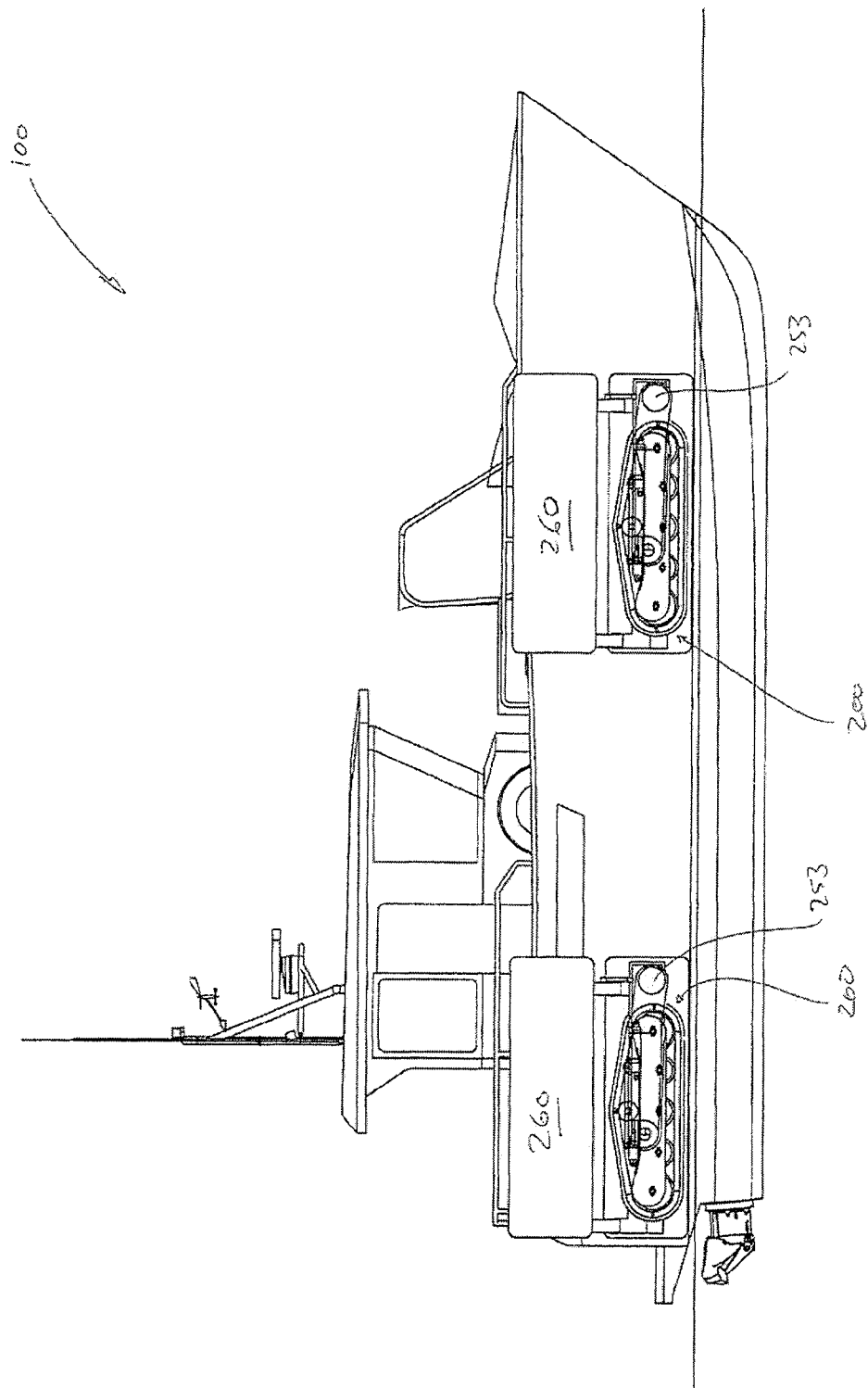
Figure 37:
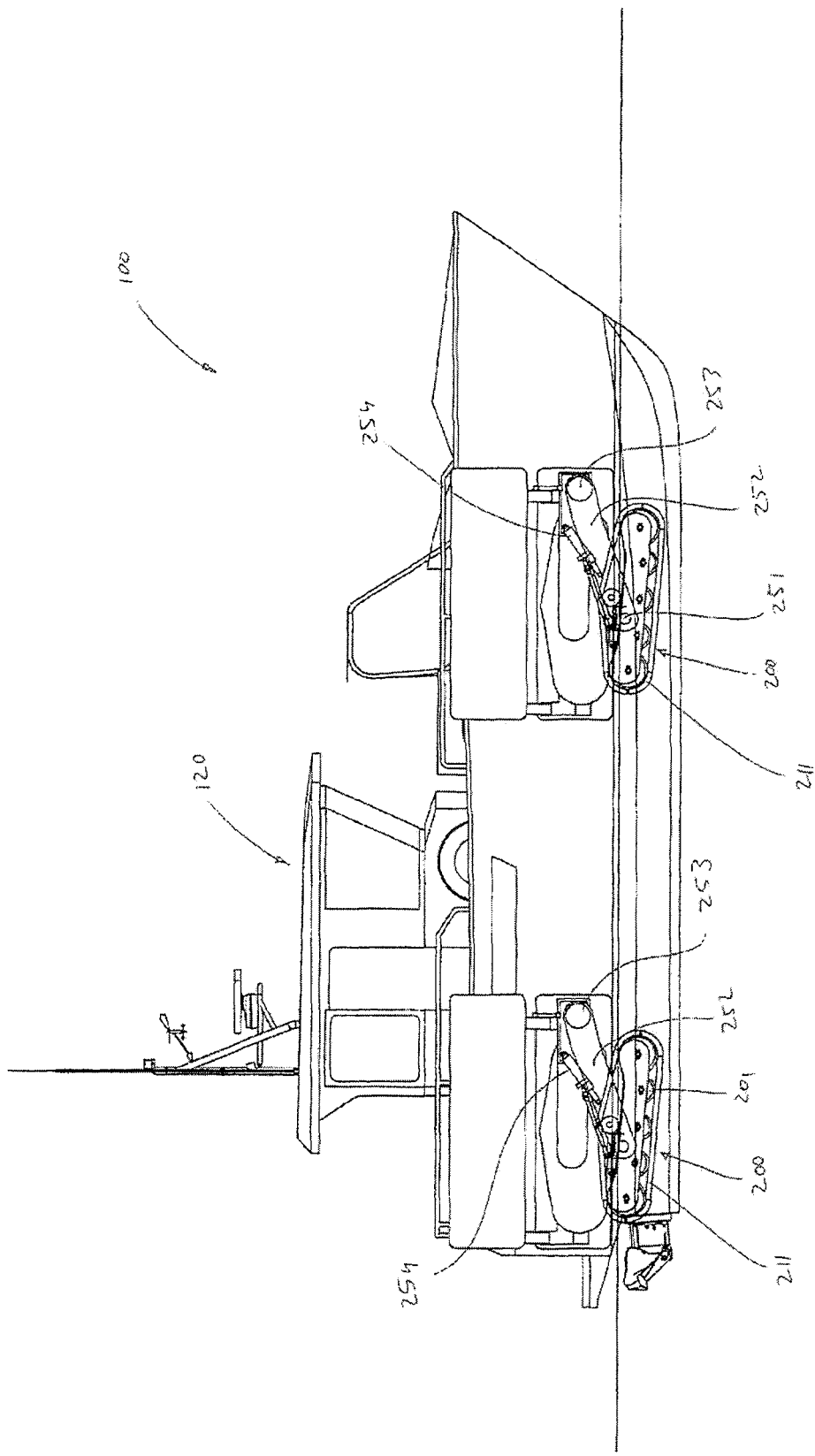
Figure 38:
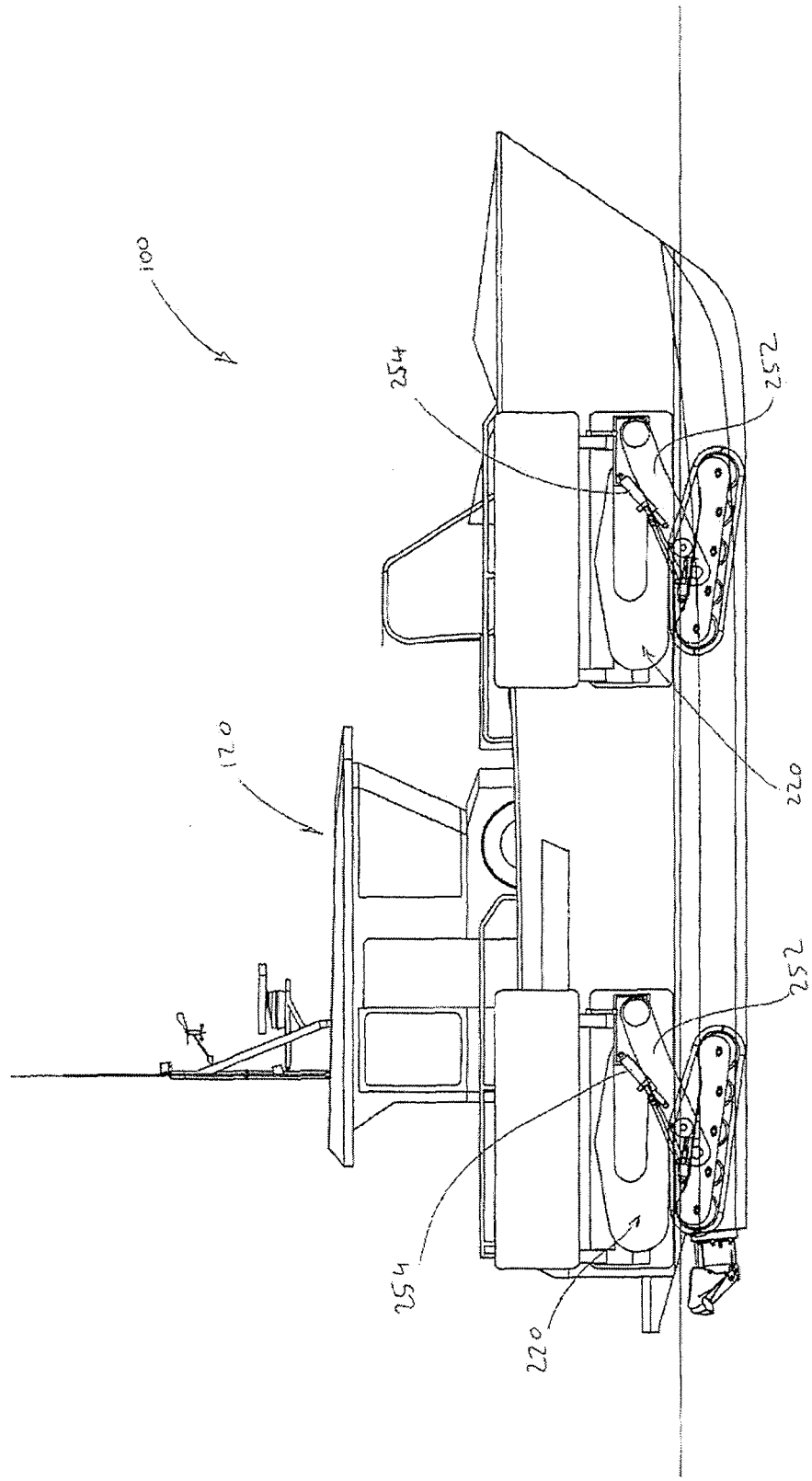

The ramp arrangement 300 is moveable between a retracted position shown in FIG. 16 and a deployed position shown in FIG. 12. Both positions are shown in FIG. 34.

In the retracted position the vessel 100 is rendered seaworthy in that little or no water can ingress into the inside of the hull through or around the ramp arrangement 300, and the vessel can be operated safely at normal operating speeds in water. In its retracted position, it is envisaged that the ramp arrangement 300 will seal against the bow 101 of the vessel 100 in a watertight manner, and present an outer surface suitable for wave piercing.

To this extent, it is envisaged that at least one or more outer surfaces of the ramp arrangement 300 will be coplanar with a surface of at least one, and preferably both, of the partly formed demi-hulls 115 when the ramp arrangement is in its retracted position.

Figure 13:
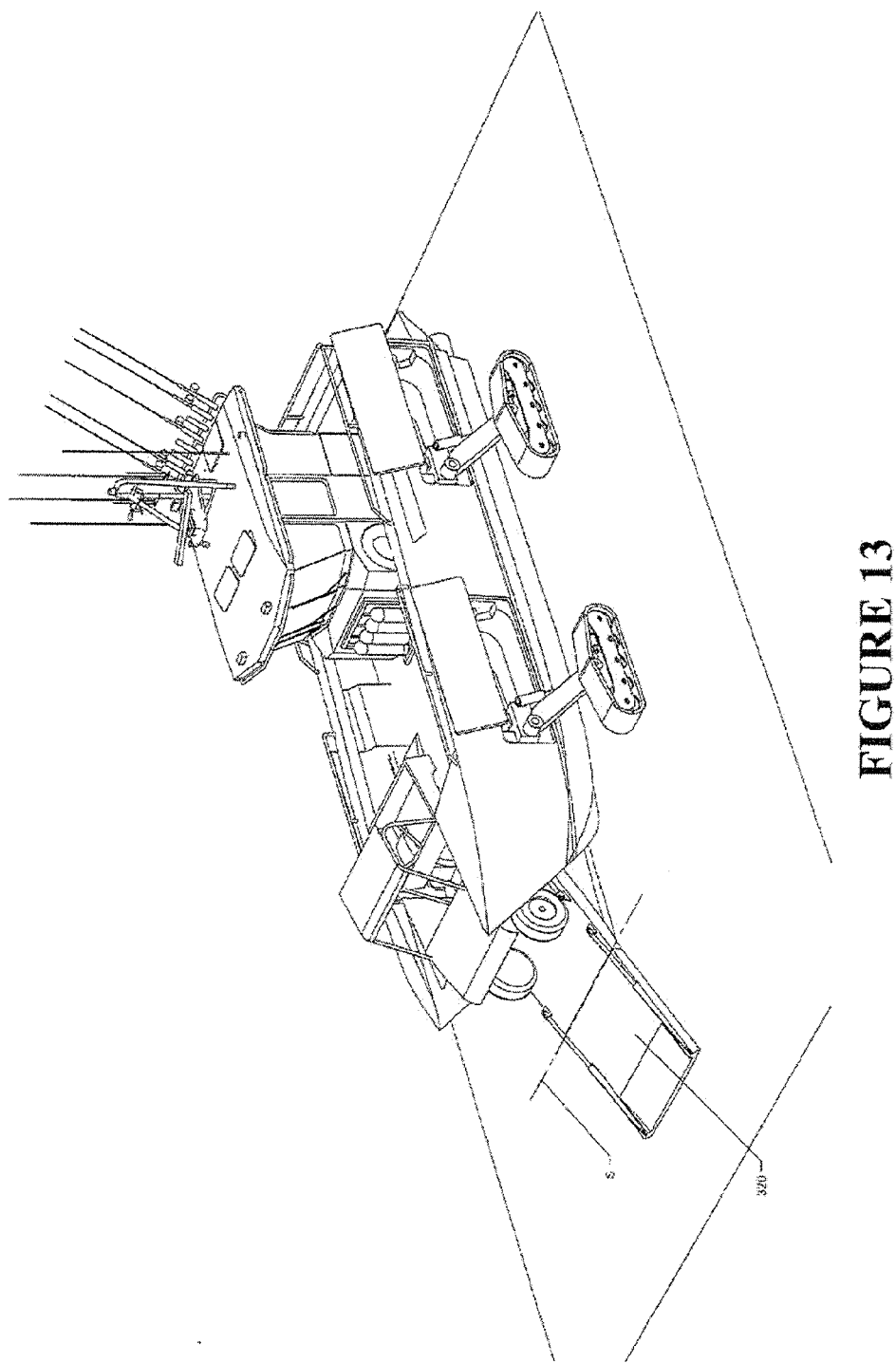
FIG. 13: shows a top front perspective view of the vessel of FIG. 11.
Figure 14:
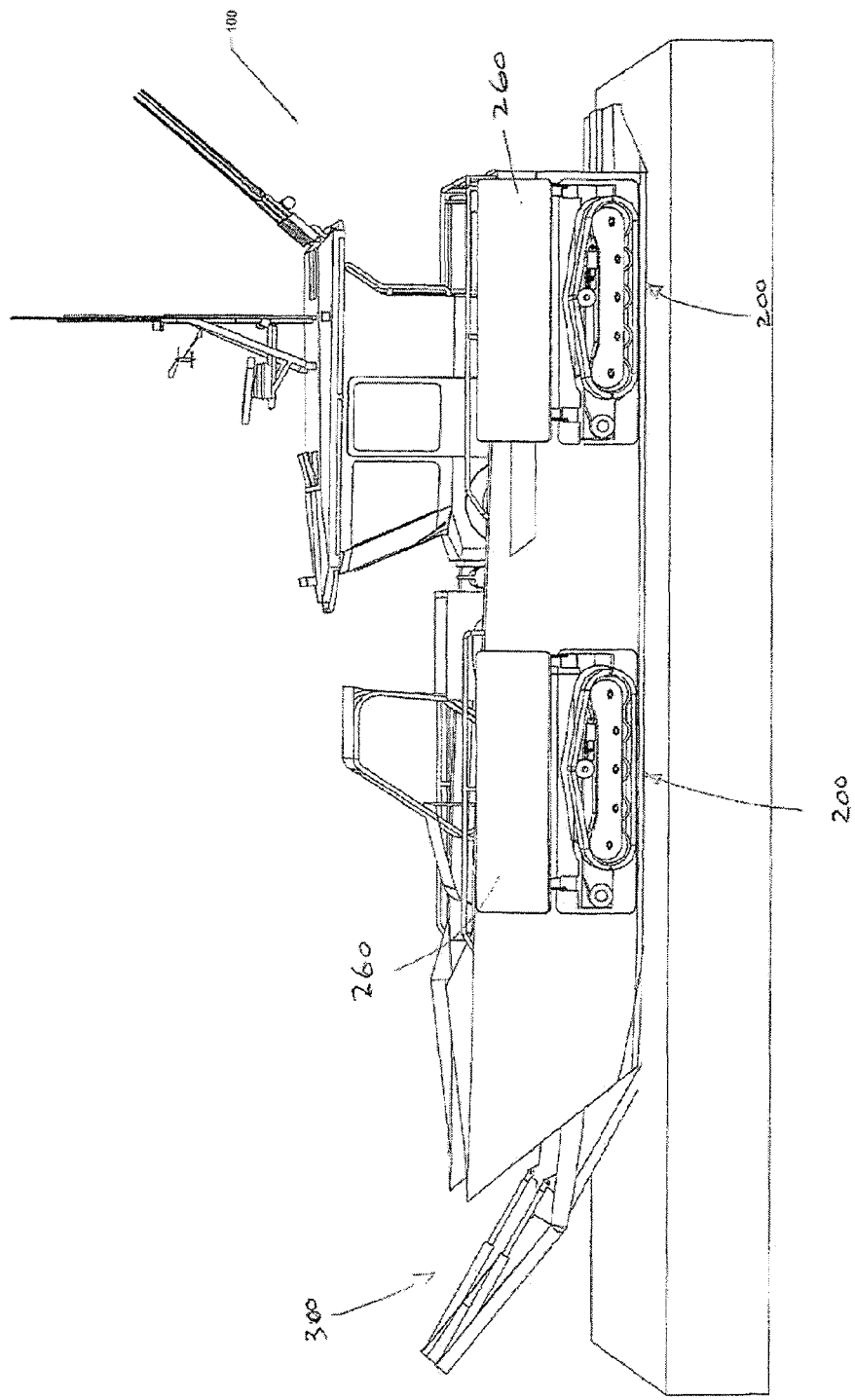
FIG. 14: shows a top perspective side view of a vessel in water, with its wheel recess covers open.
Figure 15:
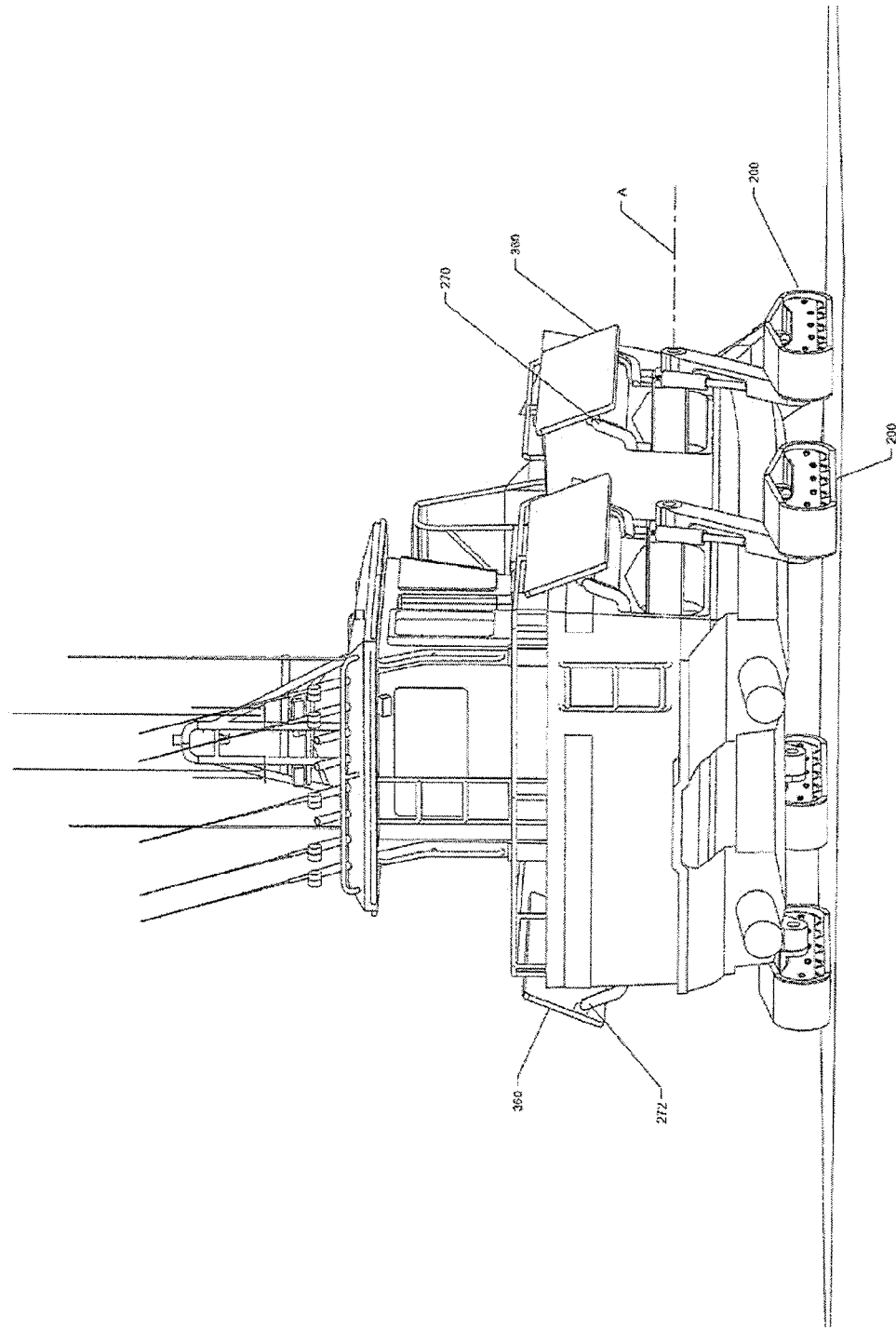
FIG. 15: shows a three quarter back view of a vessel on land with its motive pods deployed.

In its deployed position the ramp arrangement 300 facilitates ingress and egress from the vessel 100, preferably by extending forward as a substantially horizontal (or declining or inclining) pathway 320 as shown in FIG. 13 that is suitable for people, vessels or vehicles to traverse.

The outer surface 310 is configured to complement the configuration of the partly formed demi-hulls to form a seaworthy outer hull configuration presenting as a plurality of fully formed demi-hulls. In this respect, the ramp arrangement 300 comprises a pair of demi-hull part formations 370 formed on its outer surface 310.

When the ramp arrangement 300 is in its retracted position, the demi-hull part formations 370 on the outer surface 310 of the ramp arrangement 300 is configured to complement the configuration of the partly formed demi-hulls 115 to form a seaworthy outer hull configuration presenting as a plurality of fully formed demi-hulls.

In the embodiments shown, the ramp arrangement 300 is movable between its retracted and its deployed position by a series of movements. Initially it is envisaged that a linear actuator such as a first hydraulic ram (not shown) will cause a lower edge 340 of the ramp arrangement 300 to be moved linearly forward (in a direction shown by arrows P in FIG. 34) on a sliding arrangement 372 relative to the vessel 100. At this stage, another linear actuator in the form of a second hydraulic ram 390 will actuate, causing the ramp arrangement to pivot around a pivoting arrangement 330 about a horizontal pivot axis P along the lower edge 340 of the ramp arrangement 300. It is envisaged that the pivot axis P will be defined by a hinge mechanism 374. The lower edge 340 of the ramp arrangement 300 is substantially aligned with the deck 130. In another embodiment not shown, it is envisaged that one hydraulic ram may able to move the lower edge ramp arrangement 300 forward linearly as well as pivotally, in order to reduce weight and complexity.

At least the inner surface 312 of the ramp arrangement 300 is envisaged to be planar in configuration to provide a flat surface for ingress or egress from the vessel 100.

In the preferred embodiment shown, the ramp arrangement 300 comprises two sections, notably a bow section 350 and a cover section 360. The bow section 350 and a cover section 360 are movable relative to each other in a pivotal manner about a pivot axis S between a folded position in which cover section 360 is at an acute angle to the bow section 350 and an aligned position in which the cover section 360 and a the bow section 350 present a substantially aligned pathway for ingress and egress to and from the vessel 100. Pivotal movement of the bow section 350 relative to the cover section 360 is driven by a linear actuator in the form of a third hydraulic ram 355.

It is envisaged that as the ramp arrangement 300 moves between its retracted position and its deployed position, the cover section 360 and the bow section 350 can be simultaneously moved between their folded position and their aligned position respectively, to thereby extend the length of the 320 pathway provided by the ramp arrangement 300 in its deployed position. Alternately the cover section 360 and the bow section 350 can be independently controlled to move between their folded position and their aligned position.

When the cover section 360 is in its folded position relative to the bow section 350, and the ramp arrangement is in its retracted position, the cover section 360 is configured to cover the front part of the bow 101 of the vessel 100 to prevent water surging over the front of the bow 101 and onto the deck 130, thereby rendering it more seaworthy.

In its deployed position, the cover section provides a longer overall length to the ramp arrangement, thereby reducing the inclination of ingress/egress. This is especially important as the vessel will include a "kneeling" capability when it is out of water (when the suspension is not engaged as will be explained below) to reduce the angle of inclination of the ramp arrangement for ingress/egress, and/or to level the vessel on an inclined surface such as a beachfront if required.

In its deployed position, it is envisaged that the ramp arrangement 300 can be configured to extend to a position in which the foremost point of the cover section 360 is below the water line 119 of the vessel 100.

Figure 10:
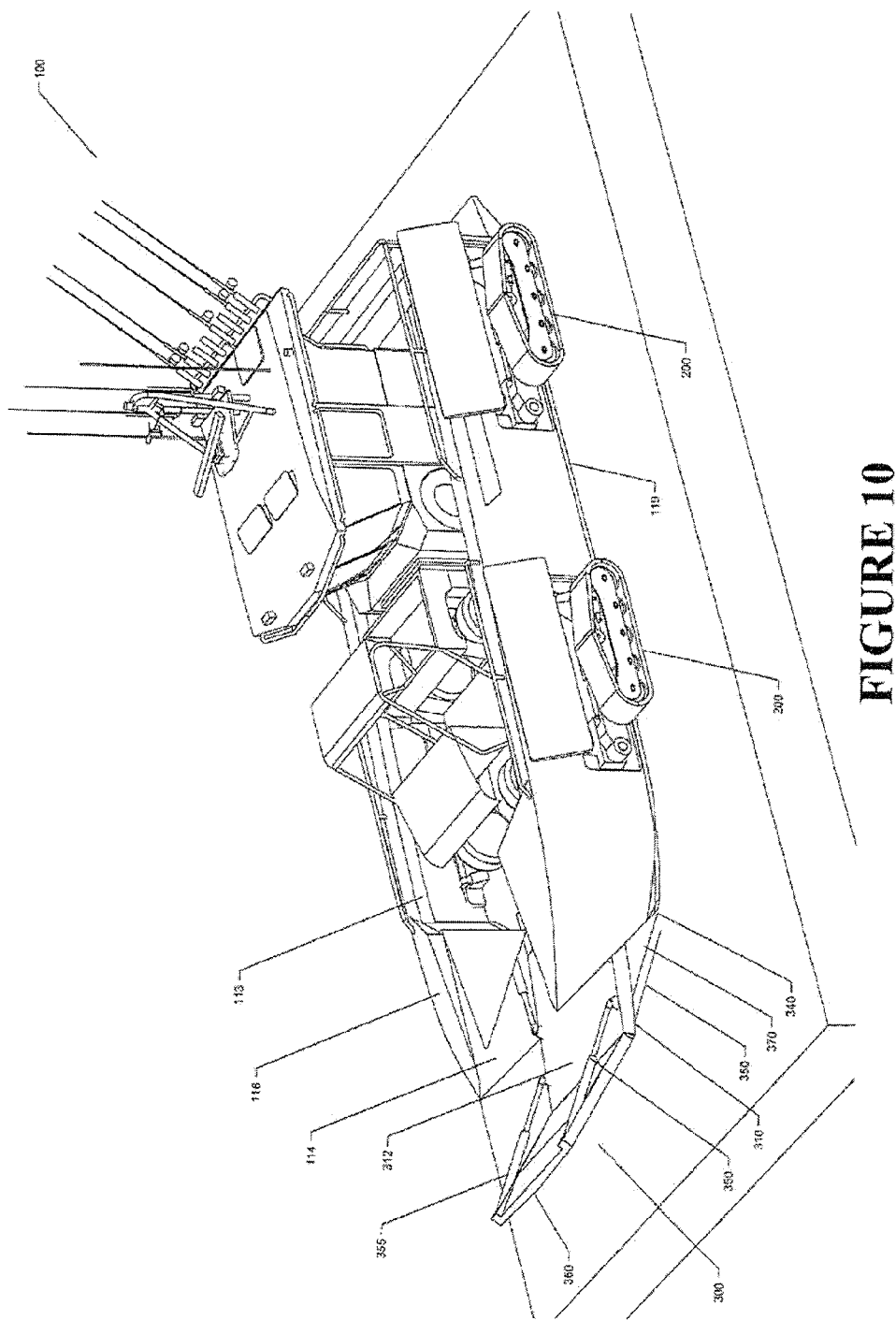
FIG. 10: shows a front perspective view of a vessel with its ramp arrangement partially opened.
Figure 11:
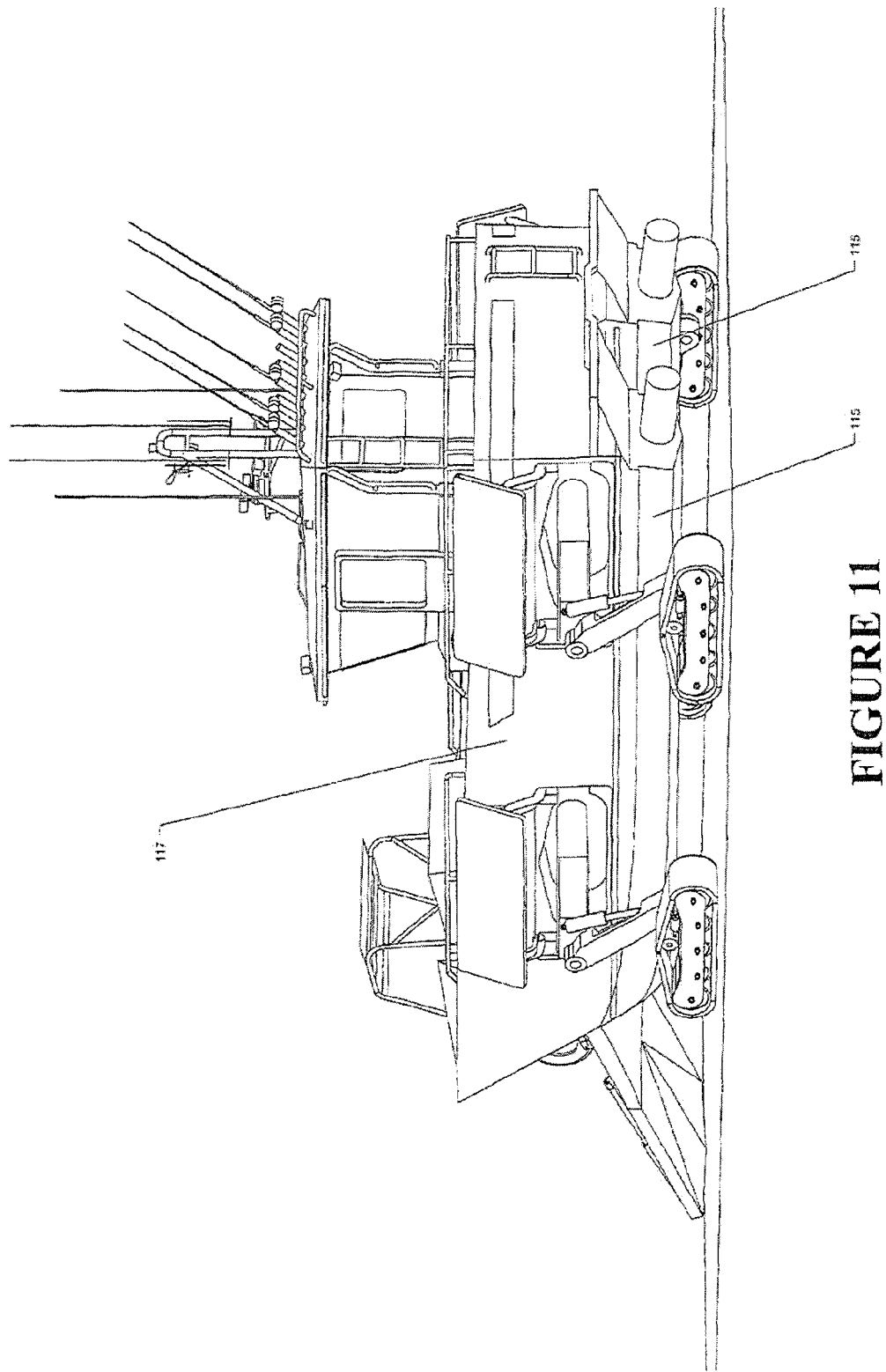
FIG. 11: shows a three quarter side view of a vessel with its motive pods deployed in a kneeling position for facilitating ingress and/or egress of matter or persons.

As may be seen in FIG. 10, the partly formed demi-hulls 115 each comprises an upper surface 116, that encloses an enclosed region (not shown) within the demi-hull. It is envisaged that his region will be sealed, thereby creating at least two or more watertight enclosed regions within the hull 110, making the vessel 100 more difficult to sink. Further, it is envisaged that the vessel will have enough reserve buoyancy and freeing ports etc to satisfy the rules and regulations to maintain safety of the vessel.

Each of the partly formed demi-hulls 115 comprises a recess 113 in one or more selected from its upper surface 116 and its inner surface 114. The recess 113 is aligned with the level of the deck 130 to thereby increase the effective width of the deck 130.

The width of the pathway provided by the ramp arrangement 300 is envisaged as being wider than the width of the deck 130 without the additional width provided by the recesses 113. The additional effective width of the deck 130 provided by the recesses 113 allow the wider pathway provided by the ramp arrangement 300 (which extends beyond the inner surfaces of the partly formed demi-hulls 115) to be taken advantage of. An effectively wider pathway is provided for ingress and/or egress of persons, vehicles or vessels (the 'cargo') to and from the vessel 100, and a wider area is provided for receiving and storing the cargo, at least in the first zone 140, and preferably also in the second zone 150.

In a further aspect, (and as shown in the embodiments in FIGS. 10 to 34) the vessel 100 is an amphibious vessel 100 and further comprises four motive pods 200. Each motive pod comprises a set of wheels 200 in the form of ten pairs of wheels 201, each running on a track arrangement 210 comprising an endless track formation 211.

Each motive pod 200 is associated with a hull recess 220 in the hull 110 or partly formed demi-hull 115, as the case may be.

Each motive pod 200 is deployable between a deployed position (shown in FIG. 16); and a stowed position (shown in FIG. 21) by a deployment mechanism 230.

In its deployed position the vessel 100 is movable on the motive pod 200 over land or shallow banks or reefs in water. In its stowed position the motive pod 200 are stowed for use while the amphibious vessel 100 is travelling in water.

A deployment mechanism 230 is associated with each motive pod 200. The deployment mechanism 230 is configured for moving a motive pod 200 between its deployed position and its stowed position as will be described below It is envisaged that in another embodiment (not shown), a single deployment mechanism 230 could be configured for deploying more than one motive pod 200. For example a central deployment mechanism could be deployed in the hull between two motive pods, that can actuate both motive pods to deploy.

The deployment mechanism 230 comprises a horizontal translation mechanism 240 and a lowering mechanism 250. The horizontal translation mechanism 240 is configured to move a motive pod 200 between a proximal condition (shown in FIG. 27a) and a distal condition (shown in FIG. 27b).

When a motive pod 200 is in its proximal condition, it is at least partially, and preferably fully, received into the hull recess 220; and when the set of wheels 220 is in its distal condition, it is located more distally of the hull 110 relative to the proximal condition (i.e. extended further from the outer sides 117 of the hull 110).

In the embodiments shown, the motive pods 200 are deployed distally or outwardly from the hull 110. However, it is envisaged that where two or more catamaran-type demi-hulls 115 are used, the motive pod 200 could be deployed proximally or inwardly of the outer demi hulls from an inner surface 114.

The horizontal translation mechanism 240 comprises a moving member 242 linearly movable on a telescoping arrangement 246, which includes a leg stub axle 248. The moving member is moved by a linear actuator in the form of a hydraulic ram 244 which pushes or pulls the moving member 242 into or out of the hull recess 220. The moving member 242 comprises end stop formations 243 a& b (shown in FIGS. 57A and 57B) for preventing the linear actuator form pushing out too far or pulling it in too far. It is envisaged that in a preferred embodiment, the moving member 242 will be lockable in position by a locking mechanism (not shown) so as not to rely solely on the linear actuator for holding it in position. In a preferred embodiment, the locking mechanism will be manually operable from the deck as a safety backup, and preferably through hatches in the deck.

The pivot member 252 is preferably configured when in the deployed and use condition to gain lateral support from the hull of the vessel. A hull contact plate 296 as seen in FIGS. 57a and 57b is shown provided as part of the hull and against which the pivot member can bear. This provides further rigidity to the pivot member 252 and prevent the pivot member from flexing towards the hull centreline. The pivot member 252 may have an extension portion that when in the deployed and use condition extents above the pivot axis A and may likewise bear against the hull. This extension portion providing further rigidity to the pivot member 252 and prevent the pivot member from flexing away from the hull centreline.

Figure 57C:
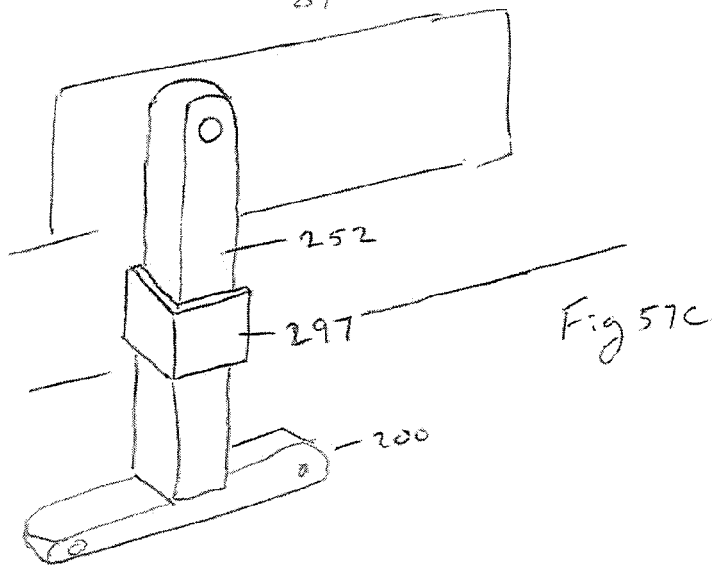
FIG. 57C: shows an angle bracket as part of the hull showing how the pivot member can register therewith in order to allow it to gain additional lateral rigidity when in the deployed position.

In addition or alternatively a lateral movement prevention feature may be provided by the hull and/or the pivot member. This may be a lip or scallop or other registration feature located to allow the such to become registered when the pivot member is fully deployed and then ensure the pivot member is captured at least in one lateral direction, relative the hull. An angle bracket 297 may be provided protruding from the hull to allow the pivot member to register therewith as seen in FIG. 57c.

The motive pod 200 is supported by a guide arrangement in the form of telescoping tubes 245 as shown in FIGS. 27 a, b & c. The telescoping tubes 245 preferably have a generally rectangular cross section and are hollow, however it will be appreciated that many different configurations and shapes are possible in other embodiments. It is envisaged that many other guide- or track-like supporting configurations are possible for supporting the motive pods 200 in an extendable manner when they are being moved at least laterally.

Examples include ladder type configurations, I-beams configurations, or any other suitable engineering choice.

The deployment mechanism 230 further comprises a lowering mechanism 250 for moving the motive pod 200 between a lower position in which the lowest point of motive pod 200 is lower than the hull 110, to thereby allow the vessel to be moved over land on the motive pod 200, and an upper position in which the motive pod 200 is located in a position suitable for lateral movement into the hull recess 220.

In the preferred embodiment shown, the lowering mechanism 250 lowers the motive pod 200 by pivoting them on a pivoting member 252 around pivot axis A via pivot joint 253. A linear actuator in the form of a hydraulic ram 254 drives the pivoting movement of the pivoting member 252 about a horizontally oriented pivot axis A. Pivot axis A is oriented substantially transversely to the longitudinal direction or length of the amphibious vessel 100.

In a preferred embodiment shown in FIGS. 55a-55g and 39-52, one embodiment of an aligning mechanism 255 is shown. The aligning mechanism 255 serves to align the motive pod 200 with the hull recess 220 for movement into its stowed position when the lowering mechanism 250 is moving from its lower position to its upper position. The aligning mechanism 255 further serves to align the motive pod in a suitable position for use in its deployed position as the lowering mechanism 250 is moving from its upper position to its lower position.

The aligning mechanism comprises a stop member 256 that is located on the pivot member 252, as well as a receiving formation 257 that receives a free end of sliding elongate member 258 through it in a linearly sliding fashion. The receiving formation 257 is also connected to the pivot member 252 in a pivoting fashion by a pivoting joint 257a.

An opposed end of the sliding elongate member is pivotally connected to the motive pod.

Figure 39:
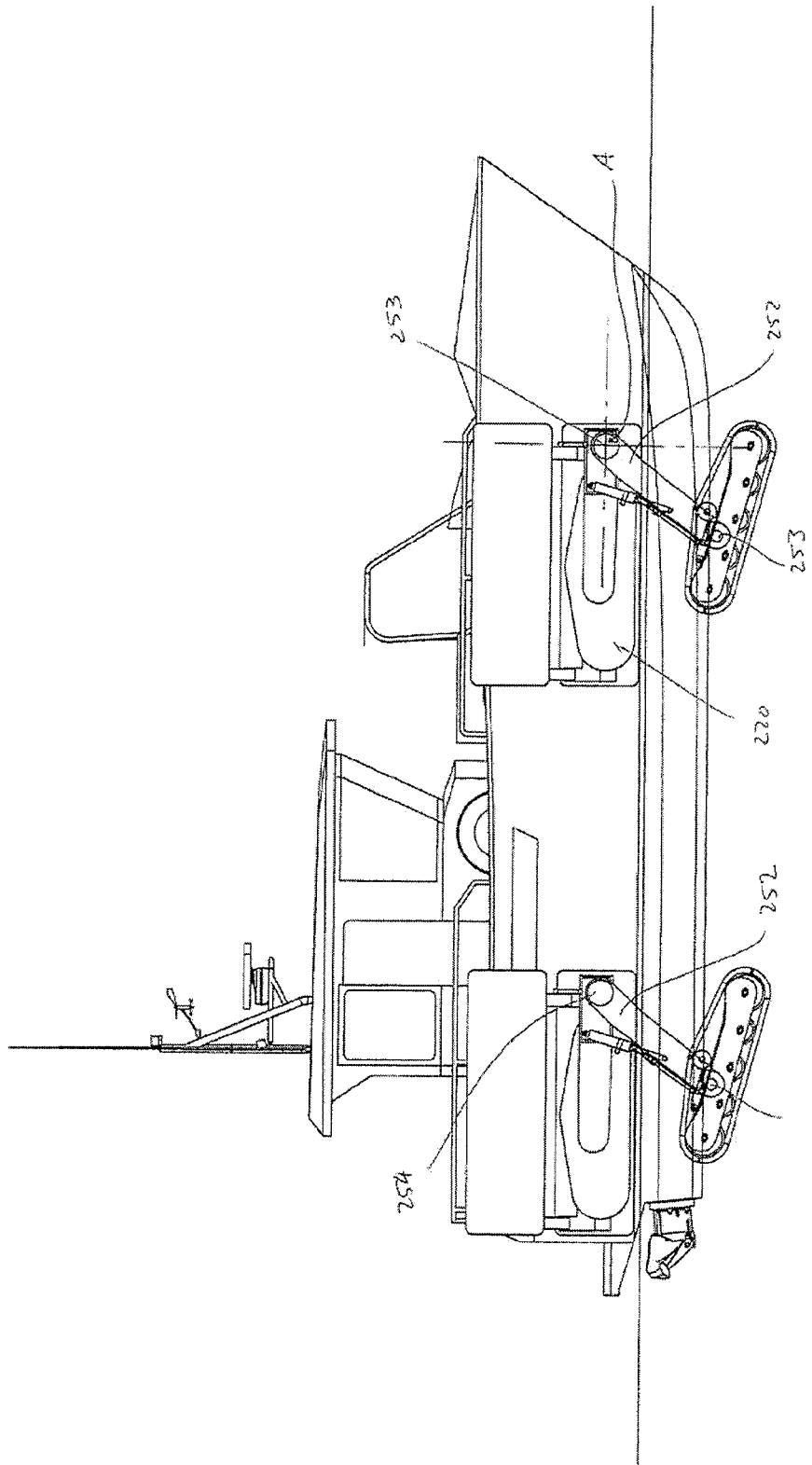
Figure 40:
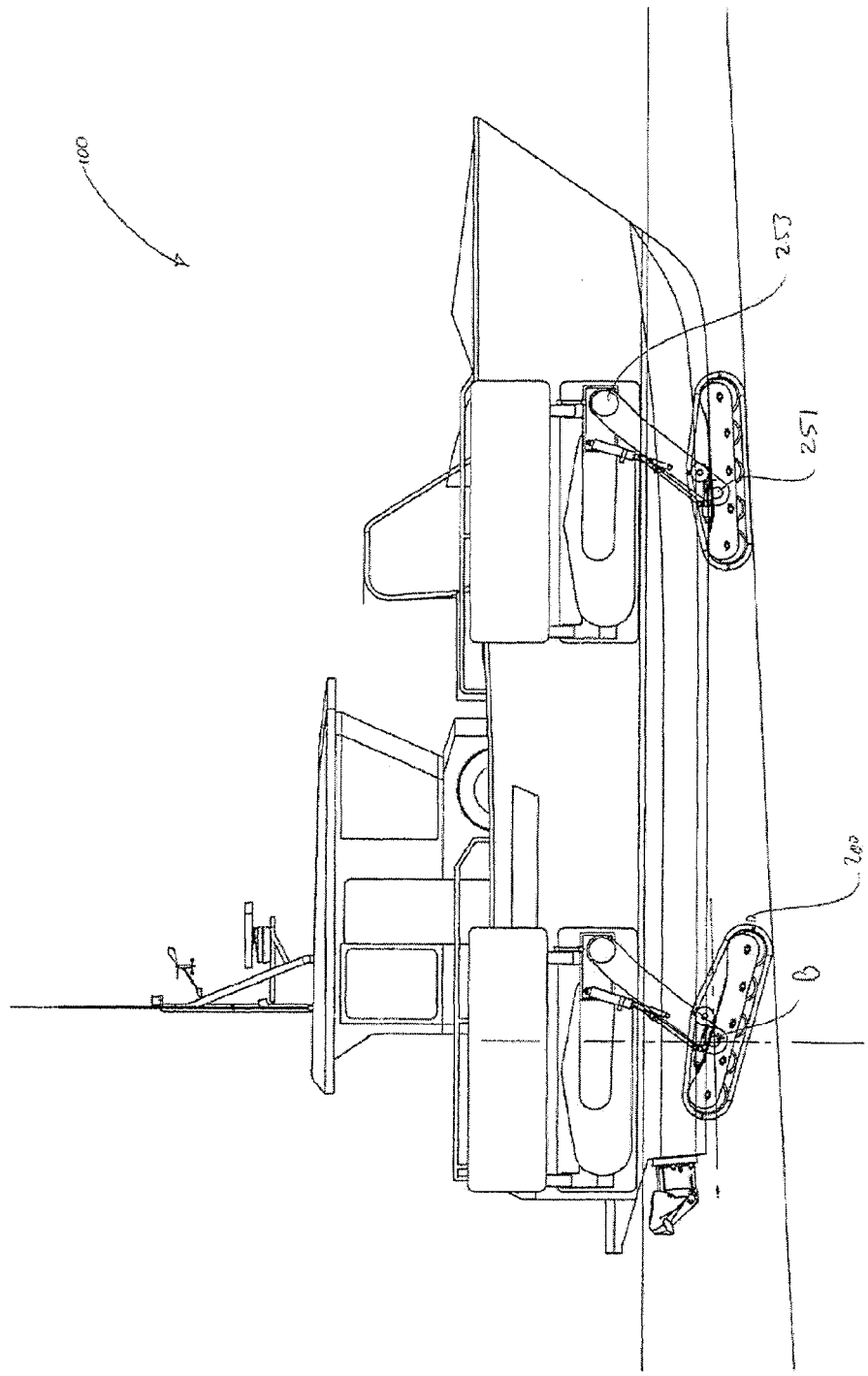
Figure 41:
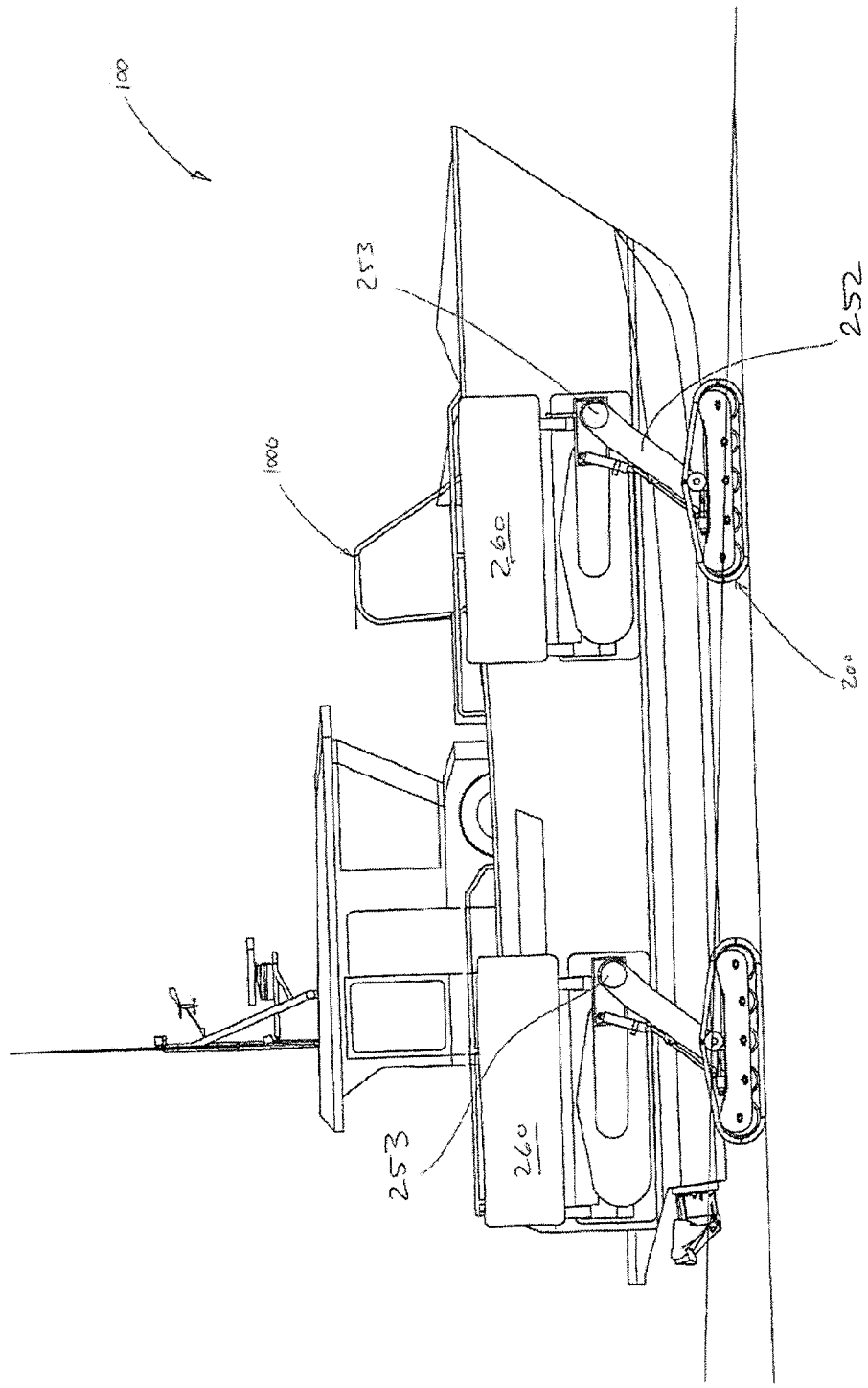
Figure 42:
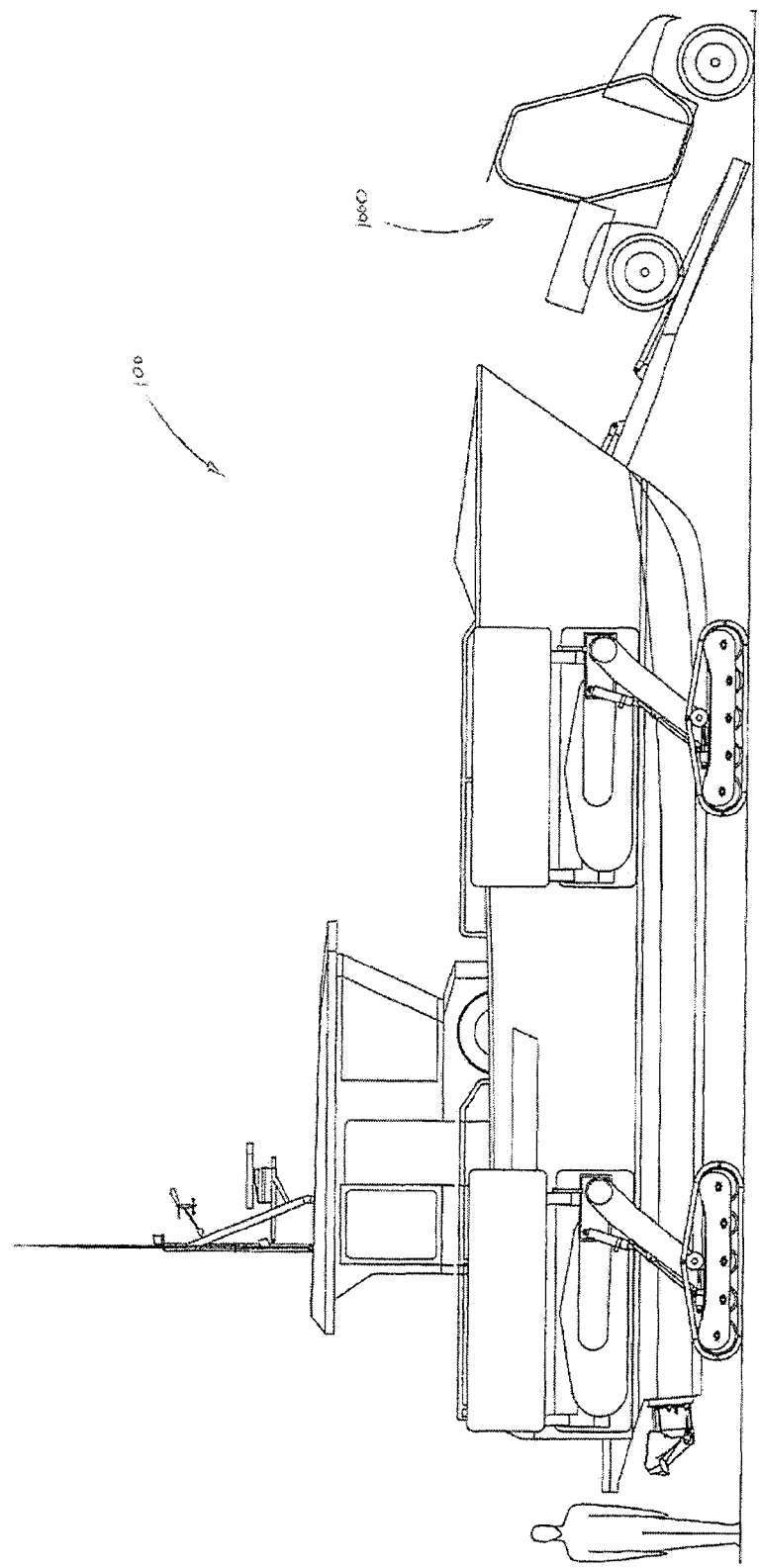
Figure 43:
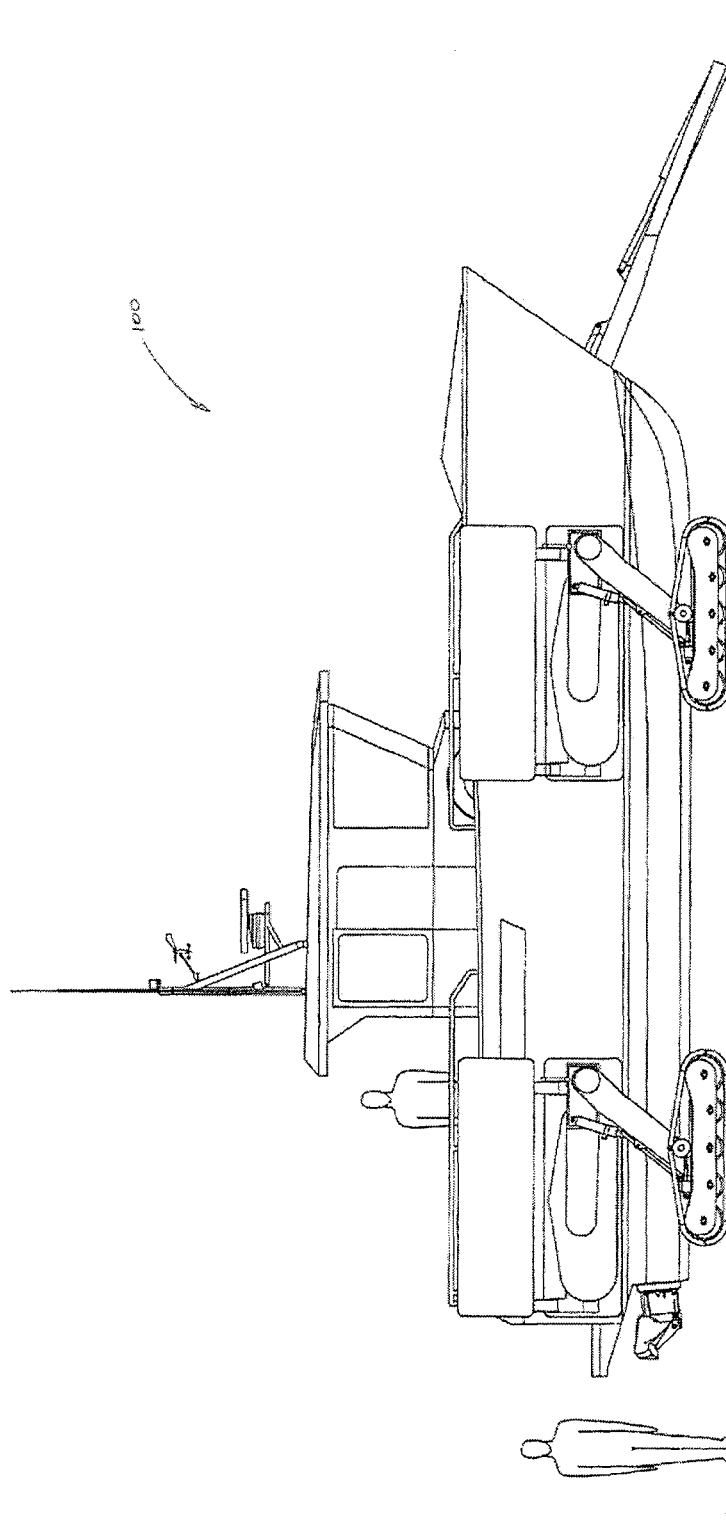
Figure 44:
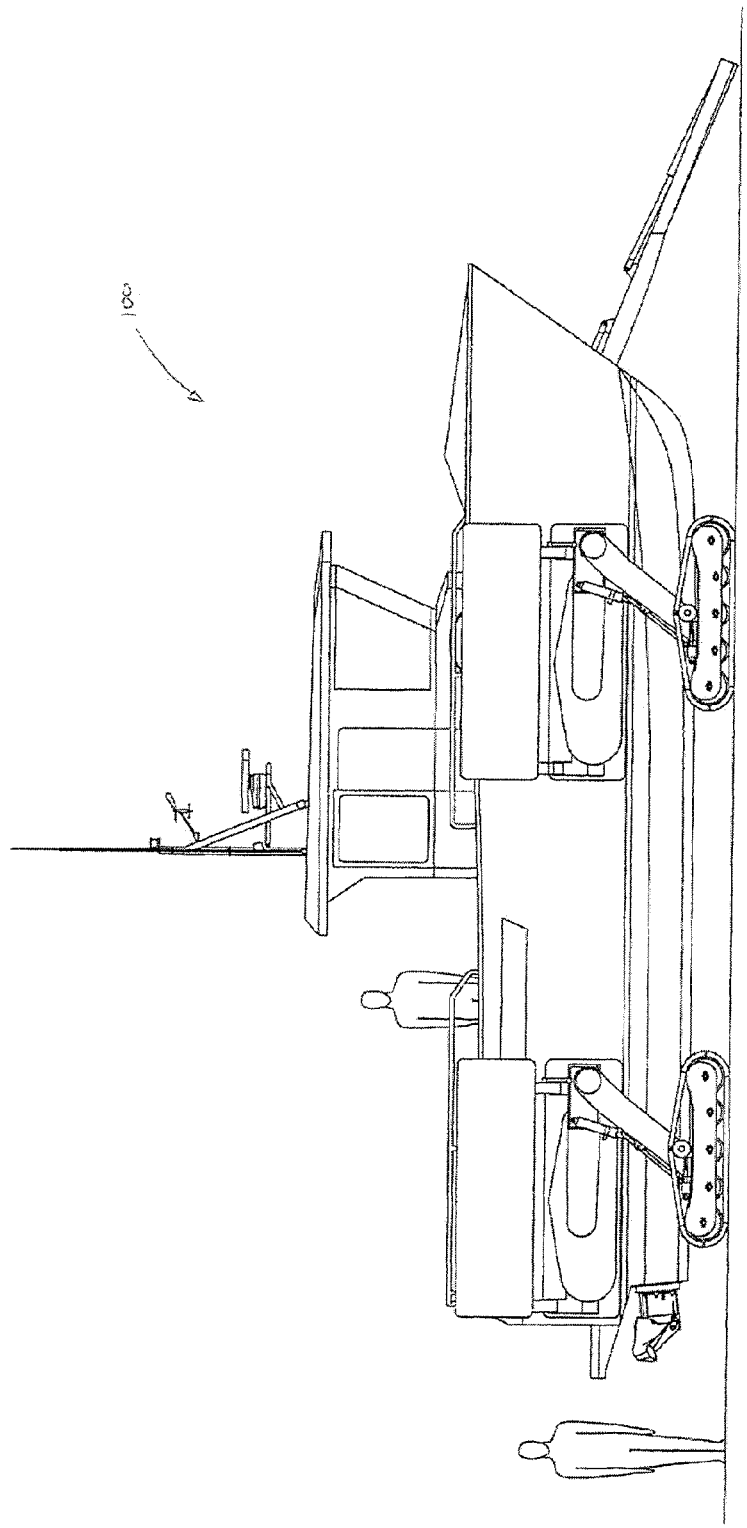
Figure 45:
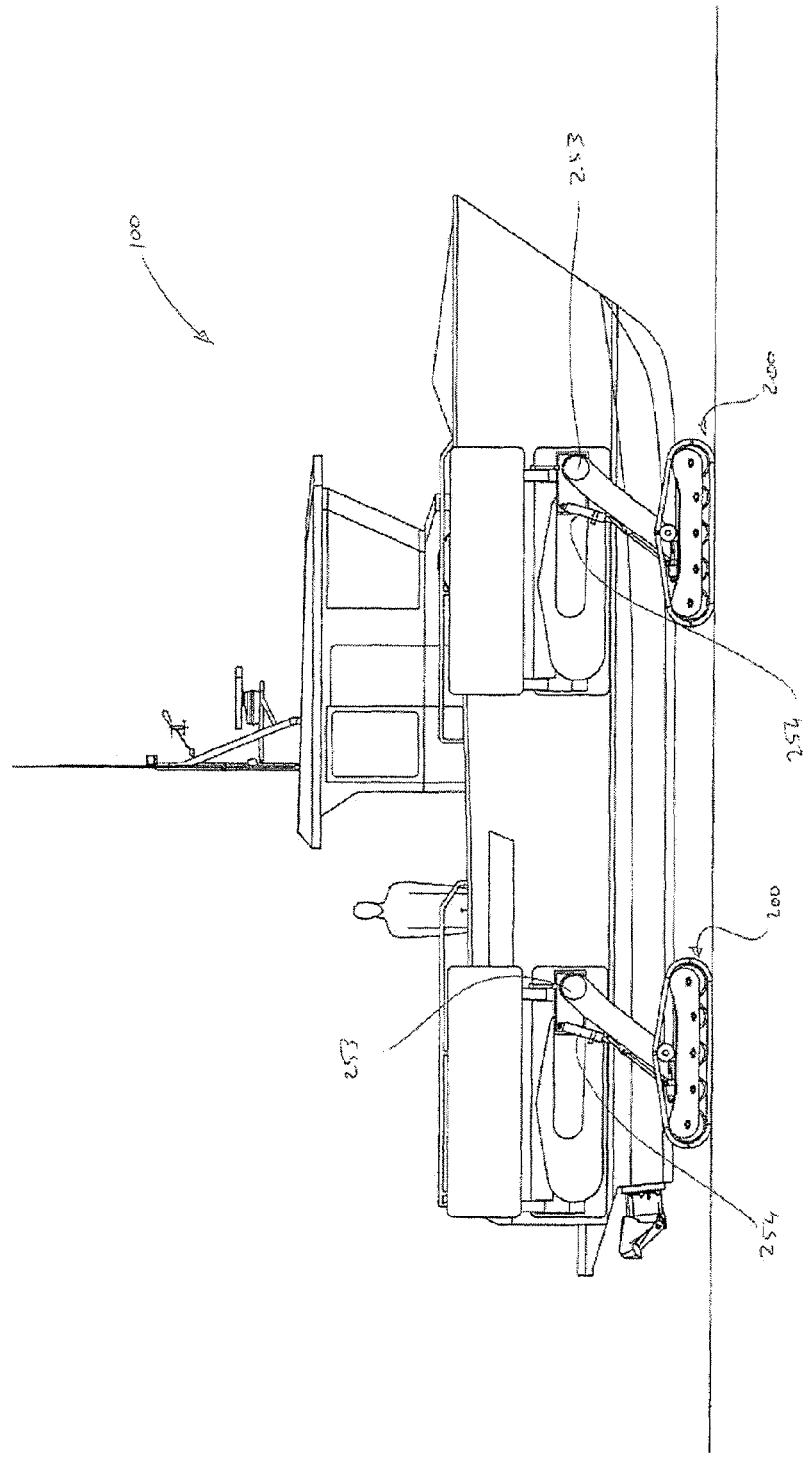
Figure 46:
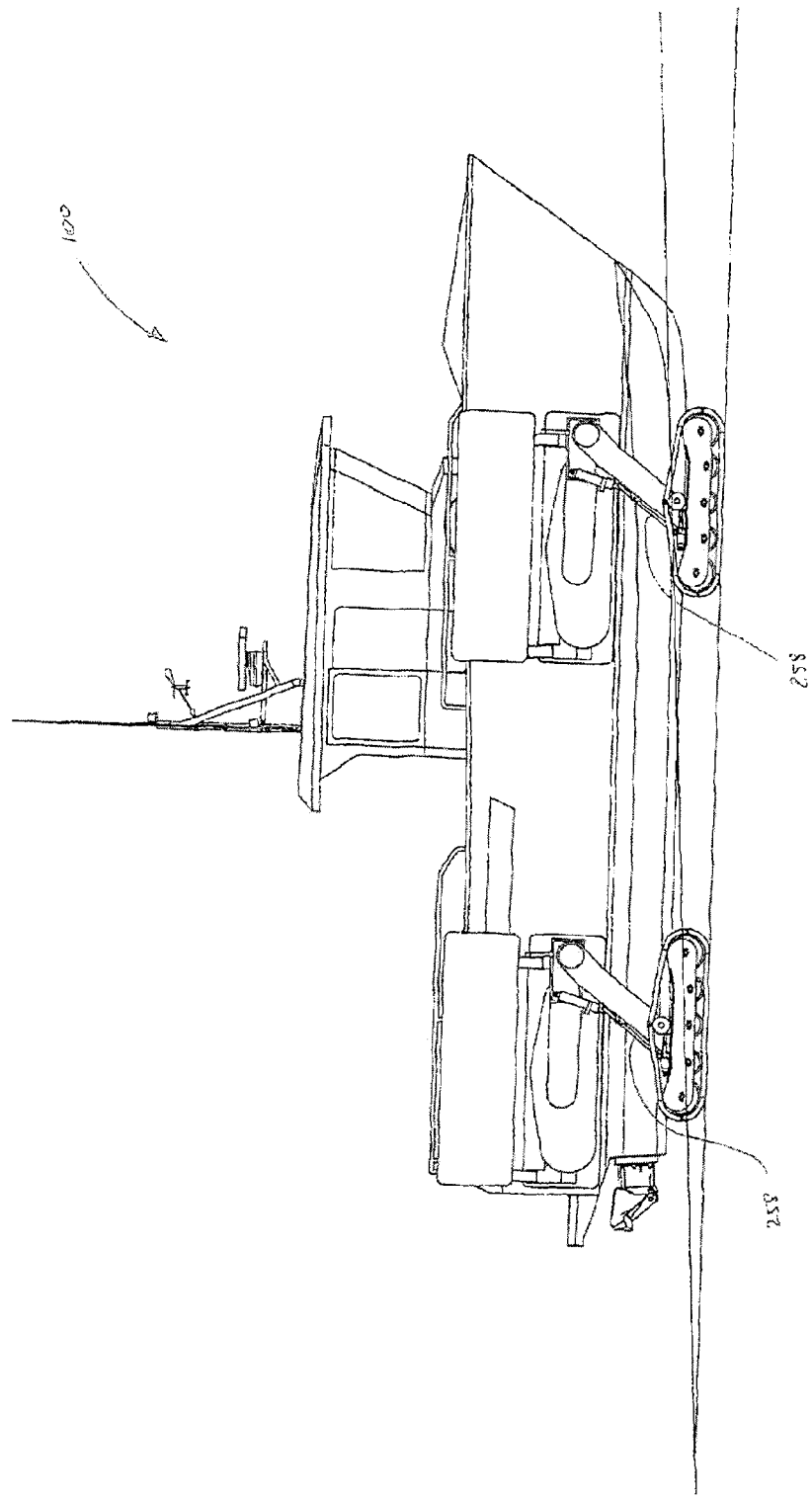
Figure 47:
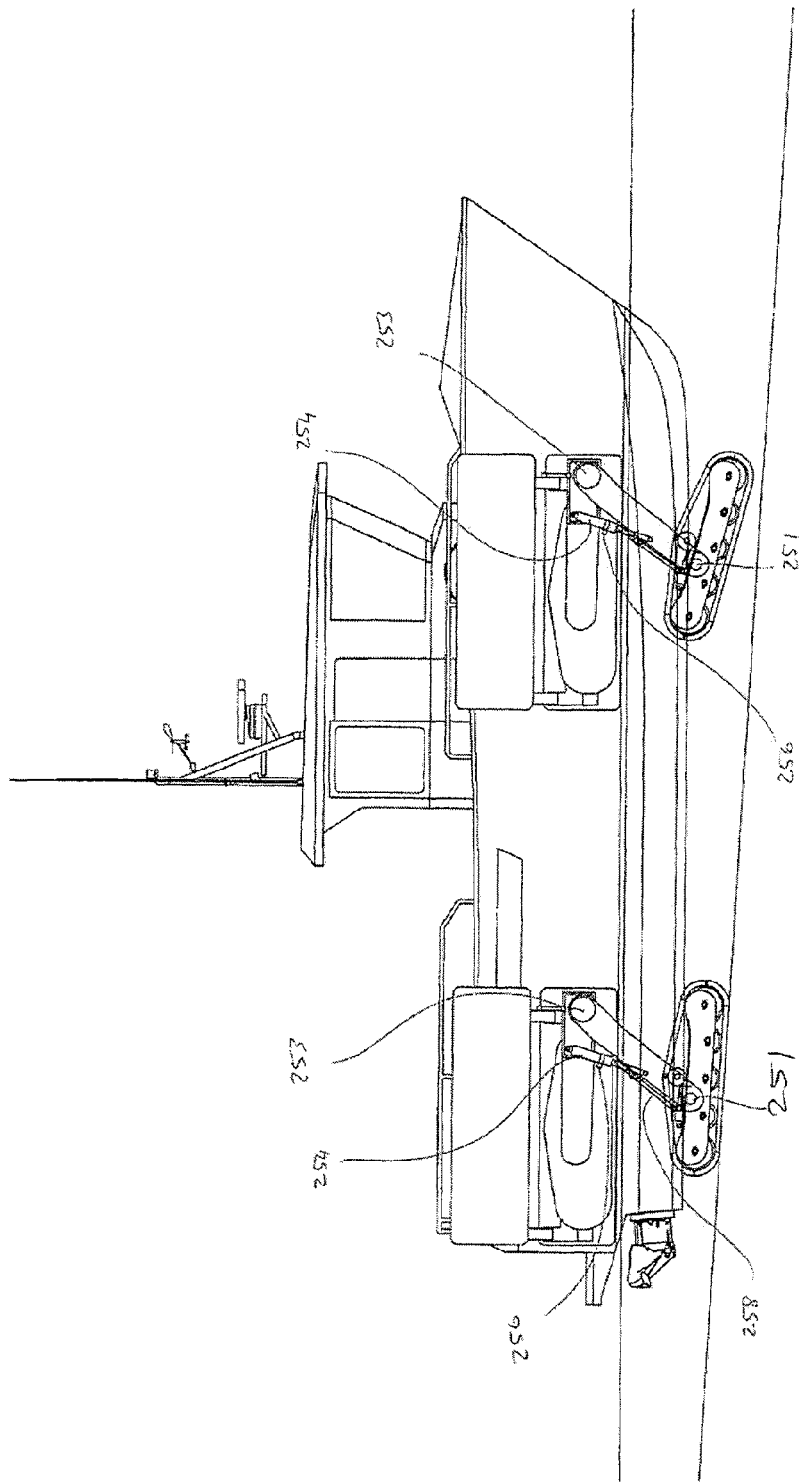
Figure 48:
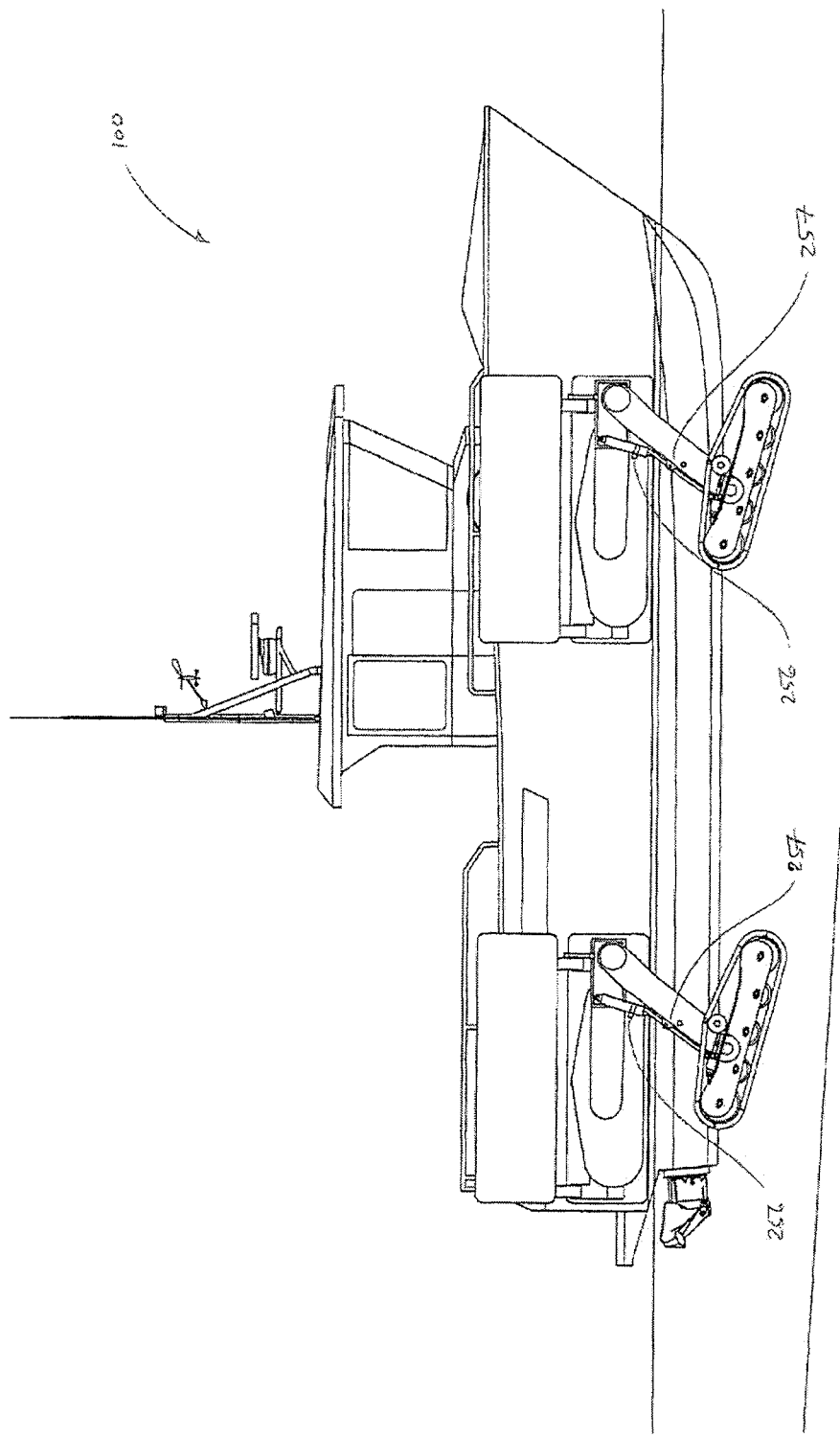
Figure 49:
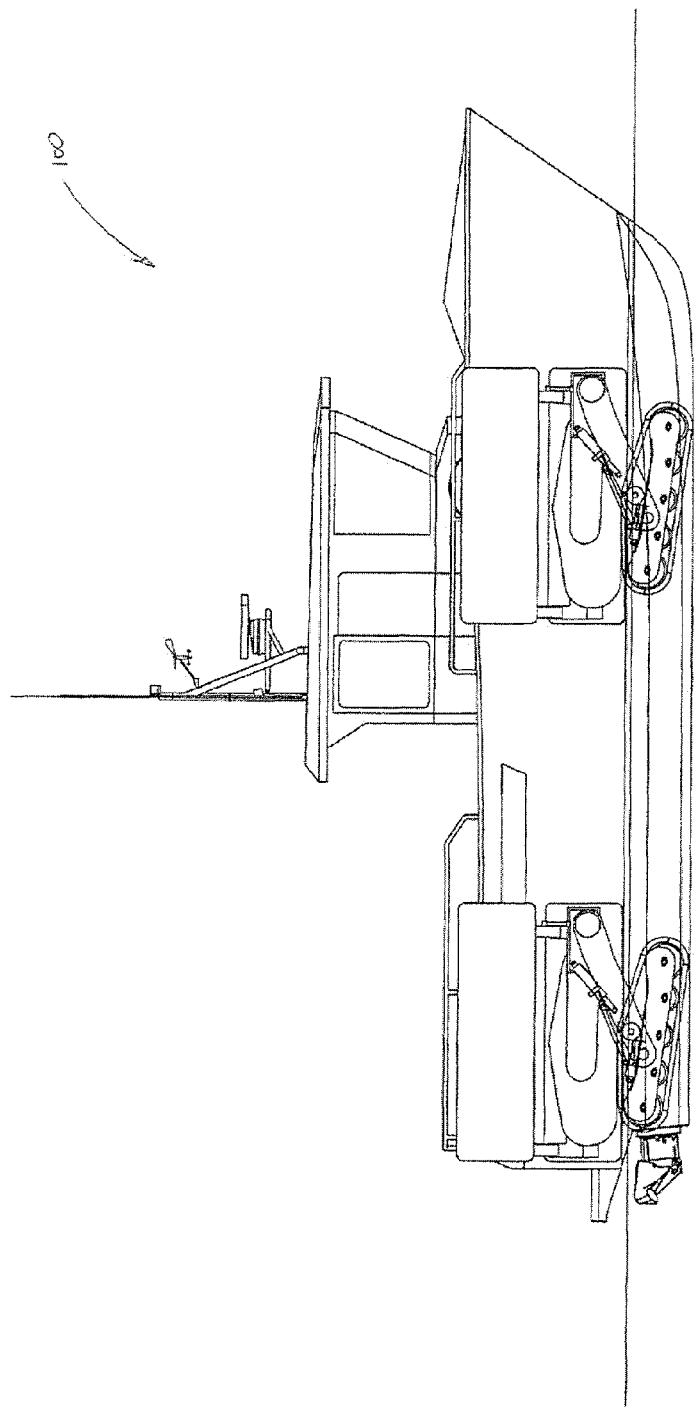
Figure 50:
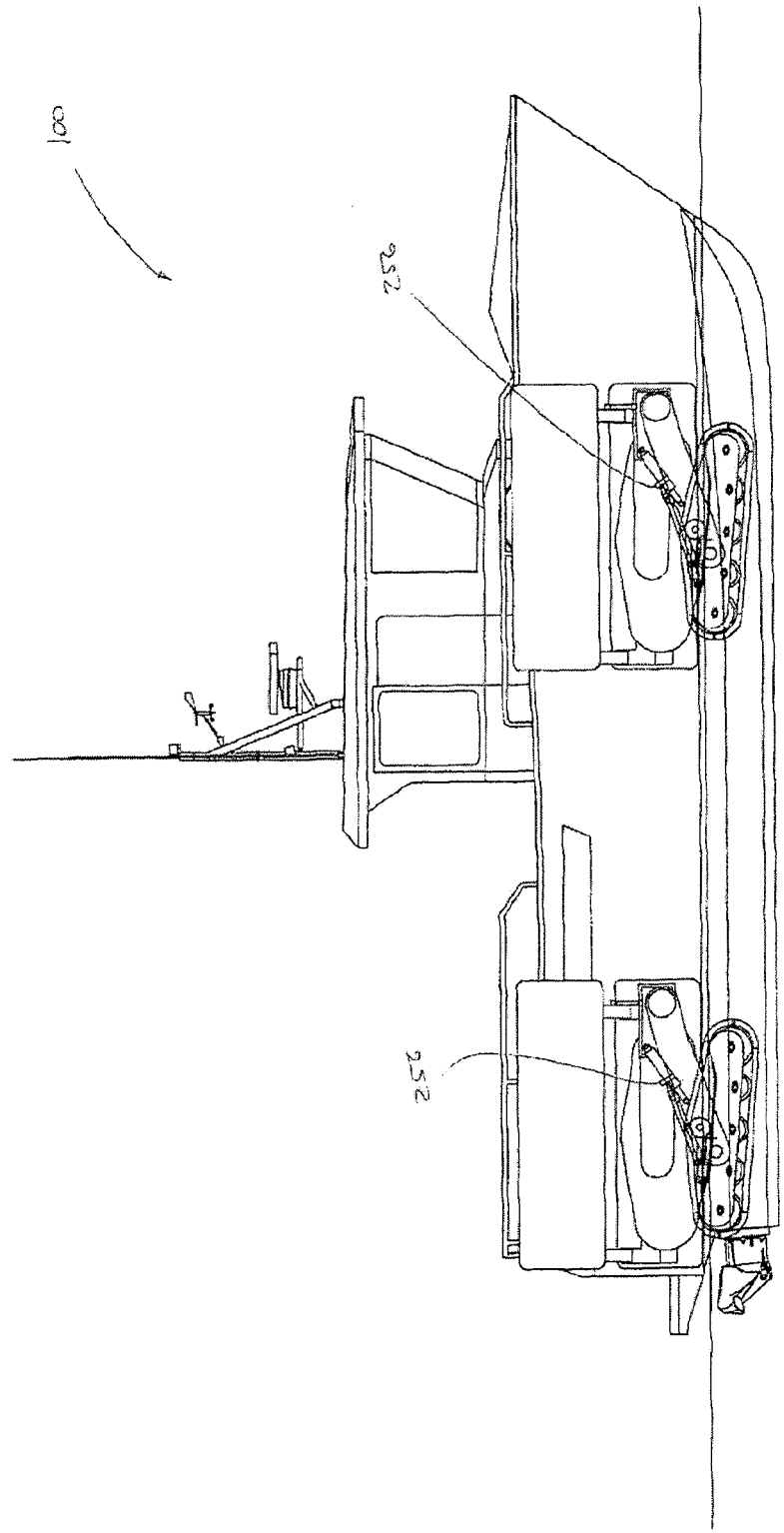

The pivot member 252 is connected to the motive pod 200 asymmetrically via a pivot joint 251 to pivot about pivot axis B (shown in FIG. 40), and without any other structural connections, so that the unbalanced weight of the pod 200 hanging freely causes the front end of the motive pod 200 to dip downwardly under gravity when the pod 20 is in its deployed position without contact with a floor surface (as shown in FIG. 39). This causes the sliding elongate member 258 to be pushed up ward as far as it can go through the receiving formation 257. When the lowering mechanism 250 is in its lower position, the sliding elongate member 258 is distanced far enough from the stop member 256 so that it does not make contact with the stop member 256 (as shown in FIG. 39).

Figure 51:
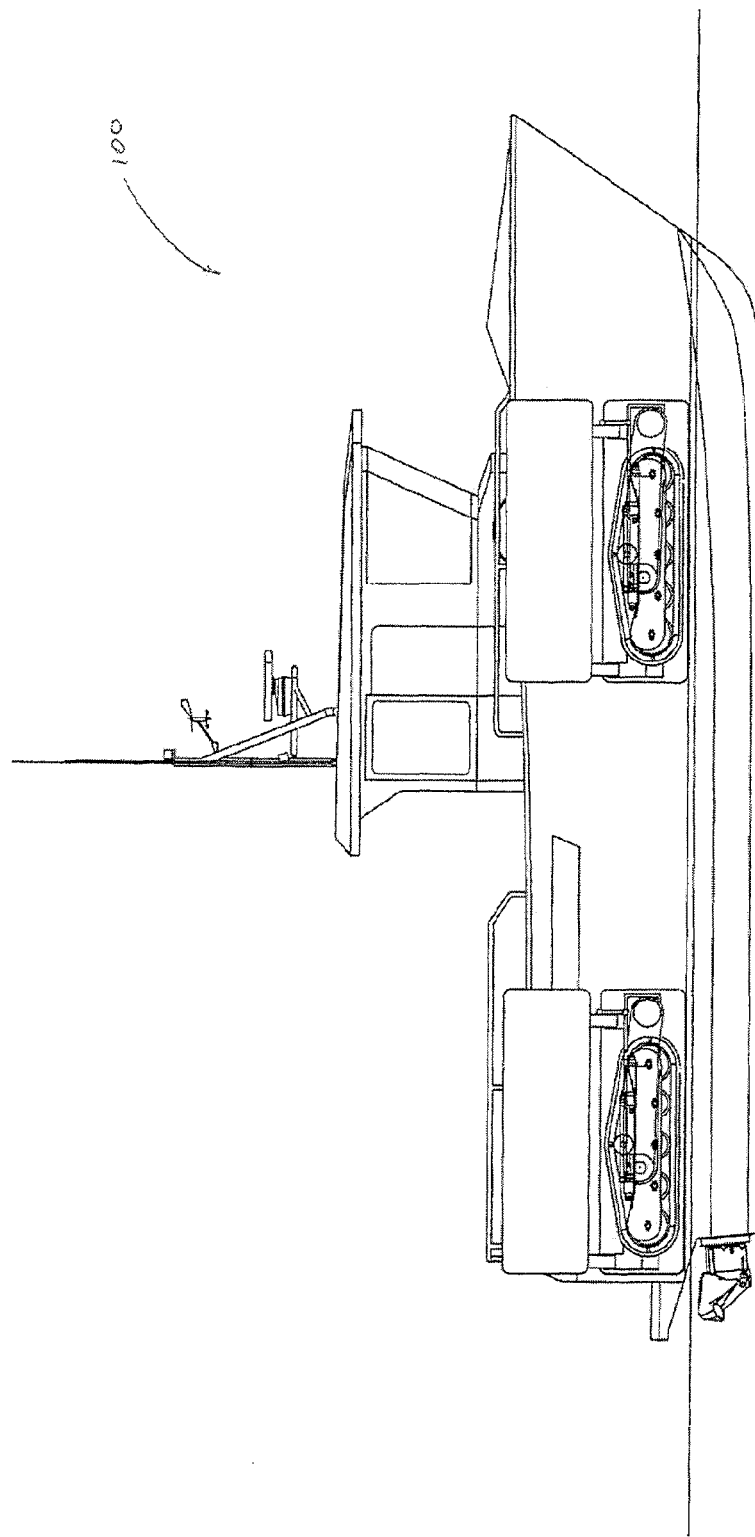
Figure 52:
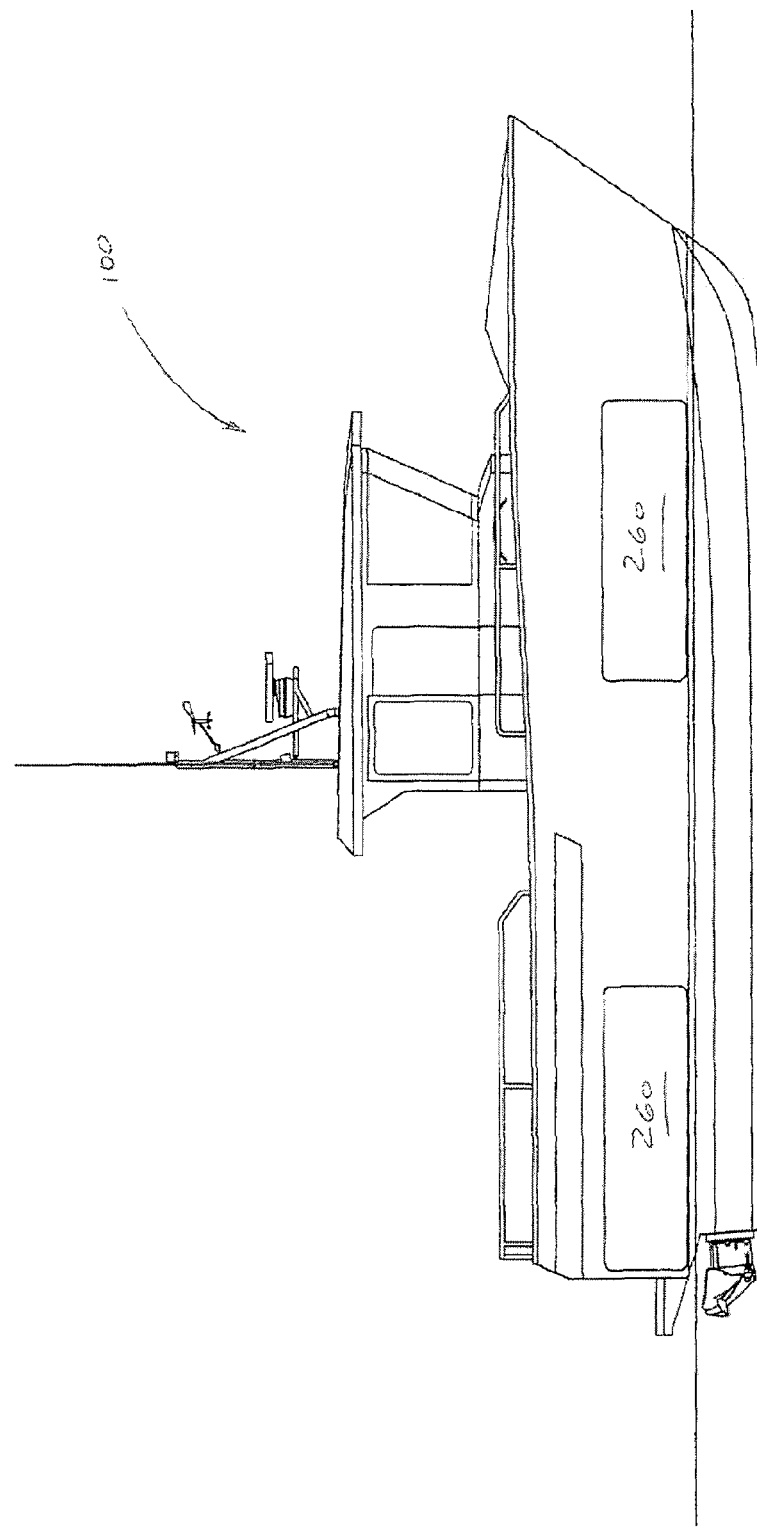

However, as the lowering mechanism 250 is moved towards it upper position by pivoting of the pivot member 252 about pivot axis A (shown in FIG. 39) via pivoting of pivot joint 253, the free end of the sliding elongate member comes closer to the stop member 256. Eventually, the free end of the sliding elongate member 258 makes contact with the stop member 256. Further movement of the lowering mechanism 250 towards its upper position by further pivoting of the pivot member 252 about pivot axis A will cause the stop member 256 to push on the free end of the sliding elongate member 258, causing it to rotate the motive pod 200 about the pivot joint 251 relative to the pivot member 252. As the lowering mechanism 250 is further moved to its upper position, the motive pod is pivoted about the pivot joint 251 to align correctly for being received into the hull recess 220 by horizontal translation (as shown in FIG. 51). This operation is shown as a series of steps in sequence in FIGS. 45-52.

Figure 53:
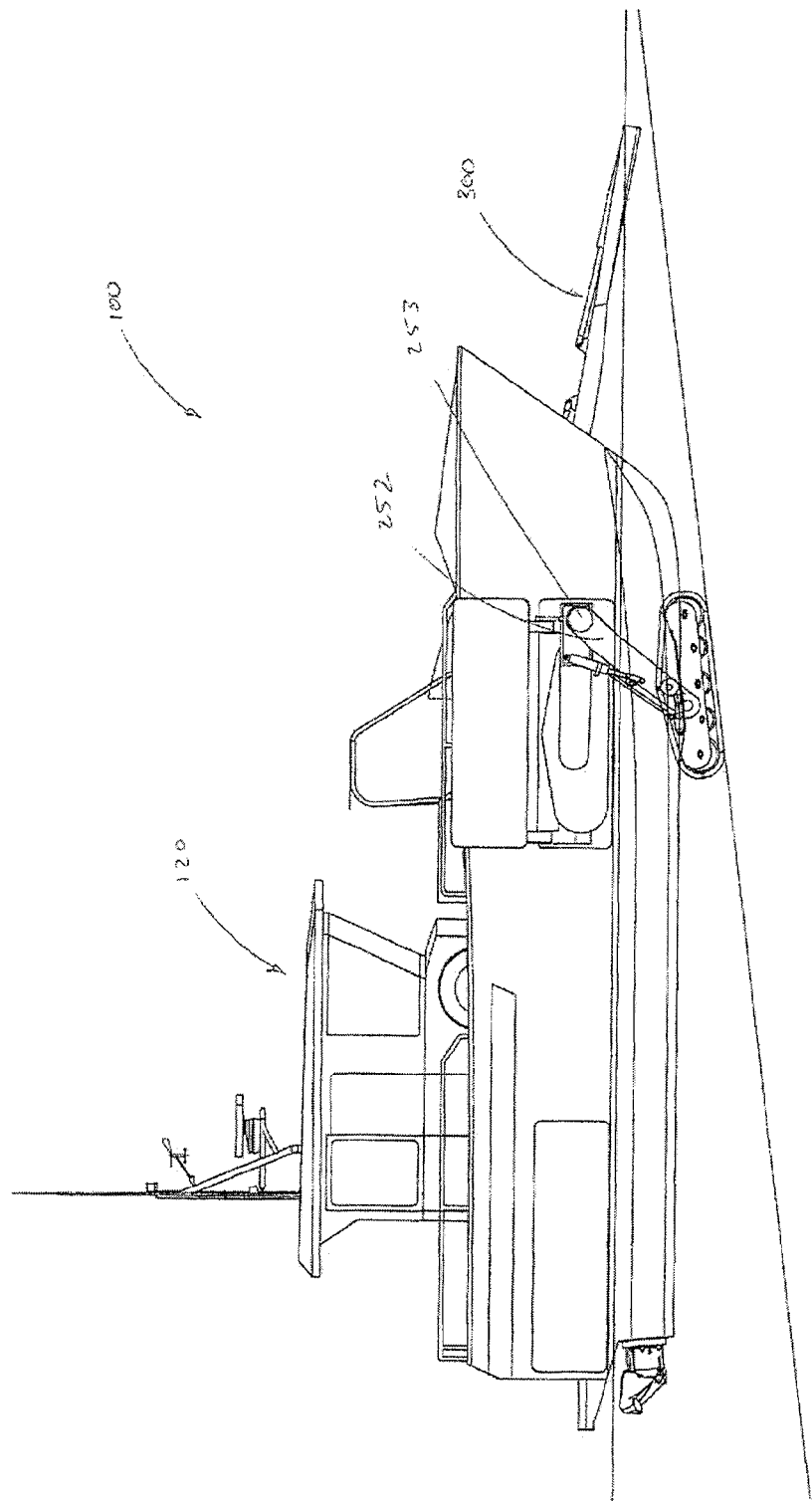
FIG. 53: shows a side view of a vessel with its fore motive pods engaged on land, and its ramp in a deployed position.
Figure 54:
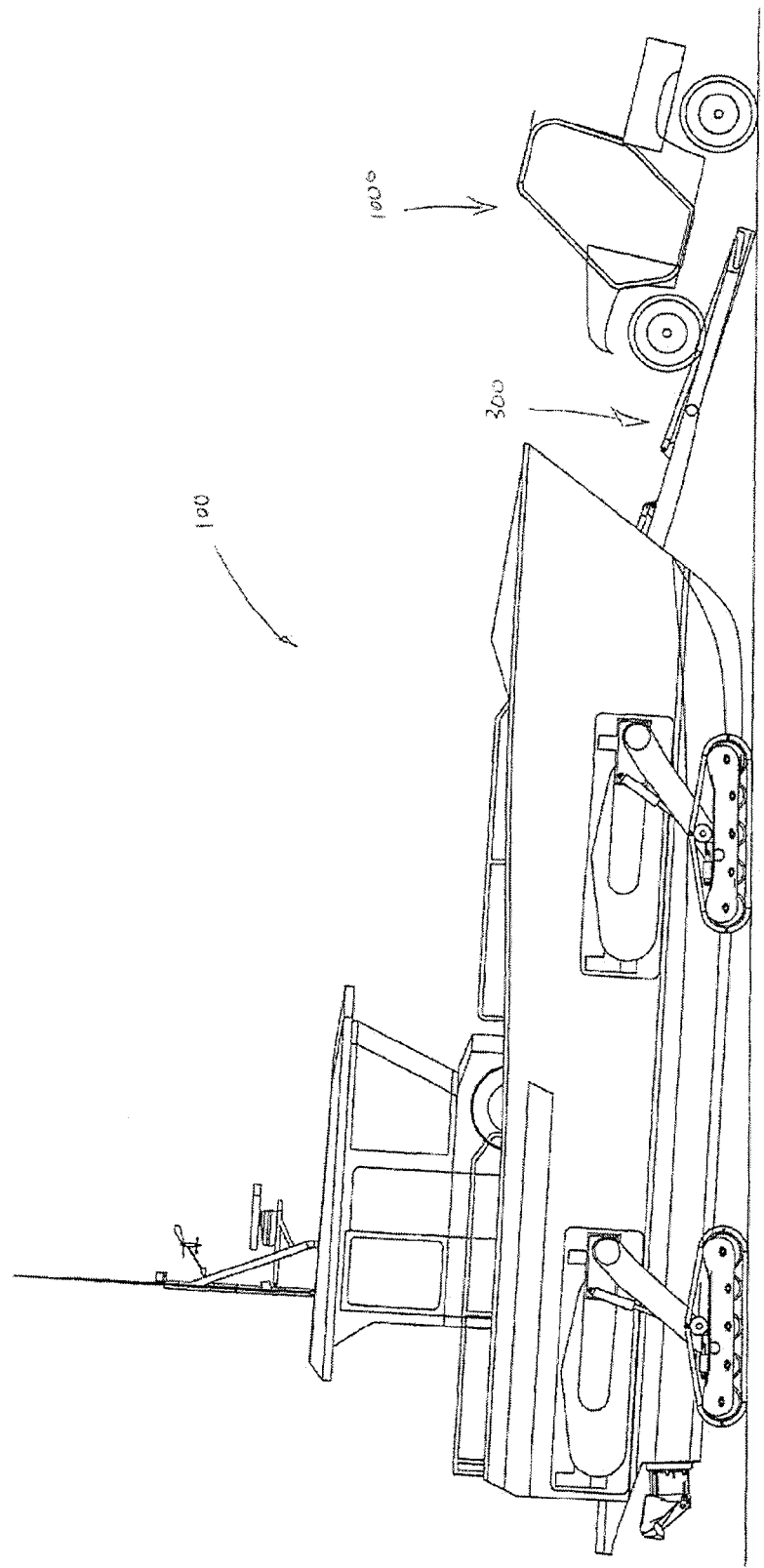
FIG. 54: shows a side view of a vessel with its motive pods in a deployed position, with the lowering mechanism of the aft motive pods lowered further than the lowering mechanism of the for motive pods, to present the vessel in a "kneeling" position to facilitate lower ramp angles of the ramp arrangement.
Figure 56:
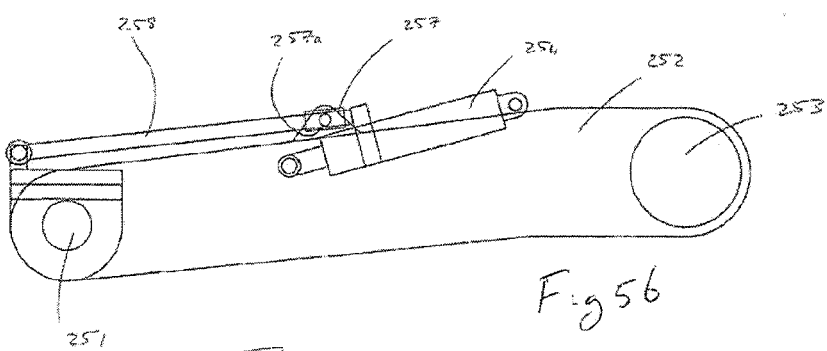
FIG. 56: shows a close up side view line figure of the lowering mechanism of FIGS. 55a-g.

The reverse of this sequence is carried out in preparation for beaching the vessel 100 as shown in the sequence of FIGS. 35-45. It is envisaged that the deployment mechanisms can be operate independently of each other. This will allow for usage of the vessel 100 in many formats. One such format is in a "kneeling" position as shown in FIG. 54 to facilitate the reduction of the ramp access angle. Another alternative use is to only use the front motive pods to make contact with the seabed as shown in FIG. 53.

In order to drive the motive pod 200, it is envisaged that one or more of the motive pods 200 will be provided with a drive transmission (not shown) for driving movement of at least one wheel of the motive pod 200. Motive pods 200 are envisaged to be driven by hydraulic drive units (not shown) incorporated into the motive pods 200. Such hydraulic drive units are known, and the specific workings will not be discussed in this specification. However, such hydraulic drive units are envisaged as being similar to those found on small to mid-sized excavators. Also, it is envisaged that the hydraulic drive units will have quick release hydraulic couplings (not shown) for convenient removal for maintenance and the like.

It is envisaged that one or more of the motive pod 200 can be driven by a drive transmission. In the embodiments shown, each of the motive pods 200 are driven by an auxiliary diesel motor (not shown) powering a hydraulic power pack (not shown) located on the vessel. A pressurised hydraulic line extends to a hydraulic drive unit in a motive pods to power it.

Alternately, in other embodiments, mechanical transmissions are envisaged, however, such transmissions are expected to increase overall weight of the vessel and reduce its seaworthiness.

It is envisaged that in alternative embodiments, separate prime movers (not shown) could be provided for each or any of the motive pods 200.

The amphibious vessel 100 also comprises a control system (not shown) for controlling the steering and/or drive of the motive pods 200. It is envisaged that the steering of track arrangements 210 could be controlled by controlling the drive to alternate and/or adjacent tracks so that they move at different speeds, thereby causing the vessel 100 to turn (i.e. "skid steering").

Alternately, the steering could be controlled by changing the angular orientation of at least one or more wheels 201 in a motive pod 200 in a more conventional steering configuration. In one embodiment, the angular orientation of an entire motive pod may be changed (e.g. similar to the steering operation of a snow mobile).

Steering will preferably be carried out by means of a steering wheel (not shown), preferably located on the deck 130, although in other embodiments it is envisaged that steering and/or control of the vessel could be carried out by one or more selected from a steering wheel, at least one or more joysticks and foot pedals. In a preferred embodiment, steering of the vessel on land (e.g. a pair of joysticks controlling track movement) is carried out on separate controls from the controls used for steering the vessel at sea (e.g. a steering wheel moving a rudder).

Further, the control system may be adapted and configured to provide for sets of motive pods to be driven, in order to provide for two or four pod steer (for example if the two left hand pods move forward, while the two right hand pods move backwards).

While a plurality of wheels 201 are shown in the embodiments for each motive pod 200, it is envisaged that for smaller boats, only one wheel 201 could be used per motive pod 200. Also, combinations of one or more wheels 201 per motive pod 200 together with sets of wheels 201 with or without associated track arrangements 210 could be provided per motive pod 200. For example one central set of wheels 201 could be provided at the bow 101, and two sets of wheels each with associated track arrangements 210 could be provided towards the stern 102.

Hull recess covers 260 are also provided. These are for covering the hull recesses 220 when the motive pods 200 are in their stowed position, and are configured to reduce drag on the amphibious vessel 100 when the vessel is moving through water. The hull recess covers also protect the motive pods 200 from the environment, and provide an enclosed space for more effective flushing (as will be described below).

Figure 21:
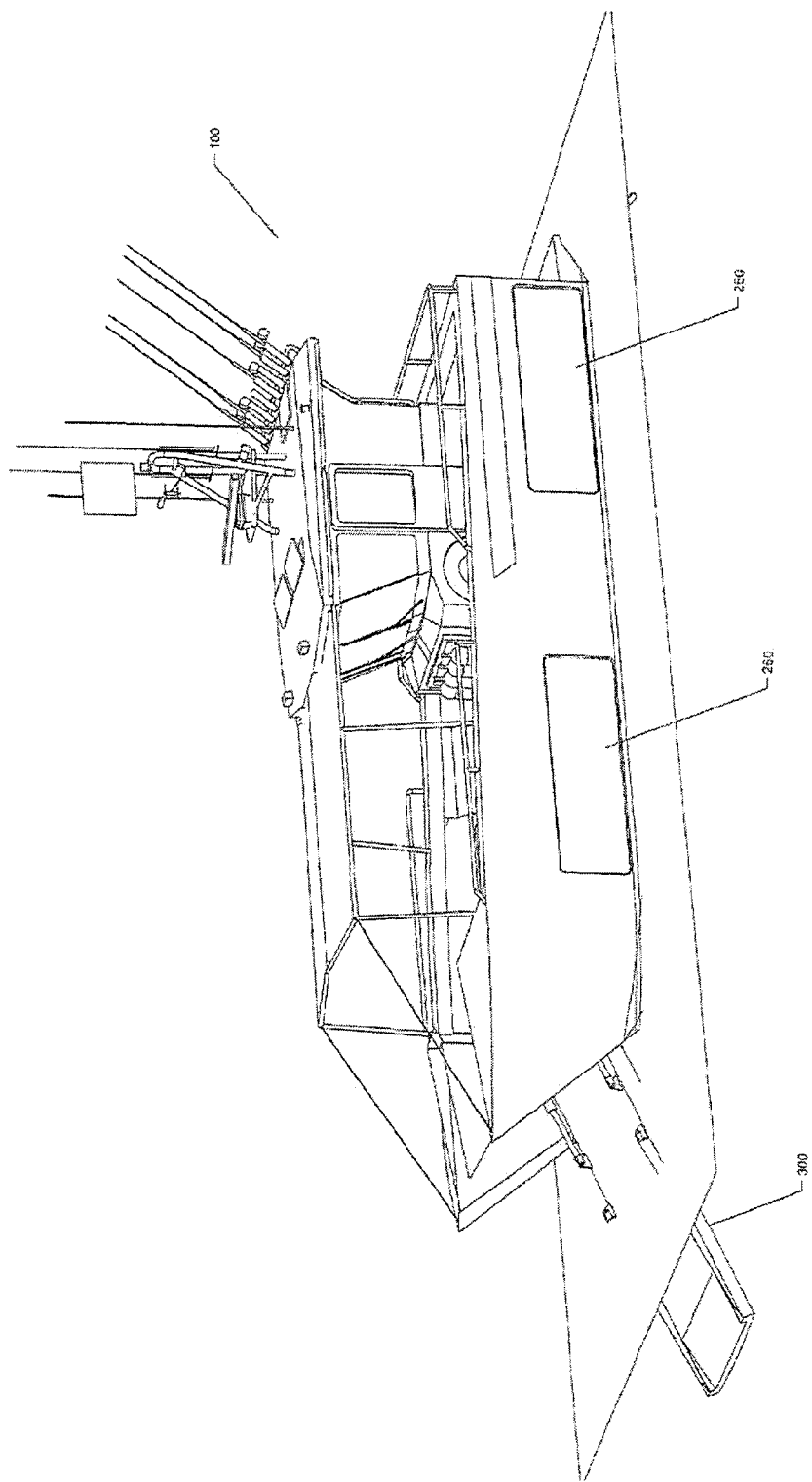
FIG. 21: shows a top perspective view of a vessel in water, showing how the ramp arrangement can extend below the surface of the water.
Figure 22:
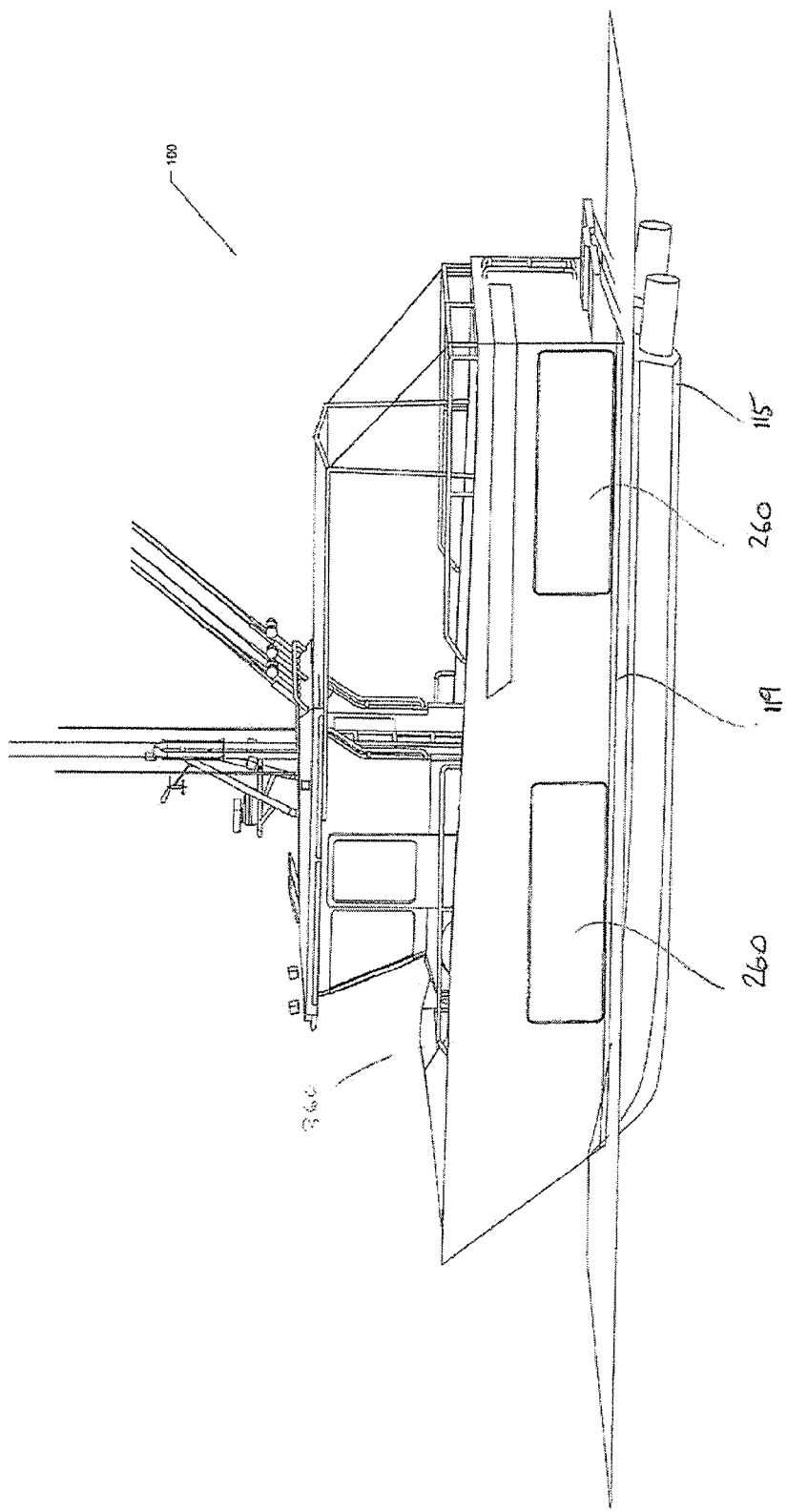
FIG. 22: shows a rear perspective view of a vessel with the motive pods in their stowed position and the ramp arrangement in its retracted position.
Figure 23:
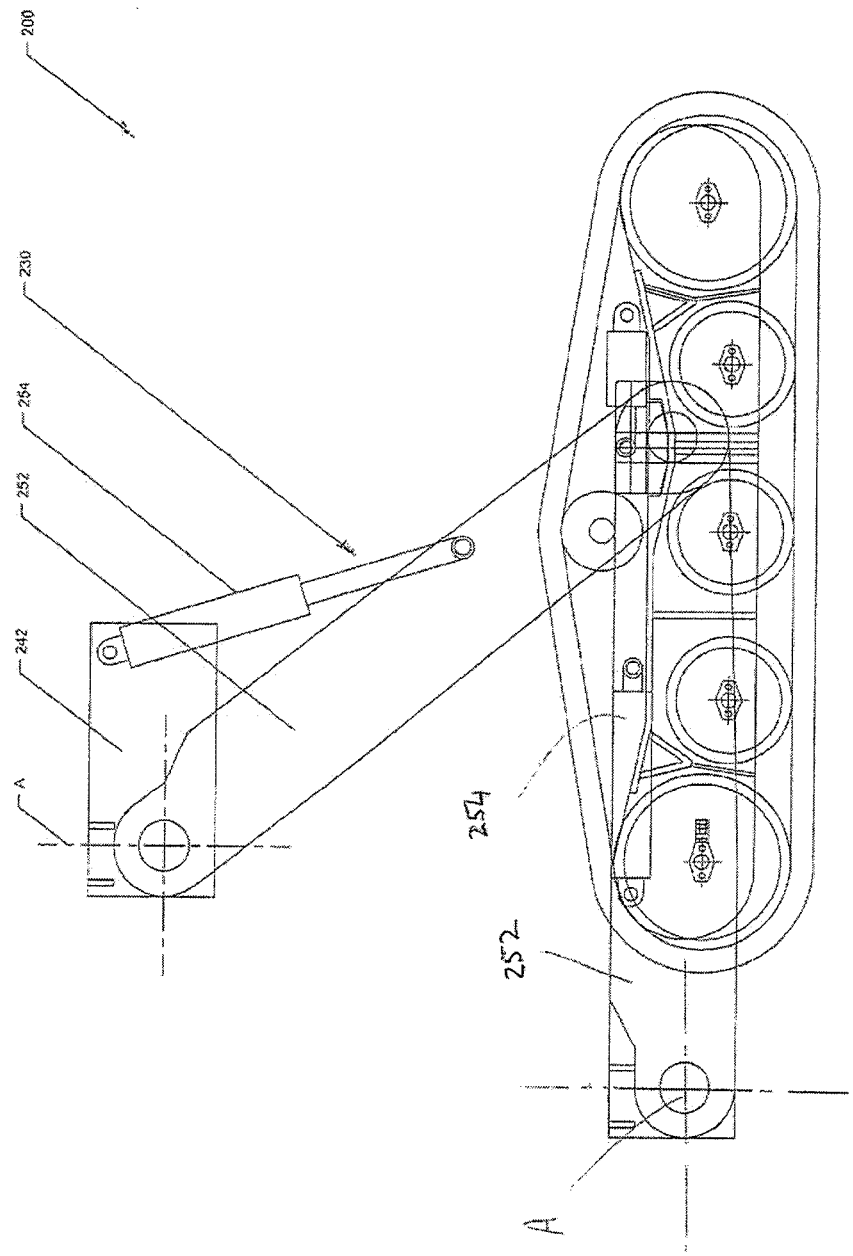
FIG. 23: shows a schematic view of a motive pod in its lower position and its upper position, showing how the pivot member moves relative the hydraulic ram and track arrangement.
Figure 24:
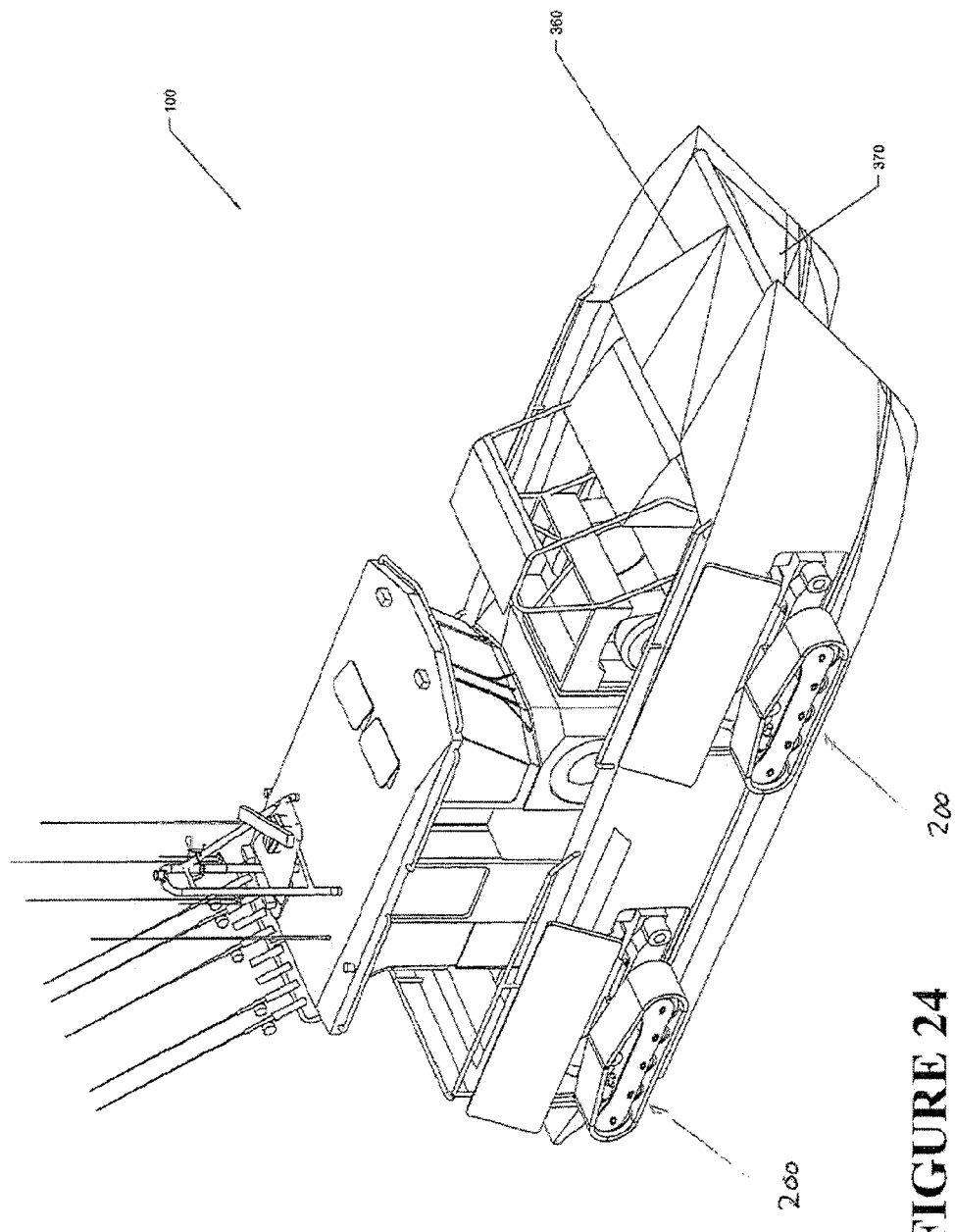
FIG. 24: shows a top perspective view of a vessel with the motive pods in their distal condition.
Figure 25:
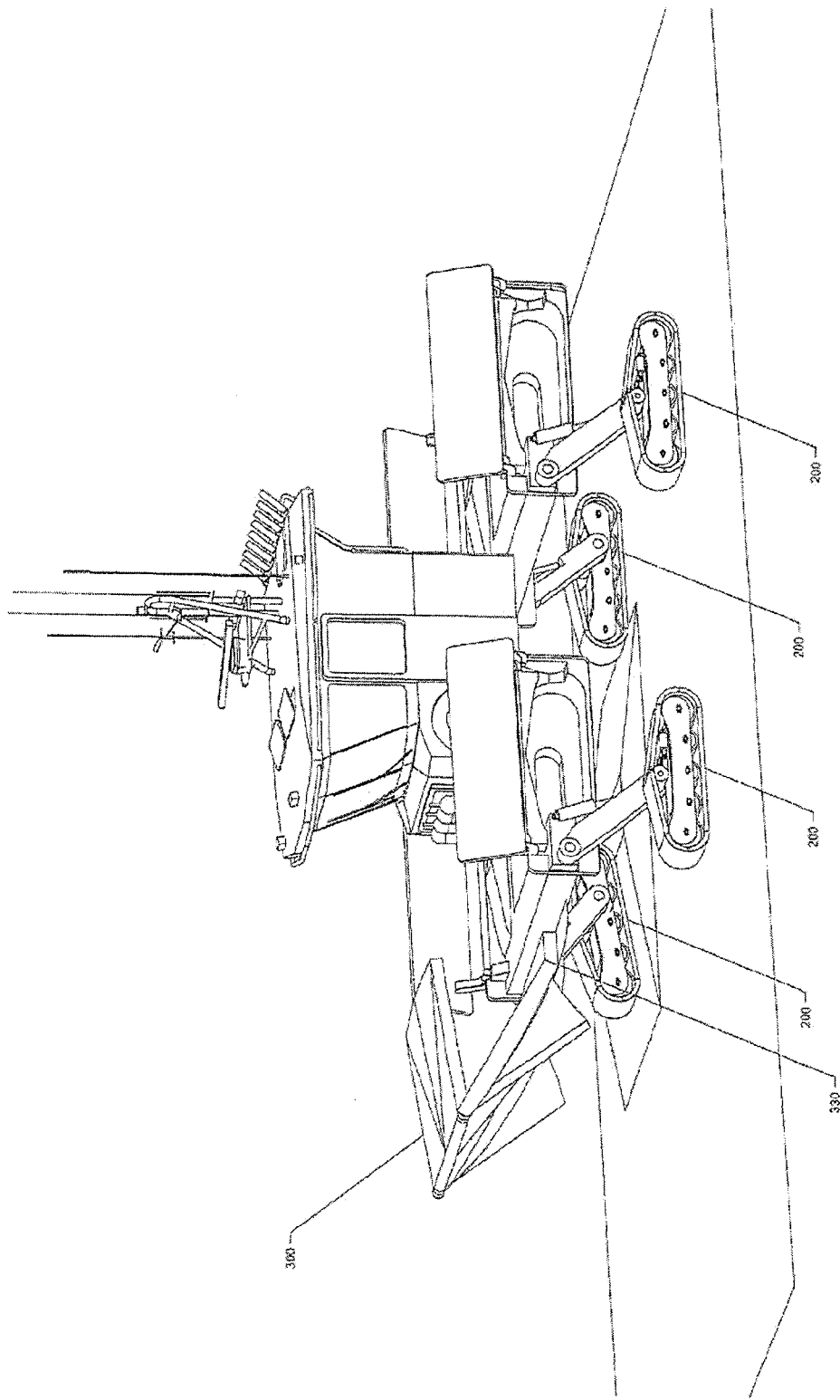
FIG. 25: shows a top perspective cutaway view of a vessel with the motive pods in their deployed condition, and with the hull cutaway to show the motive pods and ramp arrangement.
Figure 26:
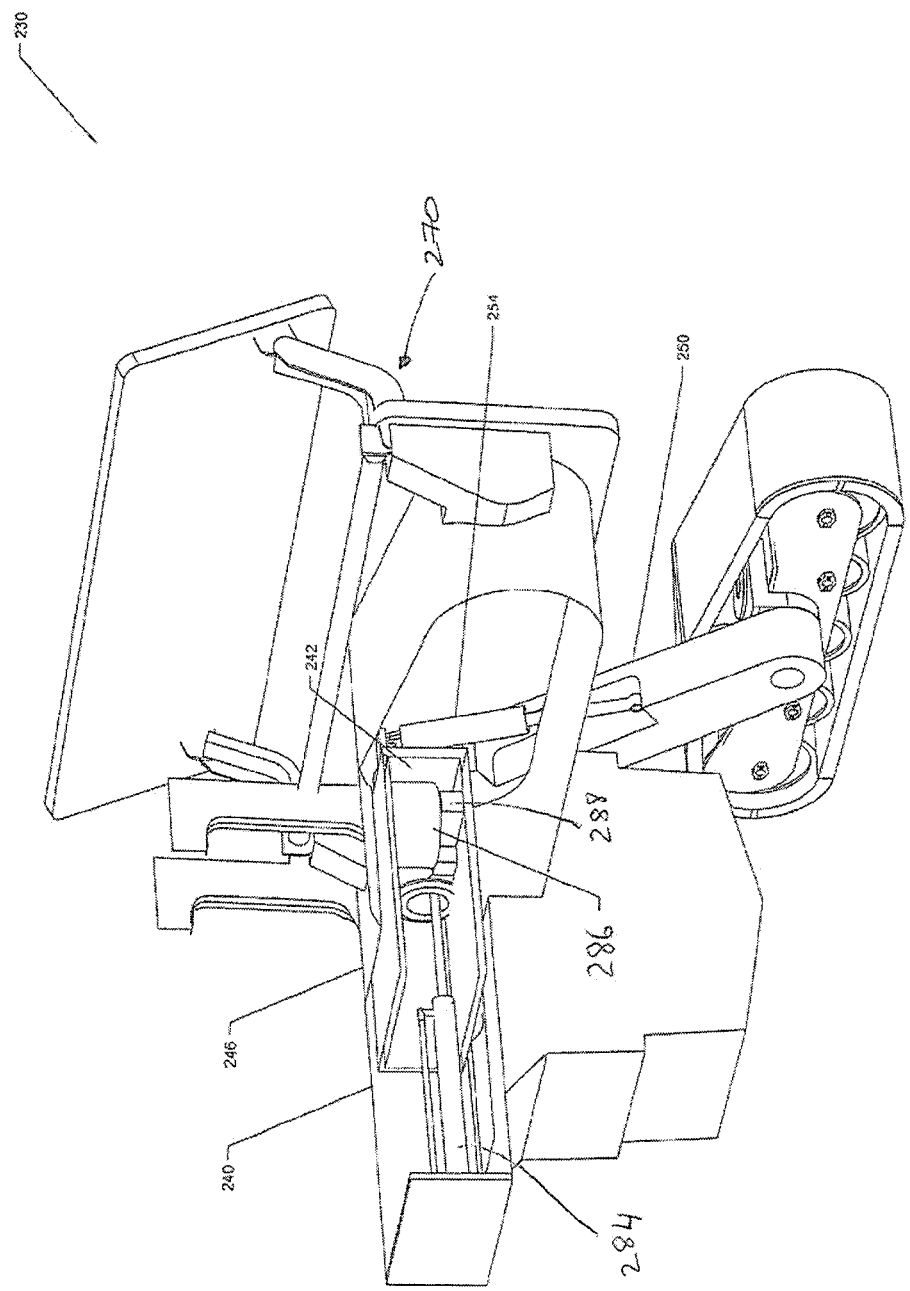
FIG. 26: shows a cutaway perspective view of a motive pod in a deployed position.

The hull recess covers 260 are movable by a moving mechanism 270 between a covered position shown in FIGS. 21 and 22 in which the hull recess cover 260 covers all or most of the hull recess 220, and an uncovered position shown in FIG. 25, in which the associated motive pod 200 is movable between its deployed and its stowed position. It is envisaged that the moving mechanism may be driven by a powered means such as an electric motor, or manually by means of a lever (not shown).

Figure 18:
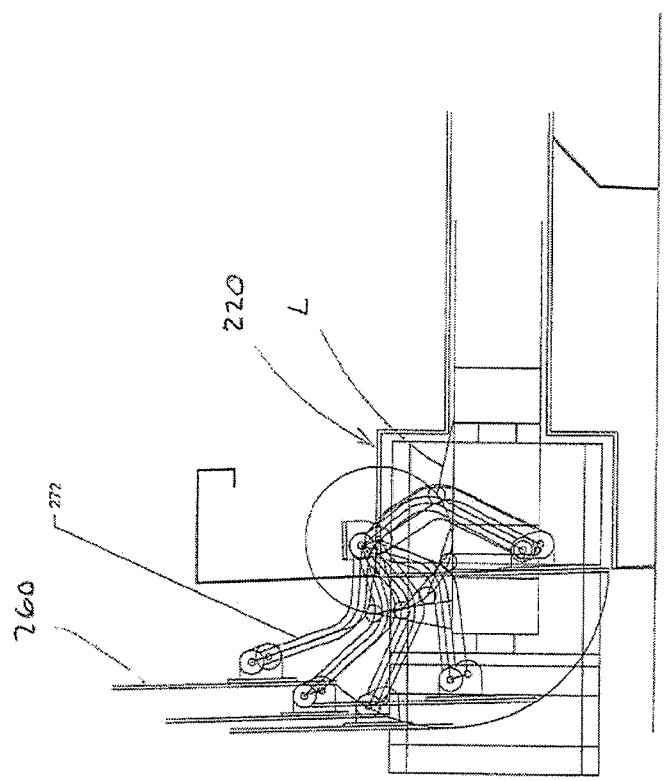
FIG. 18: shows a schematic view of the hull recess, showing the moving mechanism for the hull recess covers in various positions to illustrate operation of the pantographing mechanism and movement by the horizontal translation mechanism.
Figure 19:
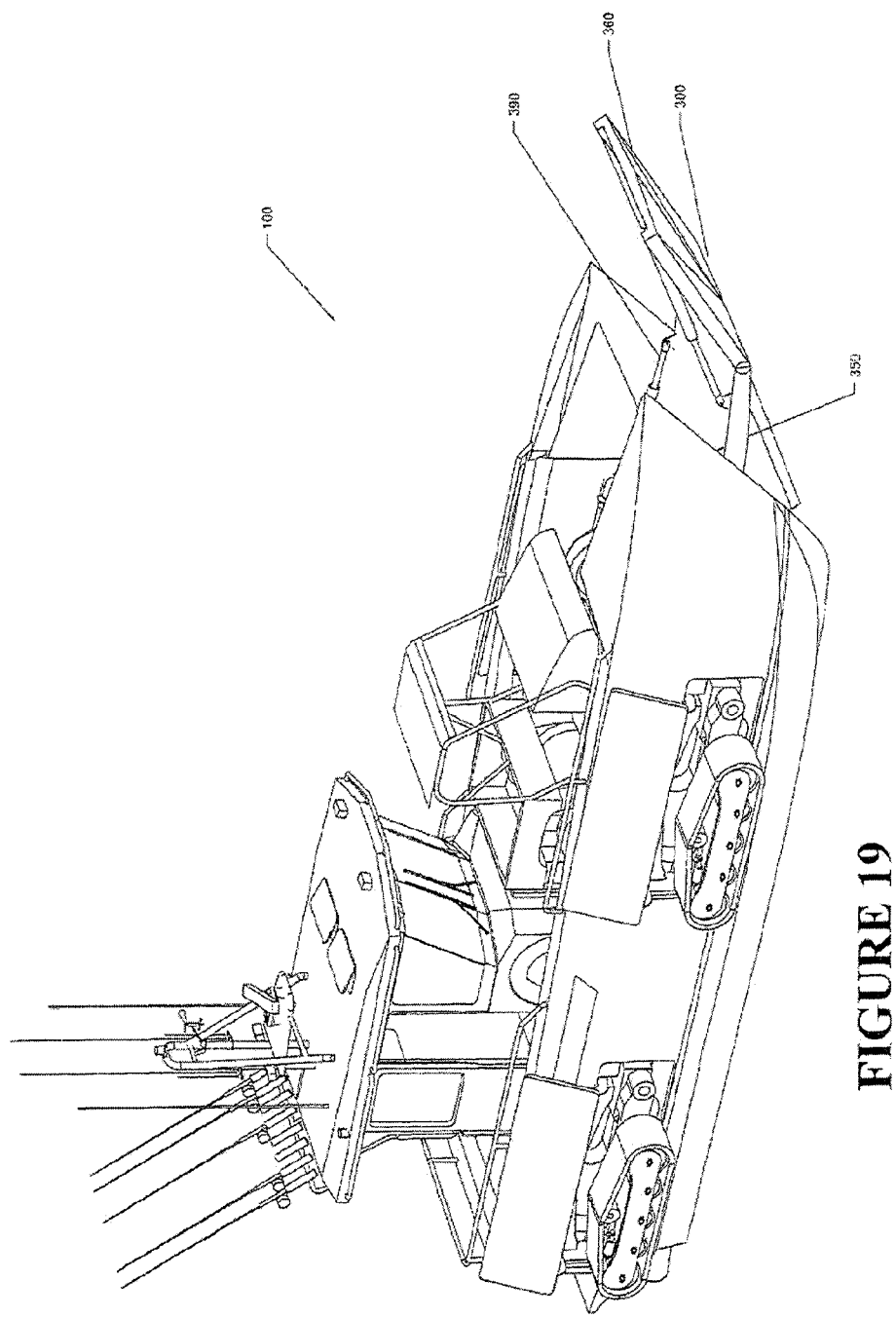
FIG. 19: shows a top perspective view of a vessel.
Figure 20:
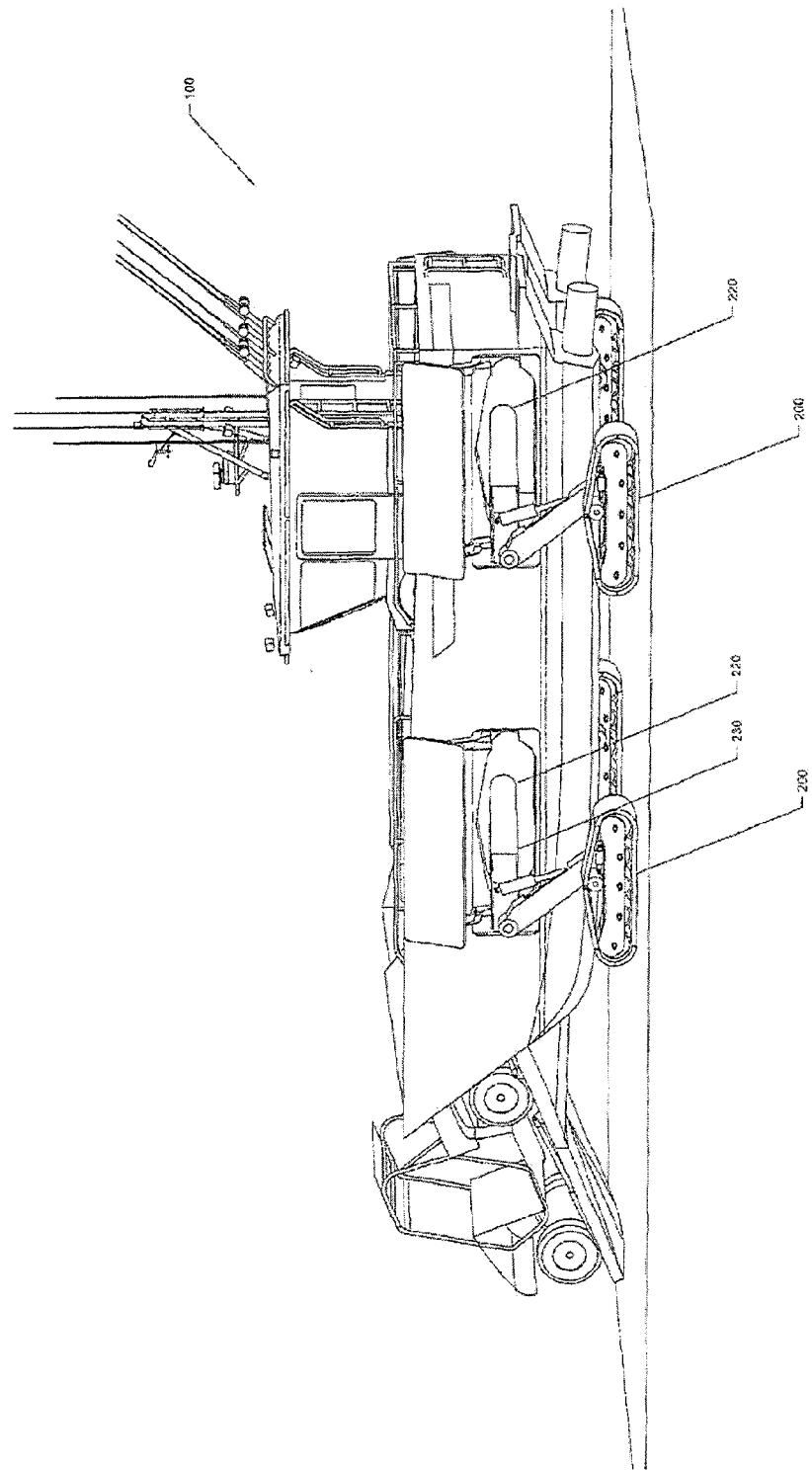
FIG. 20: shows a rear perspective view of a vessel with the motive pods in their deployed position and the ramp arrangement in its deployed position.

In the embodiment shown in FIG. 18, the moving mechanism 270 is a pantographing mechanism 272 that allows the hull recess cover 260 to be moved between their covered position to their uncovered position while retaining a similar alignment. The pantographing mechanism 272 is coupled to the telescoping member 246 by a tie rod (as shown schematically as line L in FIG. 18), so that it operates automatically when the horizontal translation mechanism 240 operates. This means that the moving mechanism 270 is in effect operated by the hydraulic ram 244 of the horizontal translation mechanism 240, and will firmly seat the hull recess cover 260 over the hull recess 220. This will also reduce weight of the moving mechanism 270.

It also allows the hull recess cover 260 to be retracted well out of the way, and abutted against the hull above the hull recess 220.

In the preferred embodiments shown, the hull recesses 220 are disposed above the waterline 119 of the vessel 100 when the vessel is moving through water. This helps prevent corrosion of the motive pods 200 and their associated deployment mechanisms 230.

To further facilitate the reduction of corrosion, there is provided a flushing system (not shown) for flushing water from a fresh water source (not shown) through the hull recesses 220.

The flushing system preferably comprises connector formations in the form of a hose connector for connecting the flushing system to a fresh water source. Water from the fresh water source is then guided through a conduit to one or more nozzles that are configured for spraying at least motive pod 200 and its associated deployment mechanisms 230 with fresh water. Such an exercise is envisaged after the vessel 100 has been used in corrosive conditions such as seawater, and for general maintenance. It is envisaged that a flushing system could be provide for each hull recess and its associated motive pod 200, or one flushing system could automatically direct flushing water to flush all of the hull recesses 220 at once.

It is envisaged that the motive pods 200 will be coupled to hull structure 112, which provides a region for secure coupling of the motive pods 200.

The motive pods 200 each comprise a suspension arrangement 280 for operably (at least partially) reducing forces acting on the hull structure 112 by dissipating and/or damping the forces acting on the motive pods 200. In a preferred embodiment, the suspension arrangement 280 comprises a swing arm in the form of the pivot member 252 and a resilient member in the form of an air spring 286.

In a preferred embodiment, the suspension arrangement 280 is selectable between an engaged condition in which the suspension arrangement is operable; and a disengaged condition in which suspension arrangement is not operable when the motive pods are in their deployed condition.

The suspension arrangement 280 is selectable between its engaged condition (shown in FIG. 27c) and disengaged condition (shown in FIG. 27b) by movement of the horizontal translation mechanism 240. In addition to the horizontal translation mechanism 240 being moveable between a proximal condition shown in FIG. 27a and a distal condition, it is also moveable between a suspension engagement position shown in FIG. 27c in which the suspension arrangement 280 is in its engaged condition, and a suspension disengagement position shown in FIG. 27b in which the suspension arrangement 280 is in its disengaged condition. The suspension engagement position and suspension disengagement position of the horizontal translation mechanism 240 both coincide with the horizontal translation mechanism 240 being in a distal condition, but to different extents.

Figures 27A, 27B, 27C:
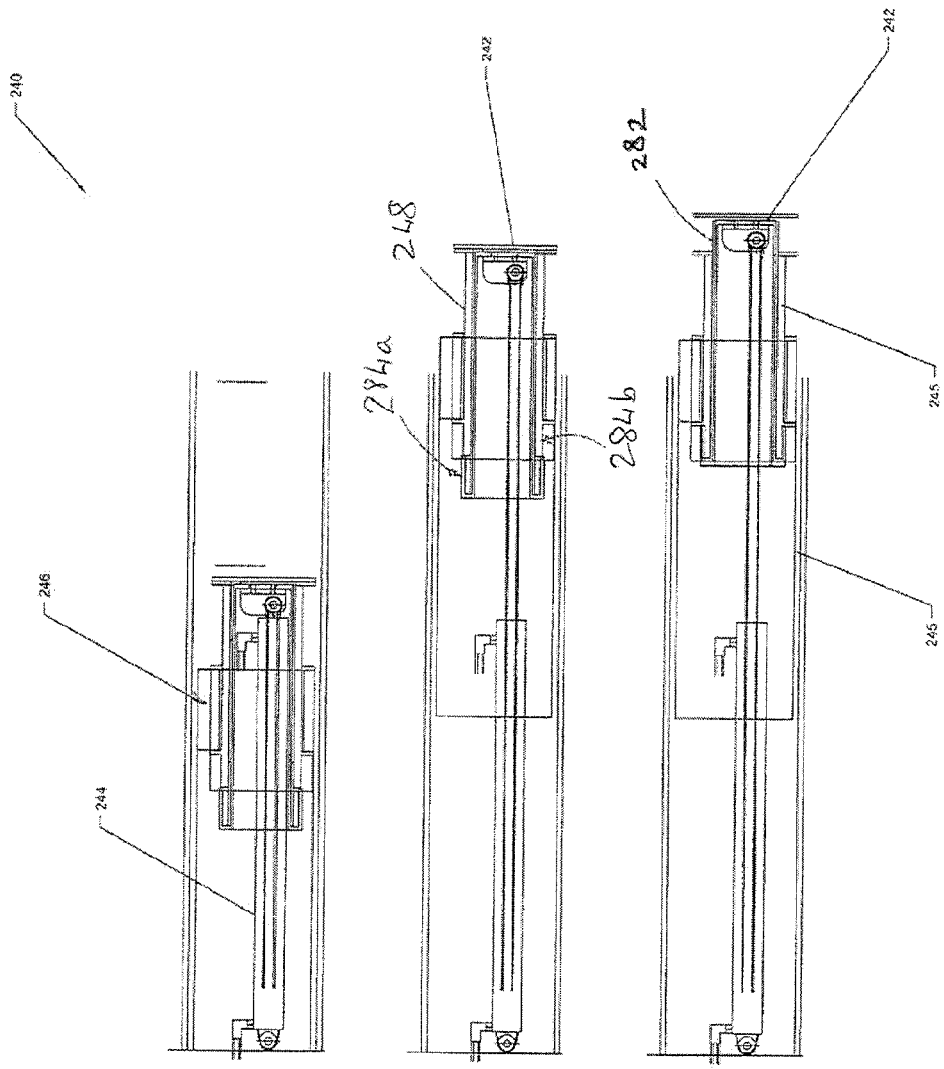
FIG. 27a: shows a schematic back view of a horizontal translation mechanism in a proximal condition.
FIG. 27b: shows a back schematic view of a horizontal translation mechanism in a distal condition with the suspension in its disengaged condition.
FIG. 27c: shows a back schematic view of a horizontal translation mechanism in a distal condition with the suspension in its engaged condition.
Figure 28:
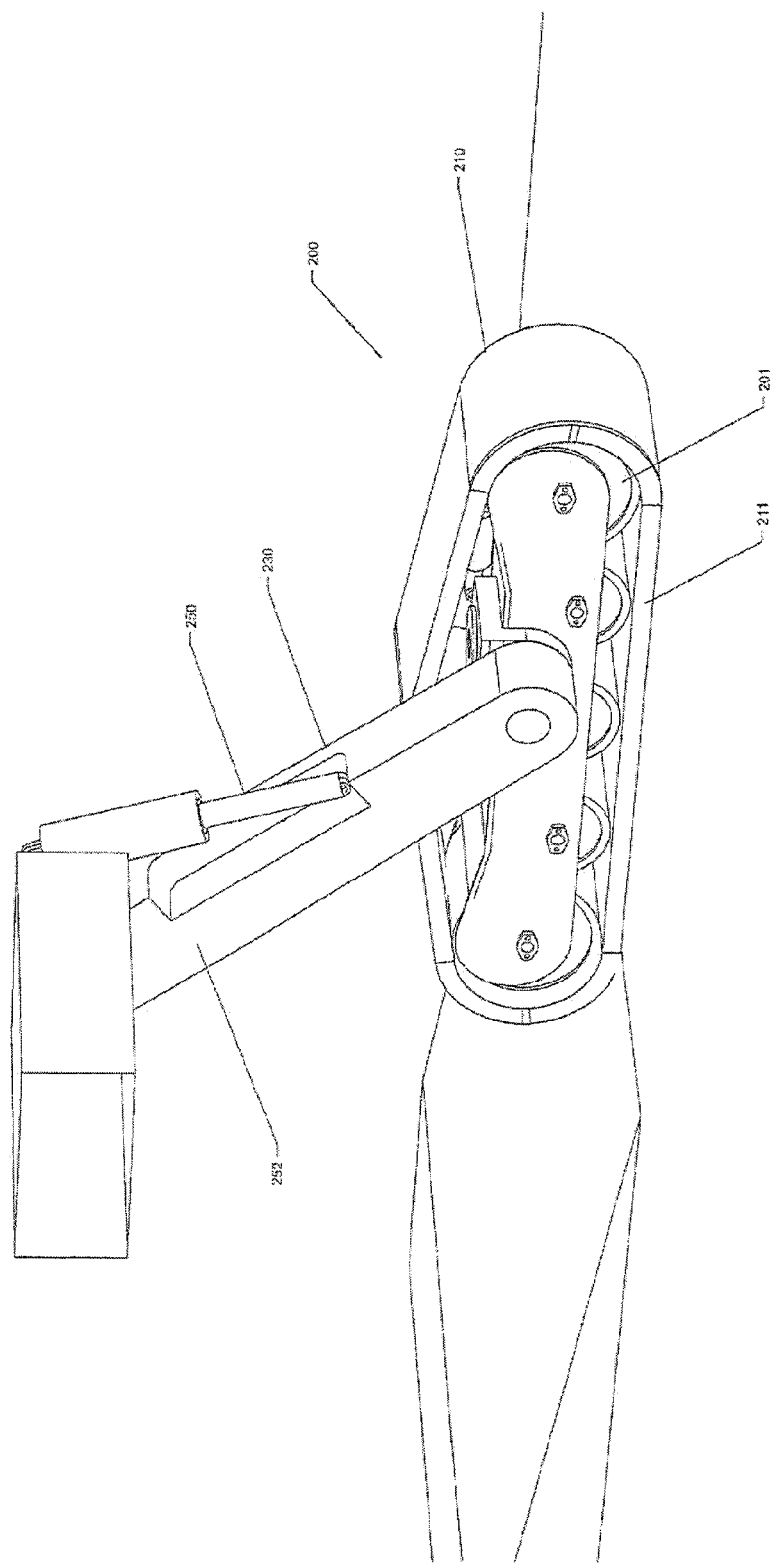
FIG. 28: shows a cutaway perspective view of a motive pod in a deployed position.
Figure 29:
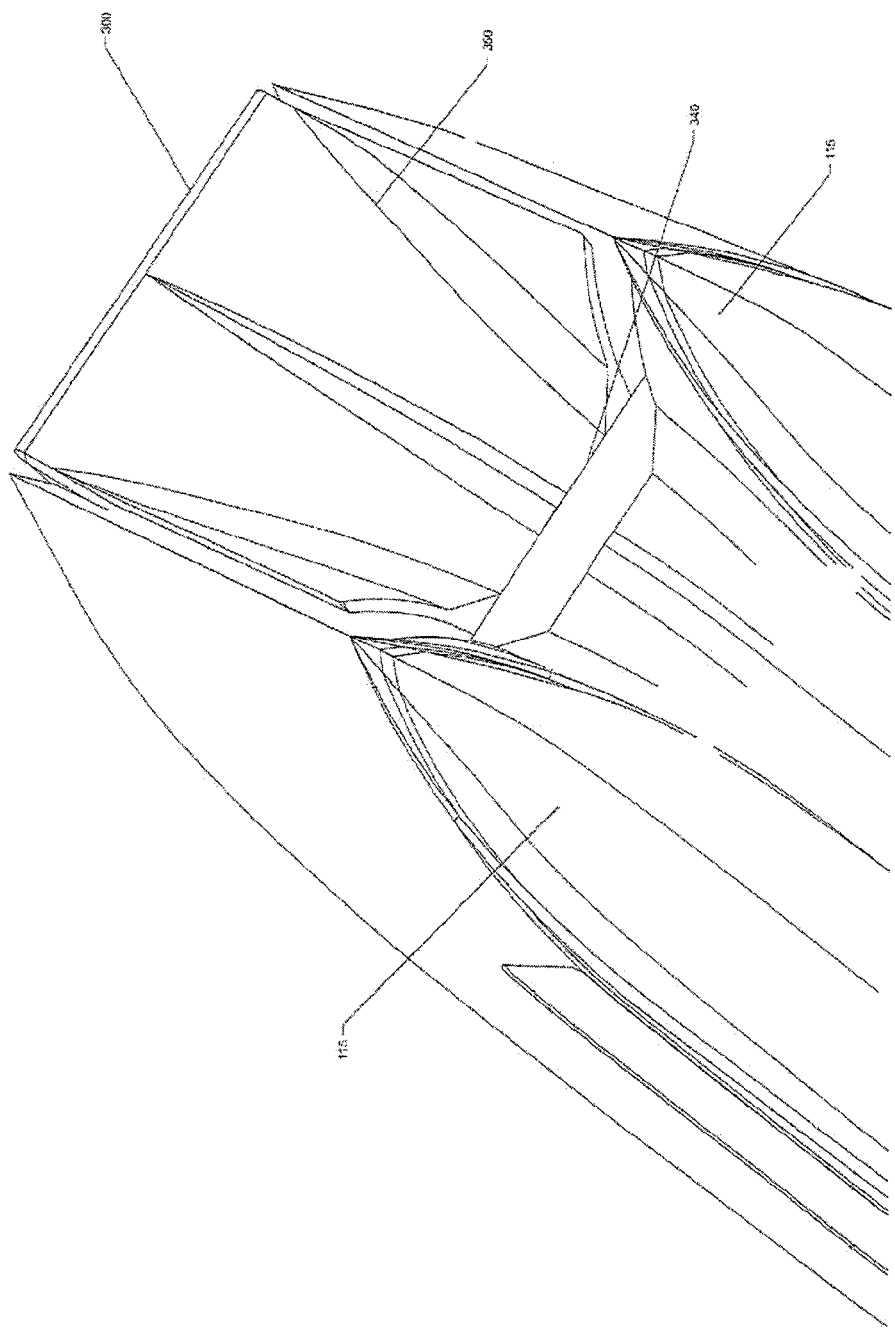
FIG. 29: shows a bottom view of the bow of a vessel showing the demi-hulls.
Figure 30:
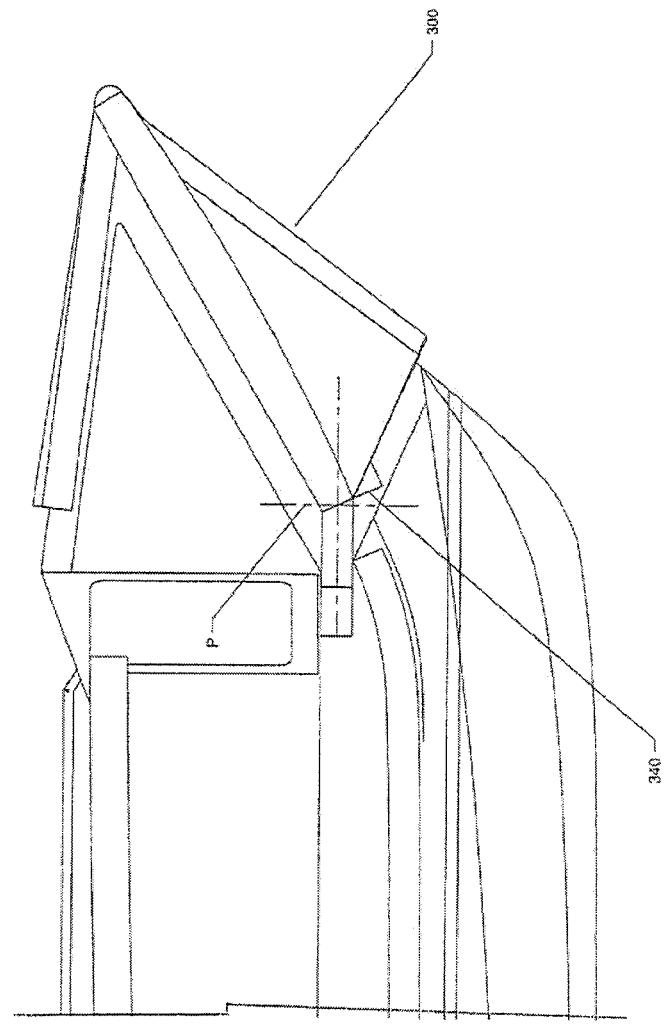
FIG. 30: shows a cutaway side view of the bow of a vessel showing the demi-hulls with the ramp arrangement between its retracted position and deployed position.
Figure 31:
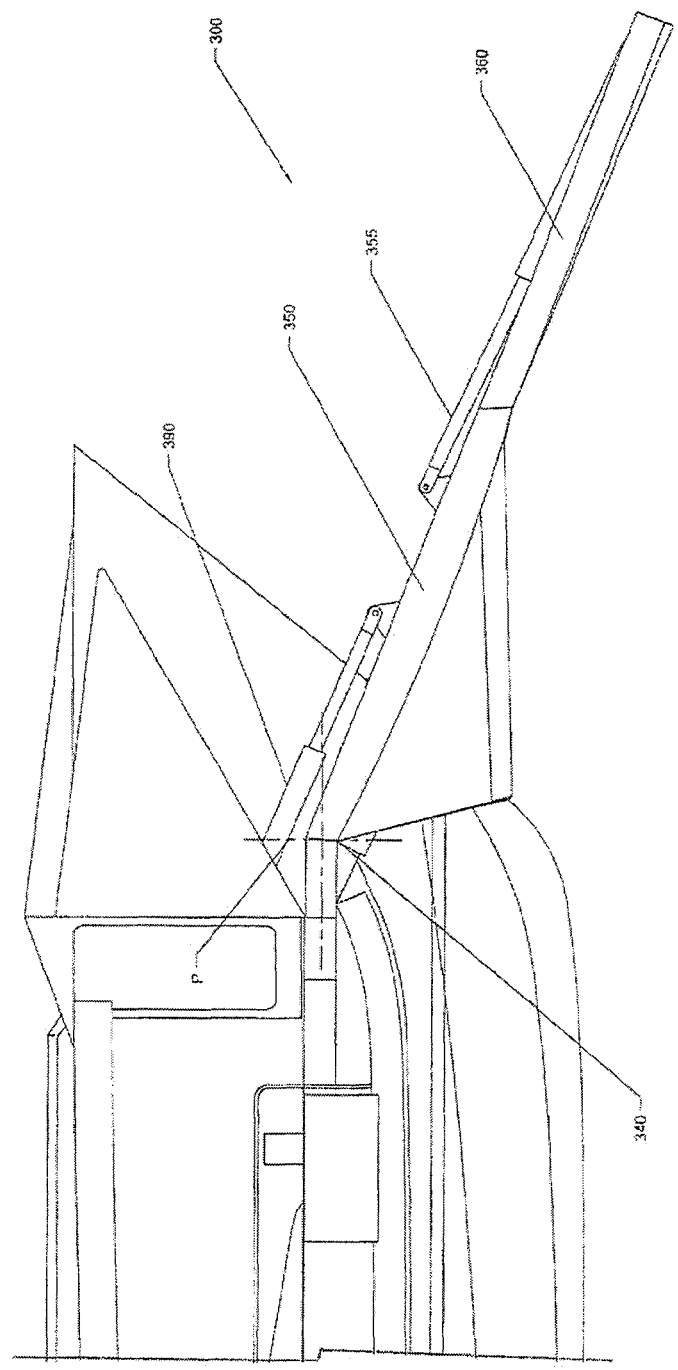
FIG. 31: shows a cutaway side view of the bow of a vessel showing the demi-hulls with the ramp arrangement in its deployed position.
Figure 32:
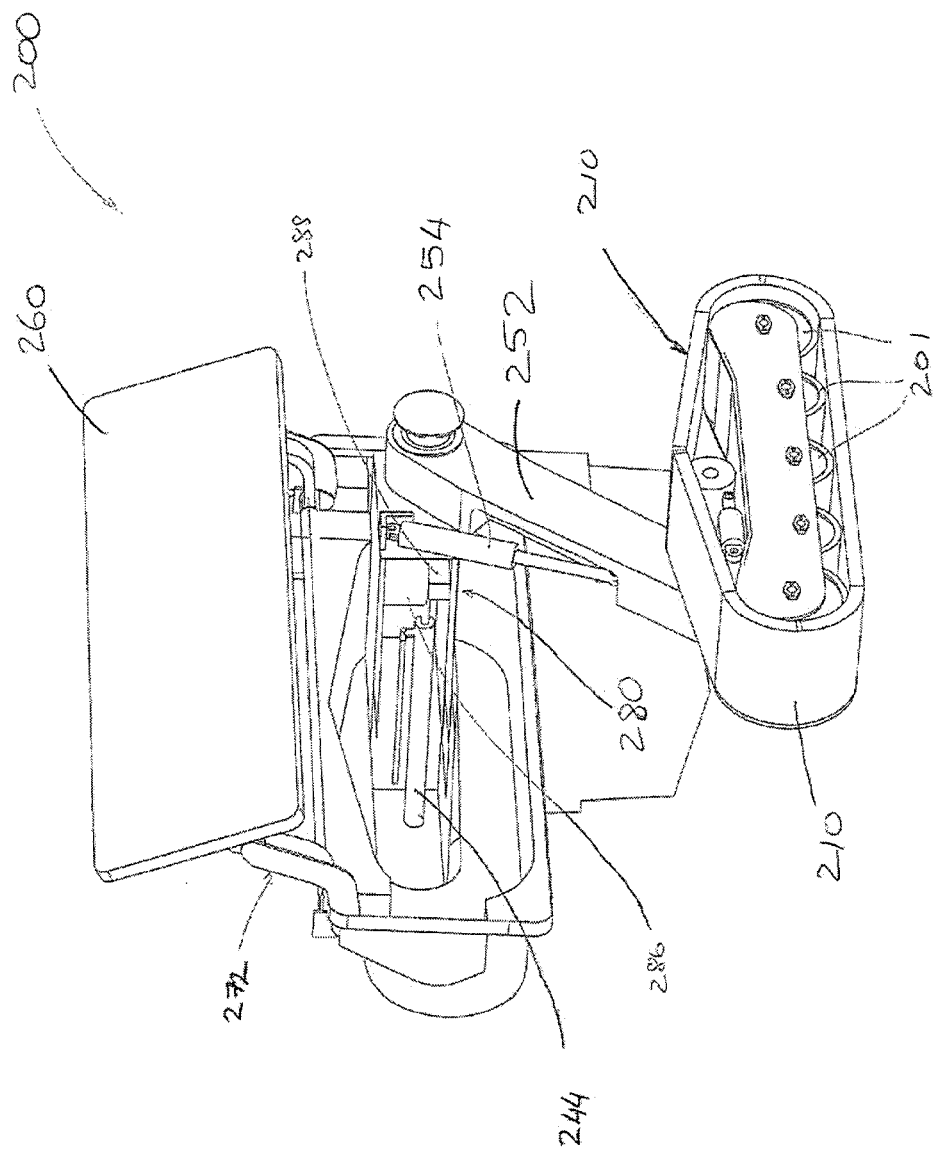
FIG. 32: shows a cutaway front perspective view of a motive pod in its deployed position.
Figure 33:
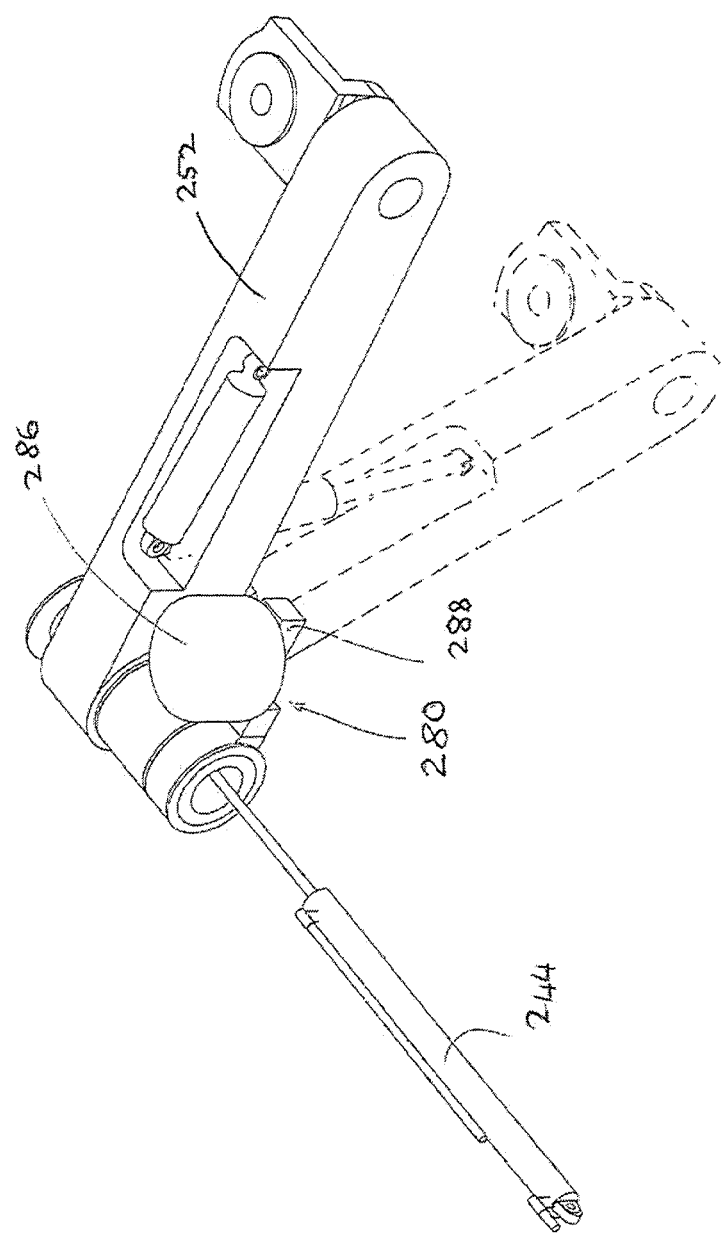
FIG. 33: shows a top perspective cutaway view of a horizontal translation mechanism, a lowering mechanism and suspension arrangement, showing the lowering mechanism in both its upper position and lower position (in broken lines)

Movement of the horizontal translation mechanism 240 to its suspension engagement position shown in FIG. 27c causes internal sleeve 282 which has a key formation 284a (shown in FIG. 27) to key into a corresponding keyway 284b on a leg stub axle 248 that is part of the telescoping arrangement 246. It is envisaged that the keyway 284b will only be able to be engaged by the key formation 284a when the pivot member is pivoted to its lowermost position.

As the key formation 284a engages with the corresponding keyway 284b, a swing arm 288 (shown in FIGS. 26 and 33) is engaged. The swing arm 288 thus becomes movable about axis A with the pivot member 252. The air spring 286 is then activated and the hydraulic ram 254 is set into a "float" mode in which it is freely movable, but acts as a spring damper, while the air spring 286 provides resistance to rotational movement of the pivot member 252 about axis A.

As the swing arm 288 moves about pivot axis A, it acts on air spring 286, to push it against a member of the telescoping arrangement. As the air spring 286 is compressed, it pushes back against the swing arm to prevent collapse of the pivot member 252 to drop the vessel.

Similarly, movement of the horizontal translation mechanism 240 to its suspension disengagement position causes the decoupling of the swing arm 288 from the pivot member 252 to thereby disengage the suspension arrangement to its disengaged condition. The air spring is deactivated, and the hydraulic ram 254 is set to a "controllable" mode in which the length of the hydraulic ram 254 is individually controllable. In this way, the hydraulic ram 254 is no longer acting as a damper.

In one embodiment, it is envisaged that the motive pods 200 can comprise a comprises a quick release mechanism (not shown), whereby the motive pods are at least partially disengageable from the deployment mechanism, and in particular one or more of the hydraulic rams 244 and 254, to enable the motive pods 200 to be manually manoeuvred from the hull recesses 220. The quick release mechanism could comprise at least one or more quick release pins or any suitable mechanism.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. An amphibious vessel comprising
   a. at least one hull;
   b. at least one or more deployable motive pods, each motive pod associated with a hull recess in the hull, and movable between
      i. a deployed position in which the amphibious vessel is movable on the motive pods over land; and
      ii. a stowed position in which the motive pods are stowed for use while the amphibious vessel is travelling over water;
   c. at least one or more deployment mechanisms configured for moving the one or more deployable motive pods between their deployed position and their stowed position, each deployment mechanism comprising
      i. a first arm and an associated first actuator together configured to linearly translate the motive pod in an athwartship direction between
         a proximal condition in which the motive pod is at least partially received into said hull recess; and
         a distal condition in which the motive pod is located distally of the proximal condition and external to the hull recess;
      ii. a second arm, a first end of which is pivotably connected at or towards a second end of the first arm, with said motive pod pivotably connected to a second end of the second arm, an associated second actuator configured to rotate the second arm on a plane substantially parallel to a vertical plane running along the vessel's longitudinal axis to move the motive pod, between
         a lower position, when the first arm is at its distal condition, in which the lowest point of the motive pod is lower than the hull, and an upper position in which the motive pod is located in a position suitable for lateral movement into the hull recess.

2. An amphibious vessel as claimed in claim 1 wherein at least one motive pod includes a track arrangement.

3. An amphibious vessel as claimed in claim 1 wherein the second arm is configured to move a motive pod pivotally about a pivot axis.

4. An amphibious vessel as claimed in claim 1, wherein the first arm comprises a moving member movable on a guide arrangement.

5. An amphibious vessel as claimed in claim 4, wherein the moving member comprises end stop formations for preventing the moving member moving out of the guide arrangement.

6. An amphibious vessel as claimed in claim 1 wherein deployment mechanism comprises a locking mechanism for locking the moving member in position.

7. An amphibious vessel as claimed in claim 1, wherein the second arm comprises an aligning mechanism for aligning the motive pod with the hull recess for movement into its stowed position as the second arm is moving from its lower position to its upper position.

8. An amphibious vessel as claimed in claim 7, wherein the aligning mechanism is configured for aligning the motive pod in a suitable position for use in its deployed position as the second arm is moving from its upper position to its lower position.

9. An amphibious vessel as claimed in claim 7, wherein the aligning mechanism comprises
   a. a stop member;
   b. a sliding elongate member; and
   c. a receiving formation configured for sliding connection with the sliding elongate member.

10. An amphibious vessel as claimed in claim 1, wherein the amphibious vessel comprises a control system for controlling the steering of the amphibious vehicle on land.

11. An amphibious vessel as claimed in claim 1, wherein the steering of the amphibious vehicle on land is controlled by controlling the drive to at least one motive pod.

12. An amphibious vessel as claimed in claim 11, wherein the hull recess covers are movable by a moving mechanism between a covered position and an uncovered position.

13. An amphibious vessel as claimed in claim 1, wherein the at least one hull is a plurality of demi-hulls.

14. An amphibious vessel as claimed in claim 13, wherein a pair of hull recesses present to an outer side of each demi-hull.

15. An amphibious vessel as claimed in claim 1, wherein the hull recesses are disposed at least partially above the waterline of the amphibious vessel when the vessel is moving through water.

16. An amphibious vessel as claimed in claim 15, wherein the hull recesses are disposed above the waterline of the amphibious vessel when the vessel is moving through water, to thereby ensure that the motive pods are not submerged when the vessel is moving through water.

17. An amphibious vessel as claimed in claim 1, wherein the amphibious vessel comprises a flushing system for flushing water from a fresh water source through the hull recesses.

18. An amphibious vessel as claimed in claim 17, wherein the flushing system comprises at least one or more nozzles suitable for spraying at least one motive pod with water from a fresh water source when a fresh water source is connected.

19. An amphibious vessel as claimed in claim 1, wherein at least one or more motive pods comprises a suspension arrangement for operably at least partially reducing forces acting on the hull structure by dissipating and/or damping the energy of forces acting on the motive pod.

20. An amphibious vessel as claimed in claim 1, wherein the motive pods comprises a quick release mechanism, whereby the motive pods are at least partially disengageable from the deployment mechanism, to allow the motive pods to be manually manoeuvred from the hull recesses.

21. An amphibious vessel as claimed in claim 1, wherein the amphibious vessel further comprises a. a ramp arrangement extending at least partly between a plurality of demi-hulls,
   i. the ramp arrangement presenting at least one or more outer surfaces;
   ii. the ramp arrangement being moveable at least between a retracted position in which the vessel is rendered seaworthy, and a deployed position in which the ramp arrangement facilitates ingress and egress from the vessel;
b. wherein when the ramp arrangement is in its retracted position, the outer surface of the ramp arrangement is configured to complement the configuration of the partly formed demi-hulls to form a seaworthy outer hull configuration presenting a plurality of fully formed demi-hulls.

22. An amphibious vessel as claimed in claim 1, wherein the vessel comprises at least one superstructure configured to at least in part translate relative to said hull between a first condition and at least one other position (herein after "second condition"),
   a. wherein said at least one superstructure in said first condition at least in part defines a first zone suitable for accommodating at least one person and/or vehicle,
   b. and wherein said at least one superstructure in said second condition at least in part defines a second zone suitable for accommodating at least one person and/or vehicle.

\* \* \* \* \*